US 6,633,356 B1

United States Patent
Kataoka et al.

(10) Patent No.: US 6,633,356 B1
(45) Date of Patent: Oct. 14, 2003

(54) LIQUID CRYSTAL DISPLAY AND METHOD FOR FABRICATING THE SAME

(75) Inventors: Shingo Kataoka, Kawasaki (JP);
Kunihiro Tashiro, Kawasaki (JP);
Katsufumi Ohmuro, Kawasaki (JP);
Yoshio Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/416,972

(22) Filed: Oct. 12, 1999

(30) Foreign Application Priority Data

| Oct. 12, 1998 | (JP) | .................................. 10-289402 |
| Dec. 28, 1998 | (JP) | .................................. 10-373307 |
| Mar. 17, 1999 | (JP) | .................................. 11-072249 |

(51) Int. Cl.[7] .......................................... G02F 1/1336
(52) U.S. Cl. ................................................ 349/129
(58) Field of Search ................................ 349/129, 130, 349/131

(56) References Cited

U.S. PATENT DOCUMENTS

| 5,398,127 | A | * | 3/1995 | Kubota et al. ............... 349/129 |
| 6,097,464 | A | * | 8/2000 | Liu ............................. 349/129 |
| 6,188,457 | B1 | * | 2/2001 | Liu ............................. 349/129 |
| 6,266,122 | B1 | * | 7/2001 | Kishimoto et al. .......... 349/129 |
| 6,313,899 | B1 | * | 11/2001 | Wu et al. .................... 349/129 |
| 6,335,780 | B1 | * | 1/2002 | Kurihara et al. ............. 349/129 |
| 6,339,462 | B1 | * | 1/2002 | Kishimoto et al. .......... 349/129 |

* cited by examiner

*Primary Examiner*—James Dudek
(74) *Attorney, Agent, or Firm*—Greer, Burns & Crain, Ltd.

(57) ABSTRACT

The liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, a projection for restricting a tilting direction of the liquid crystal molecules when the drive voltage is applied between the first electrode and the second electrode, disposed between the first electrode and the first alignment film, and/or between the second electrode and the second alignment film. The first alignment film and/or the second alignment film have weaker vertical alignment restrictiveness in a region where the projection is formed than that in a region where the projection is not formed.

32 Claims, 43 Drawing Sheets

ALIGNMENT RESTRICTIVENESS ON PROJECTIONS
IS SUBSTANTIALLY EQUAL TO THAT IN GAPS

ALIGNMENT RESTRICTIVENESS ON PROJECTIONS
IS WEAKENED

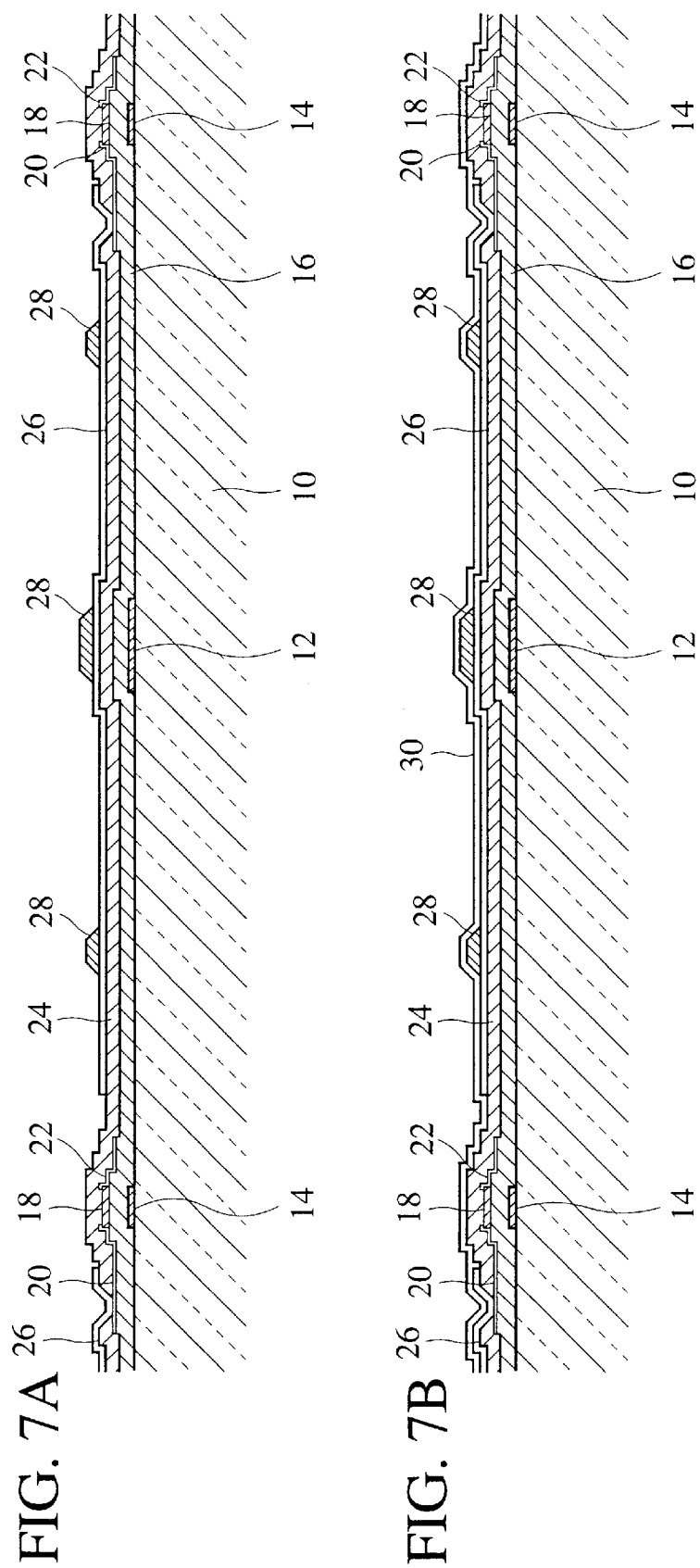

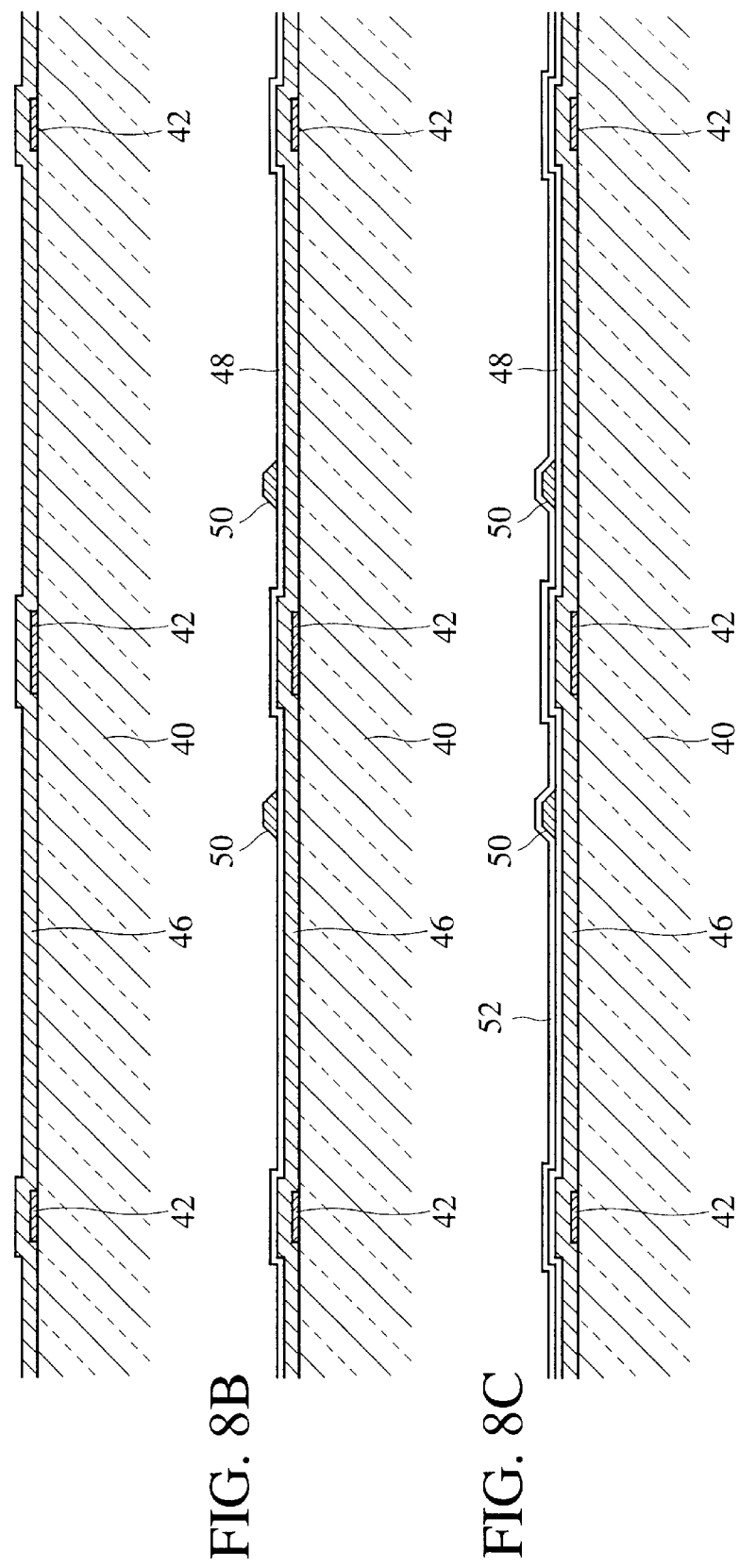

WITHOUT ASHING (SURFACE TENSION 46mN/m)

WITH ASHING (SURFACE TENSION 65mN/m)

PREBAKING TEMPERATURE IS 80°C

PREBAKING TEMPERATURE IS 30°C

FIG. 26A
$dr_1 = 1.4 \mu m$
MANY DISCLINATION DOMAINS, MUCH ALIGNMENT DISORDER
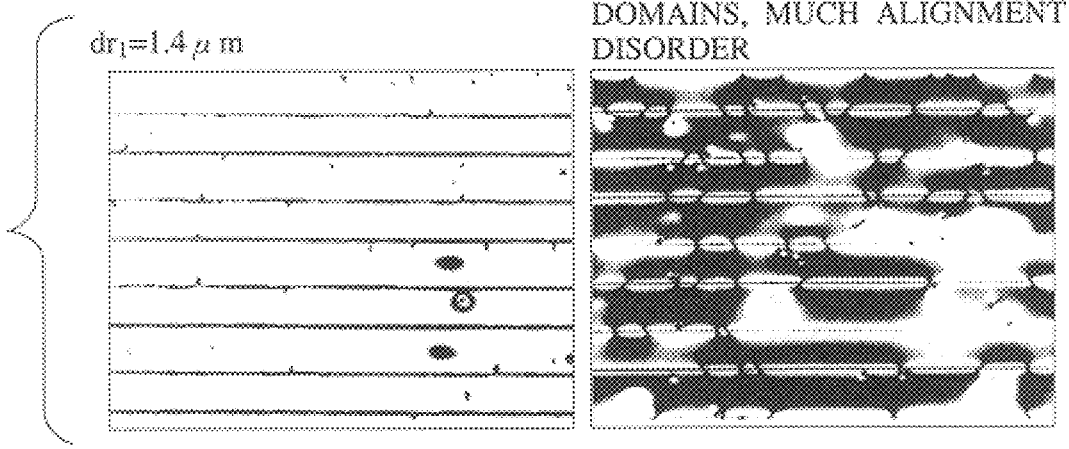
FIG. 26B
$dr_1 = 1.6 \mu m$
MIDDLE DISCLINATION DOMAIN, MIDDLE ALIGNMENT DISORDER
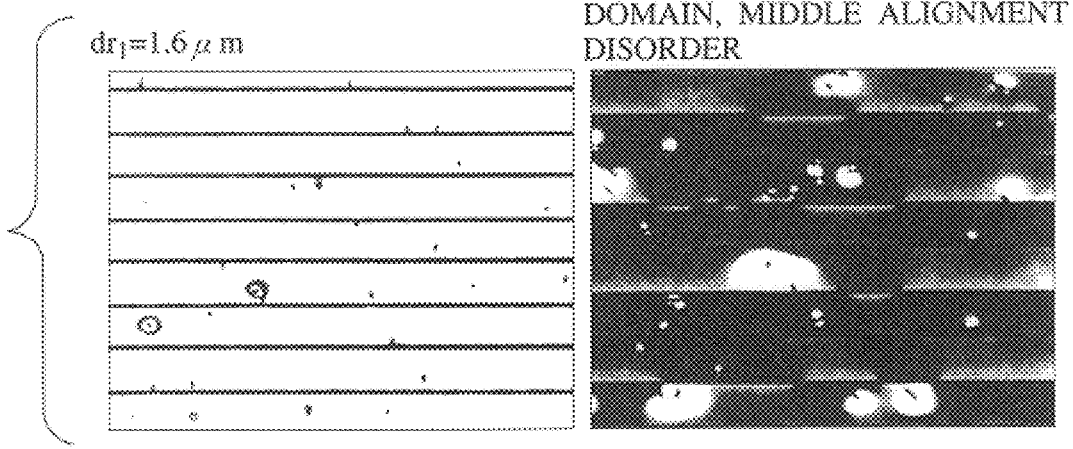
FIG. 26C
$dr_1 = 1.8 \mu m$
A FEW DISCLINATION DOMAINS, A LITTLE ALIGNMENT DISORDER
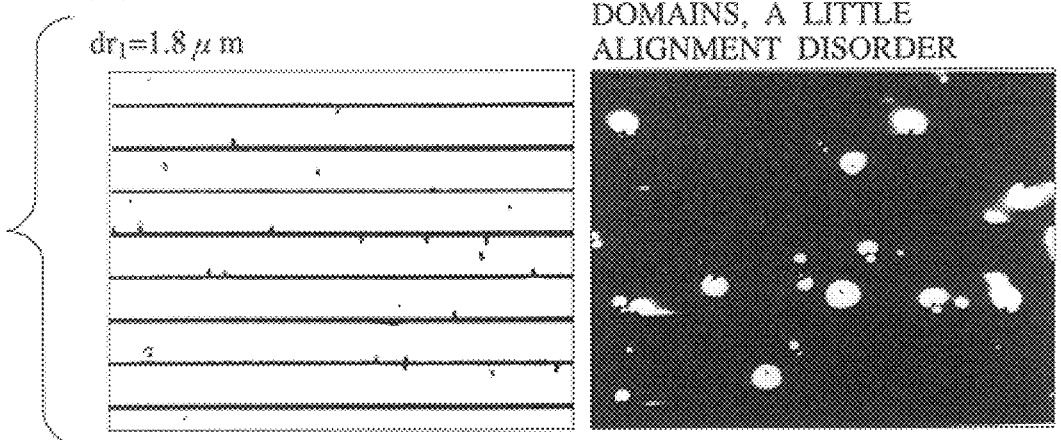
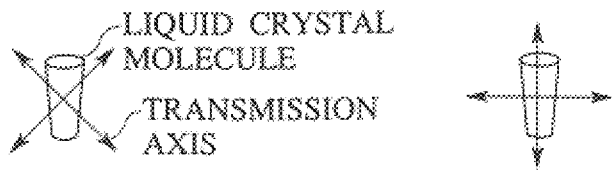
LIQUID CRYSTAL MOLECULE
TRANSMISSION AXIS

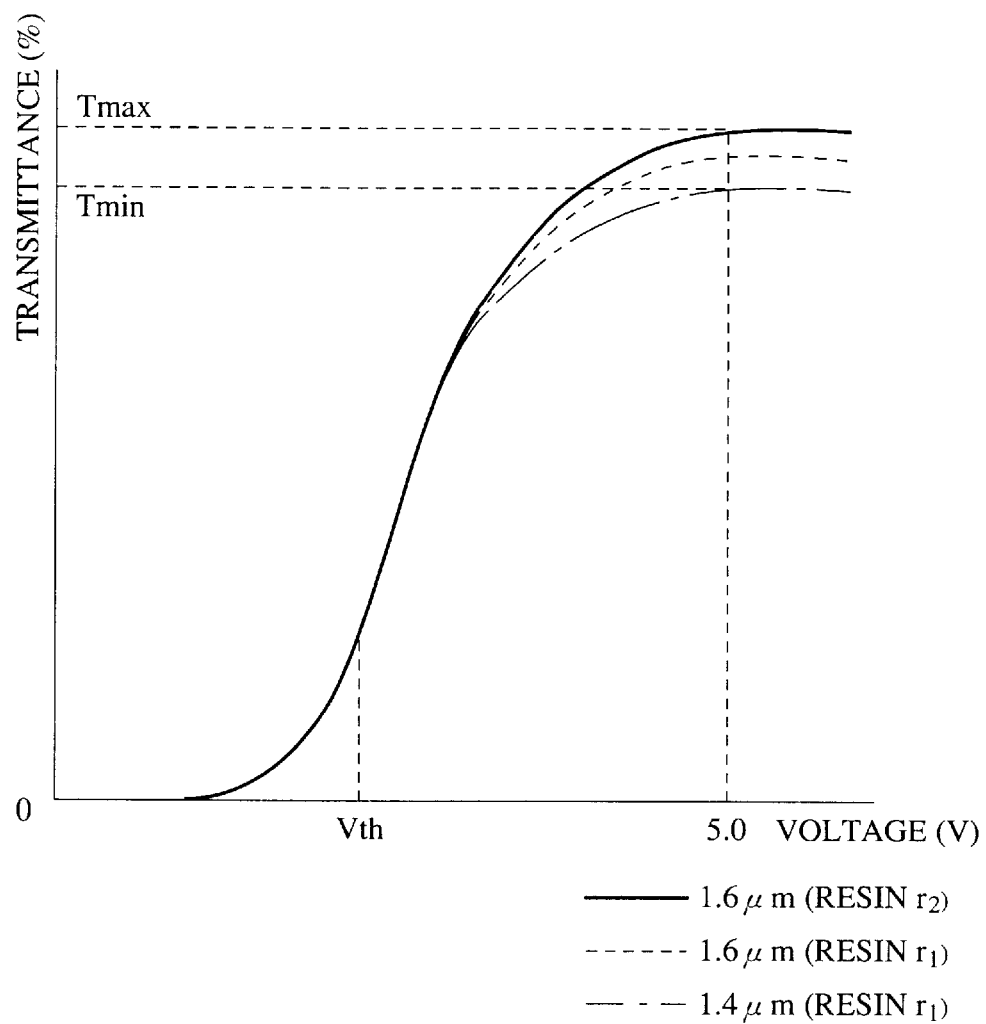

CONTROLS 4 TO 6

EXAMPLE 10

EXAMPLES 11 TO 13

LIQUID CRYSTAL DISPLAY AND METHOD FOR FABRICATING THE SAME

BACKGROUND OF THE INVENTION

The present invention relates to a liquid crystal display and a method for fabricating the same, more specifically a liquid crystal display of homeotropic alignment mode in which directions of inclination of liquid crystal molecules upon application of a voltage is controlled by the use of projections in the shape of banks provided on the surfaces of the substrates.

As an LCD (Liquid Crystal Display) using an active matrix, a liquid crystal display of TN (Twisted Nematic) mode in which a liquid crystal material having positive dielectric constant anisotropy is aligned horizontal with respect to the substrate plane and twisted at 90° between the opposed substrates is conventionally widely used. However, the liquid crystal display of the TN mode has a serious disadvantage of poor visual angle characteristics. To improve the visual characteristics, various studies have been made.

In view of this, the inventors of the present application have made earnest studies and proposed a liquid crystal display of MVA (Multi-domain Vertical Alignment) mode which will take over the TN mode, in which a liquid crystal material having a negative dielectric constant anisotropy is homeotropically aligned, and directions of inclination direction of the liquid crystal molecules upon application of a voltage are restricted by structures, e.g., bank-shaped projections provided on the surfaces of the substrates, whereby they have succeeded in obtaining drastically improved visual angle characteristics (refer to, e.g., the specification of Japanese Patent Application No. 361384/1997 filed by the applicant of the present application).

As shown in FIG. 42A, the liquid crystal display of the above-described MVA mode in which a liquid crystal material having negative dielectric constant anisotropy is vertically aligned includes bank-shaped projections of a light transmitting resin (e.g., resist or others) provided on the substrates, so that the liquid crystal molecules are restricted to be aligned, inclined in a plurality of directions in one picture element when a voltage is applied, whereby improved visual angle characteristics can be obtained.

However, the liquid crystal display of the above-described conventional MVA mode, which has the projections formed in the display picture element region, cannot avoid, in principle, aperture ratio decrease. The transmittance in the bright state is lower in comparison with the TN mode.

That is, in the MVA mode, a voltage applied to the liquid crystal molecules in the projection formed regions is lowered. Accordingly, as shown in FIG. 42B, the liquid crystal molecules at the projection summits are not inclined, and resultantly all the liquid crystal molecules on the projections are not easily inclined. When the liquid crystal molecules on the projections are inclined upon application of a voltage, a direction of the inclination is normal to the projections, i.e., substantially identical with an inclination direction of the liquid crystal molecules in the gaps. Accordingly, a transmittance curve of the light passing through the liquid crystal panel is as shown in FIG. 42C, and an aperture ratio is decreased by an area of the projections.

Various mechanisms for achieving the alignment control are known. Generally it is accepted that an equipotential surface of the liquid crystal layer is deformed by the bank-shaped projections upon application of a voltage, and the liquid crystal is aligned slantly backward at both edges of the bank-shaped projections (refer to FIG. 43A). On the other hand, when alignment restricting forces are equal to each other on both edges, the liquid crystal on the bank-shaped projections is tilted stable in a direction displaced from the edges by a 90° or a 180° azimuth, i.e., in a direction parallel with extension of the bank-shaped projections.

As a film thickness of a light transmitting resin, i.e., a height of the bank-shaped projections is increased, a transmittance in the white state is increased, but leakage light is generated in the black state. Accordingly, the contrast is poor. The liquid crystal display of the MVA mode was originally developed for monitor purposes, and priority was given to contrast in setting a height of the bank-shaped projections.

The liquid crystal display of the MVA mode, in which the alignment control structures in the form of the bank-shaped projections are formed on the picture element, and the liquid crystal is aligned, inclined to a prescribed direction at the edges of the projections, has lower transmittance in the white state in comparison with the TN panel. That is, the above-described conventional liquid crystal display gives priority to contrast in setting a height of the bank-shaped projections, and does not have the transmittance optimized with a result of low transmittance due to generation of alignment disorder. Specifically, the liquid crystal alignment on the bank-shaped projections of the liquid crystal display of the MVA mode was observed, and the liquid crystal tilted in reverse directions (90° and 180°) to form constricted domains (inverse tilt domains). Alignment disorders were generated from the constricted domains to the outsides of the banks (refer to FIG. 43B). Such liquid crystal alignment disorders have resulted in the low transmittance.

In considering of electric power saving of the panel and incorporation of the panel in notebook-type personal computers, improvement of the brightness of the liquid crystal display of the MVA mode is a significant problem. It is expected that transmittance decrease on the bank-shaped projections and at the edges thereof will be minimized, and the liquid crystal molecules in the gaps will be easily tilted when a voltage is applied.

SUMMARY OF THE INVENTION

An object of the present invention is to provide a liquid crystal display which improves luminance of a liquid crystal display of the MVA-mode and a method for fabricating the same.

The above-described object is achieved by a liquid crystal display including: a first substrate including an active device for driving a liquid crystal, a picture element electrode to which a drive voltage is applied by the active device, and a first alignment film formed on the picture element electrode and aligning liquid crystal molecules vertically to a surface of the first alignment film when the drive voltage is not applied; a second substrate including a common electrode opposed to the picture element electrode, and a second alignment film formed on the common electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising: a bank-shaped projection for restricting a tilting direction of the liquid crystal molecules when the drive voltage is applied, disposed between the picture element electrode and the first alignment film, and/or between the common electrode and the second alignment film, the first alignment film and/or the second alignment film having weaker vertical alignment restrictiveness in a region where the bank-shaped projection is formed than that in a region where the bank-shaped projection is not formed.

BRIEF DESCRIPTION OF THE DRAWINGS

FIGS. 7A–7B are sectional views of the liquid crystal display according to the first embodiment of the present invention in the steps of the method for fabricating the same, which shows the method (Part 2).

FIGS. 8A–8C are sectional views of the liquid crystal display according to the first embodiment of the present invention in the steps of the method for fabricating the same, which shows the method (Part 3).

FIGS. 26A–26C are views of observation of alignment of the evaluation panels of Example 5.

FIG. 27 is a graph showing relationships between transmittances and applied voltages in evaluation panels of Example 6.

FIGS. 42A–42C are views of the conventional liquid crystal display explaining a structure and operation thereof.

DETAILED DESCRIPTION OF THE INVENTION

A First Embodiment

The liquid crystal display according to a first embodiment of the present invention and a method for fabricating the liquid crystal display will be explained with reference to FIGS. 1 to 13.

Figure 1:
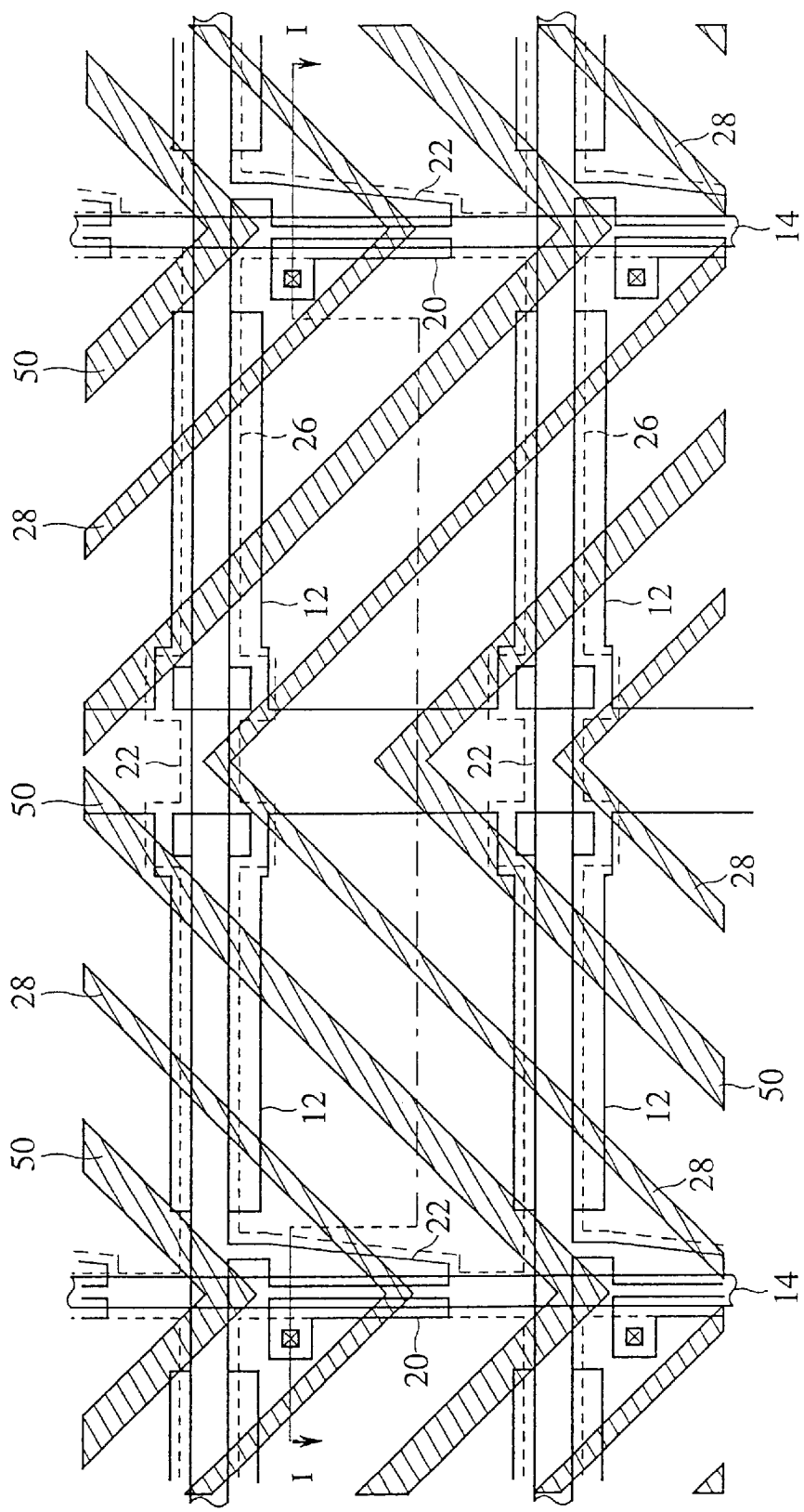
FIG. 1 is a plan view of the liquid crystal display according to a first embodiment of the present invention, which shows a structure thereof.
Figure 2:
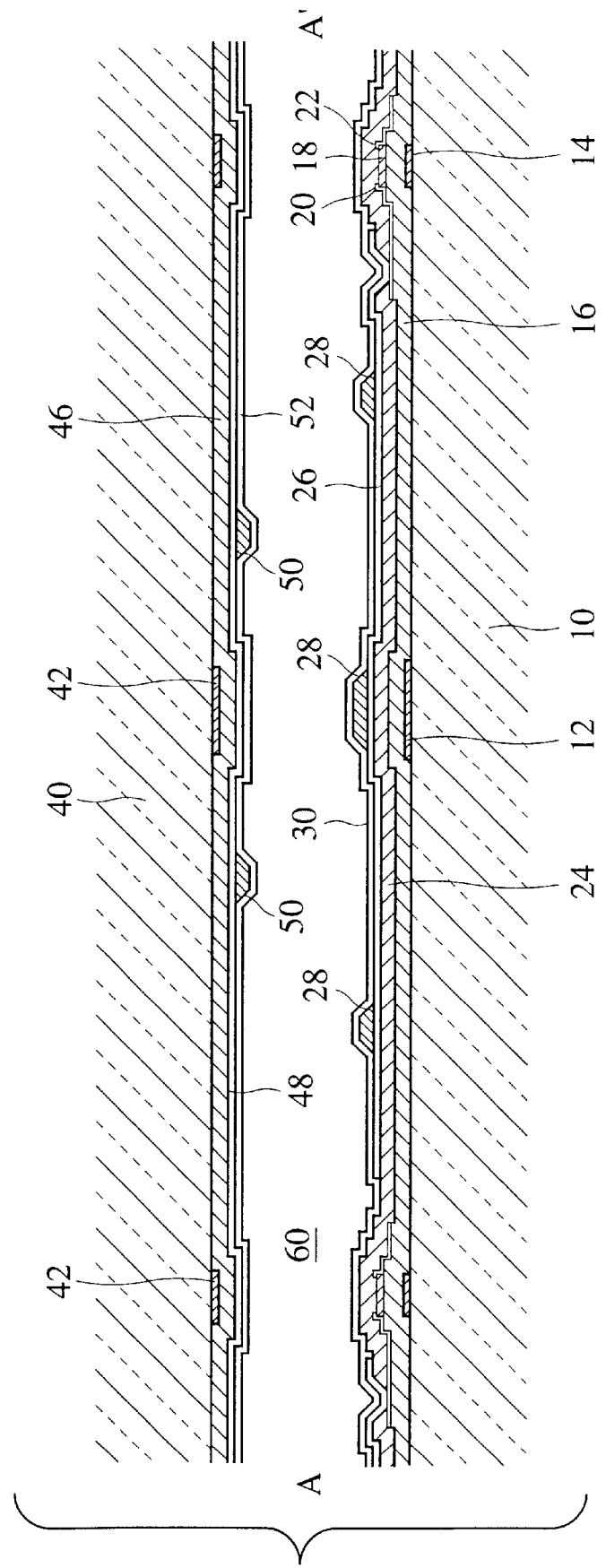
FIG. 2 is a diagrammatic sectional view of the liquid crystal display according to the first embodiment of the present invention, which shows a structure thereof.
Figure 3:
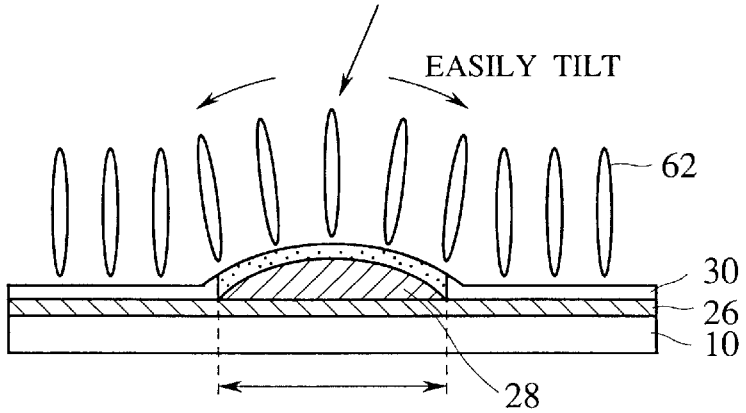
FIG. 3 is a view explaining the principle of the liquid crystal display according to the first embodiment and the method for fabricating the same.
Figure 4:
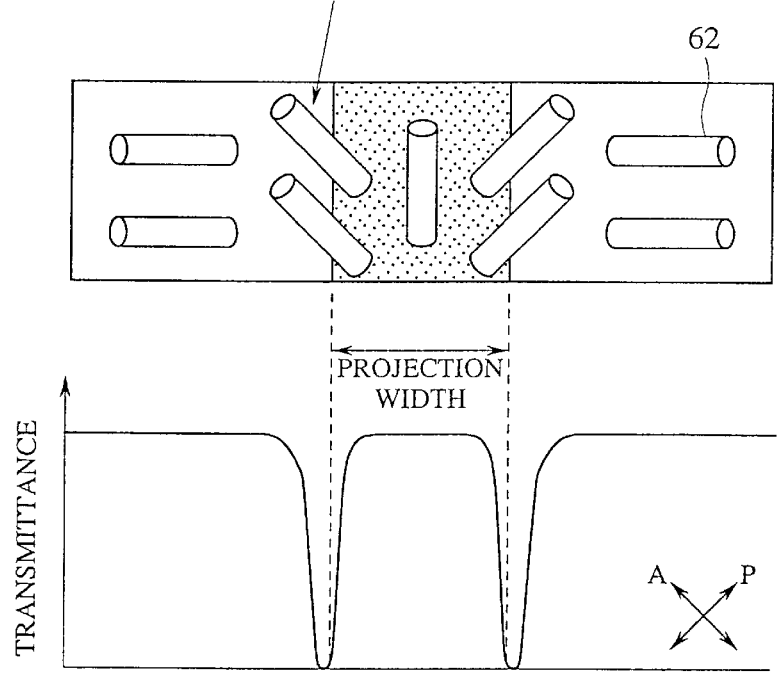
FIG. 4A is a view of a state of tilting of liquid crystal molecules in the liquid crystal display according to the first embodiment of the present invention.
FIG. 4B is a graph of the light transmittance in a state of tilting of liquid crystal molecules in the liquid crystal display according to the first embodiment of the present invention.
Figure 5A:
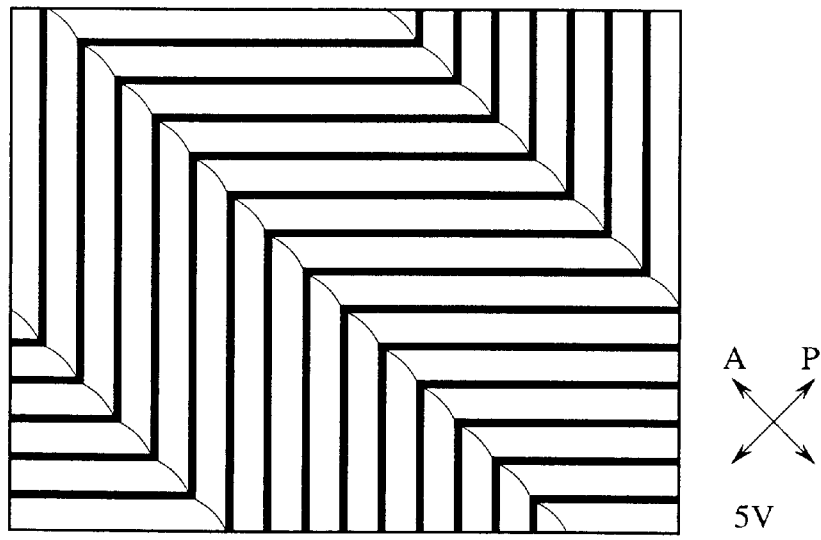
FIGS. 5A and 5B are copies of photographic pictures of the case that vertical alignment restrictiveness on the bank-shaped projections is weaker than that in the gaps between the bank-shaped projections (FIG. 5B) and of the case that the former is not weakened (FIG. 5A).
Figure 5B:
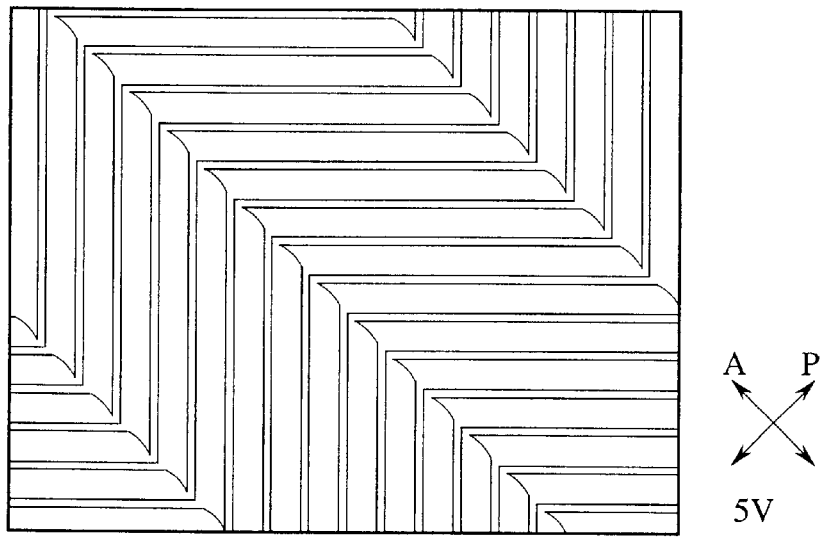

First, a structure of the liquid crystal display according to the present embodiment will be explained with reference to FIGS. 1 to 5. FIG. 1 is a plan view of the picture element portion of the liquid crystal display according to the present embodiment. FIG. 2 is a sectional view along the line A–A' in FIG. 1. FIG. 3 is a view explaining the principle of the present invention. FIG. 4A is a view of a tilting state of liquid crystal molecules of the liquid crystal display according to the present embodiment. FIG. 4B is a graph of light transmittance. FIGS. 5A–5B are views of states of transmitted light of a case that an alignment restrictiveness is weaker on the bank-shaped projections than that in the gaps (FIG. 5B) and of a case that the former is not weaker than the latter (FIG. 5A).

As shown in FIGS. 1 and 2, CS electrode 12 for forming an auxiliary capacitor and a gate bus line 14 including a gate electrode of a TFT are formed on a glass substrate 10. A gate insulation film 16 is formed on the glass substrate 10 with the CS electrode 12 and the gate bus line 14 formed on. An active layer 18 forming a channel region of the TFT is formed on the gate insulation film 16. On the gate insulation film 16 with the active layer 18 formed on there are formed a source electrode 20 connected to one side of the active layer 18, and a drain bus line 22 including a drain electrode, which is connected to the other side of the active layer 18. An insulation film 24 is formed on the gate insulation film 16 with the source electrode 20 and the drain bus line 22 formed on. A picture element electrode 26 connected to the source electrode 20 is formed on the insulation film 24. A bank-shaped projection 28 of a light transmitting material is formed zigzag on the insulation film 24 and the picture element electrode 26. An alignment film 30 for vertically aligning the liquid crystal molecules is formed on the insulation film 24 with the picture element electrode 26 and the bank-shaped projection 28 formed on.

On the other hand, a black matrix layer 42 is formed on a glass substrate 40. A colored resin layer 46 forming a color filter (CF) is formed on the glass substrate 40 with the black matrix layer 42 formed on. A common electrode 48 is formed on the colored resin layer 46. A bank-shaped projection 50 of a light transmitting material is formed zigzag on the common electrode 48, offset by a half pitch from the bank-shaped projection 28. An alignment film 52 for vertically aligning the liquid crystal molecules is formed on the common electrode 48 with the bank-shaped projection 50 formed on. In the specification of the present application, the "projection" includes a bank-shaped projection, a line-shaped projection and others.

The thus-formed glass substrate 10 (TFT substrate) and the glass substrate 40 (CF substrate) are arranged opposed to each other. A negative-type liquid crystal material 60 having negative dielectric constant anisotropy is sealed among these substrates. Thus, the liquid crystal display according to the present embodiment is fabricated.

Here, the liquid crystal display according to the present embodiment is characterized mainly by the alignment films 30, 52 formed on the surfaces contacting the liquid crystal material. That is, as shown in FIG. 3, the liquid crystal display according to the present embodiment is characterized in that the alignment film 30 (or the alignment film 52) has weaker vertical alignment restrictiveness in the region where the bank-shaped projection 28 (or the bank-shaped projection 50) is formed than in the other region.

Thus, the vertical alignment restrictiveness of the alignment films 30, 52 on the bank-shaped projections 28, 50 are weakened, whereby the liquid crystal molecules also at the summits of the bank-shaped projections 28, 50 are tilted when a voltage is applied. Accordingly, a higher aperture ratio of the picture element portion can be obtained.

In the bank-shaped projections, the liquid crystal molecules are tilted to directions of extension of the bank-shaped projections, i.e., tilted to vertically to the gap. Accordingly, the liquid crystal molecules are elastically splayed near the edges of the bank-shaped projections, and fine regions like disclination lines, which do not transmit light are generated (refer to FIG. 4A). Near the central part of the bank-shaped projection region, however, a region which transmits light is generated. The picture element region as a whole can have much improved luminance characteristics in comparison with those of the conventional liquid crystal display shown in FIG. 16C (refer to FIG. 4B).

FIG. 5A shows a state of the transmitted light in a case that the alignment restrictiveness on the bank-shaped projections is substantially equal to that of the gap. FIG. 5B shows a state of the transmitted light in a case that the alignment restrictiveness on the bank-shaped projections is weaker than that in the gap. As shown, in the case of FIG. 5B, in which the alignment restrictiveness is weaker on the bank-shaped projections, the regions where the bank-shaped projections are formed also transmit light, and it is found that higher luminance can be obtained (refer to Example 1 and Control 1 which will be described later).

Figure 9:
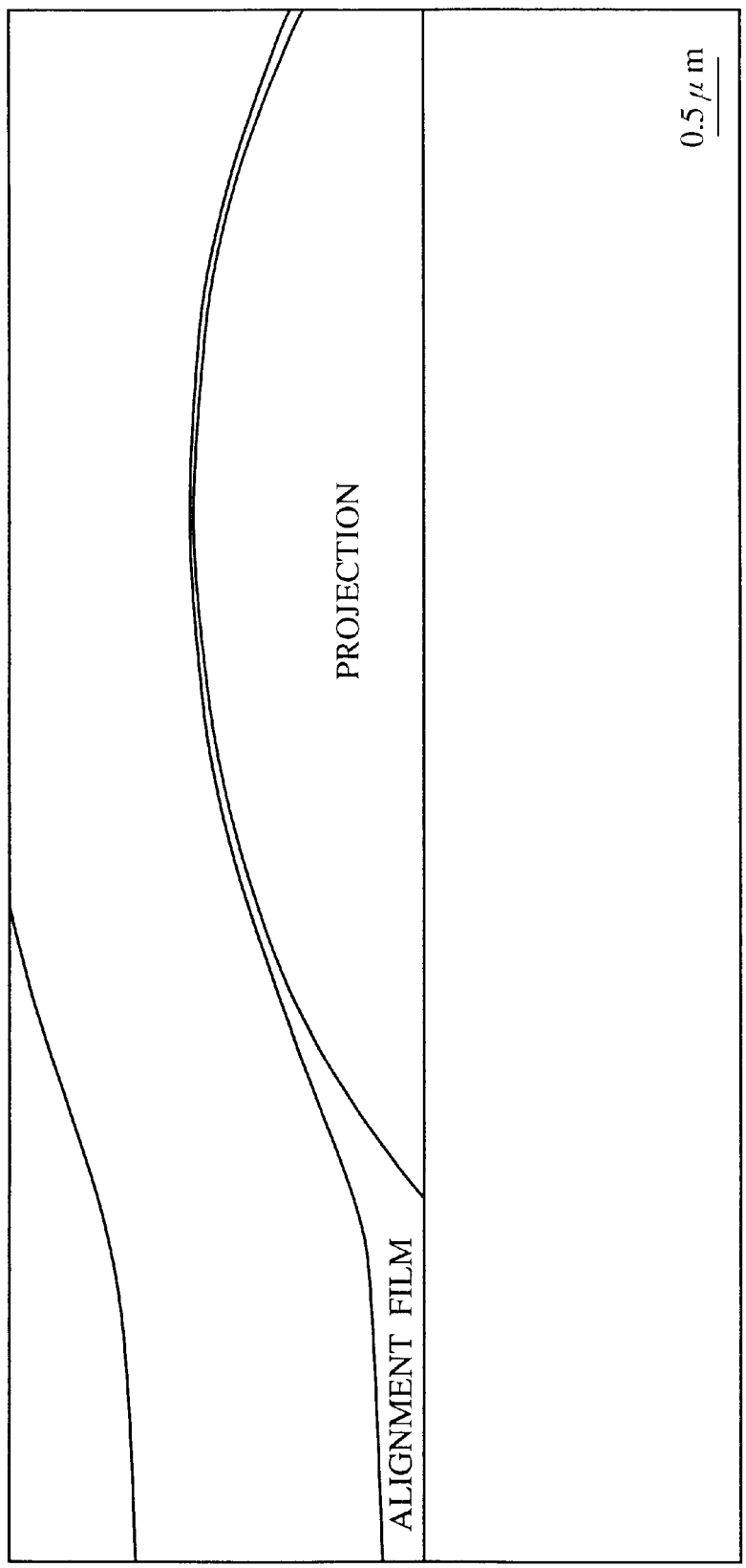
FIG. 9 is a copy of a TEM image showing a sectional shape of a sample having the alignment film thinned on the bank-shaped projections.
Figure 10:
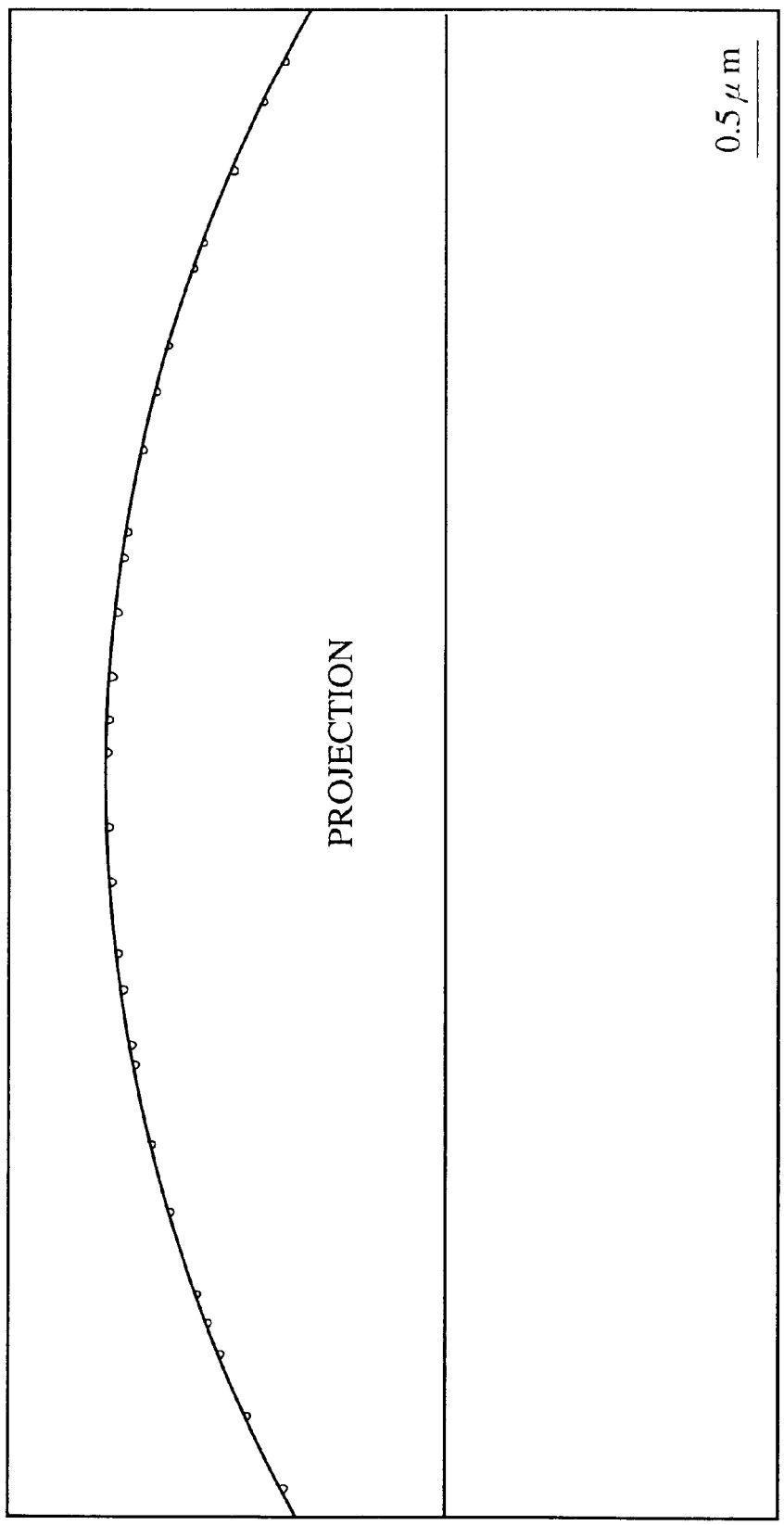
FIG. 10 is a copy of a TEM image showing a sectional shape of a sample having micronized regions where the alignment film is not formed, formed on the bank-shaped projections.
Figure 11A:
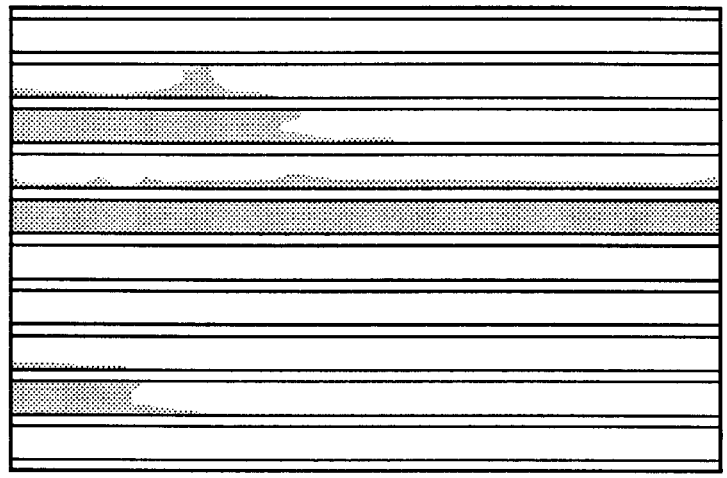
FIGS. 11A and 11B are copies of pictures of states of the transmitted light with a surface tension of the bank-shaped projections changed.
Figure 11B:
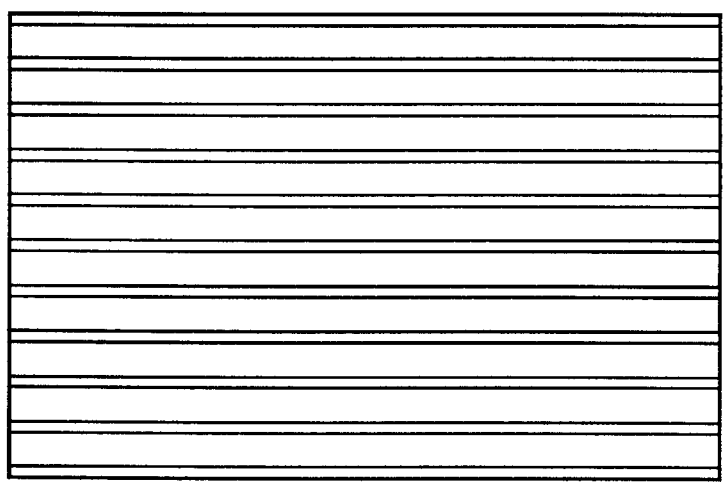
Figure 12:
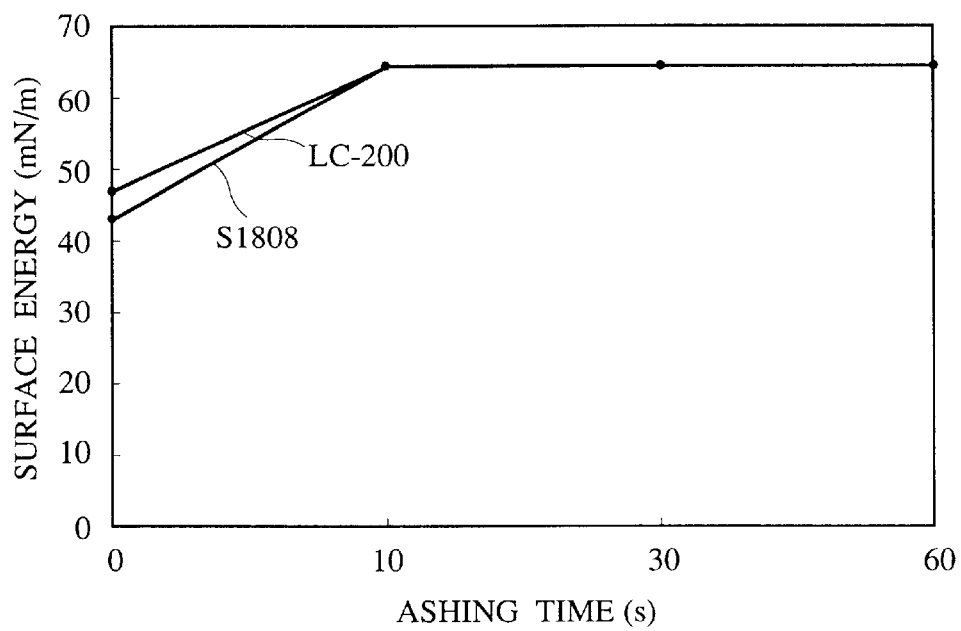
FIG. 12 is a graph showing surface tension changes of the bank-shaped projections by ashing.
Figure 13A:
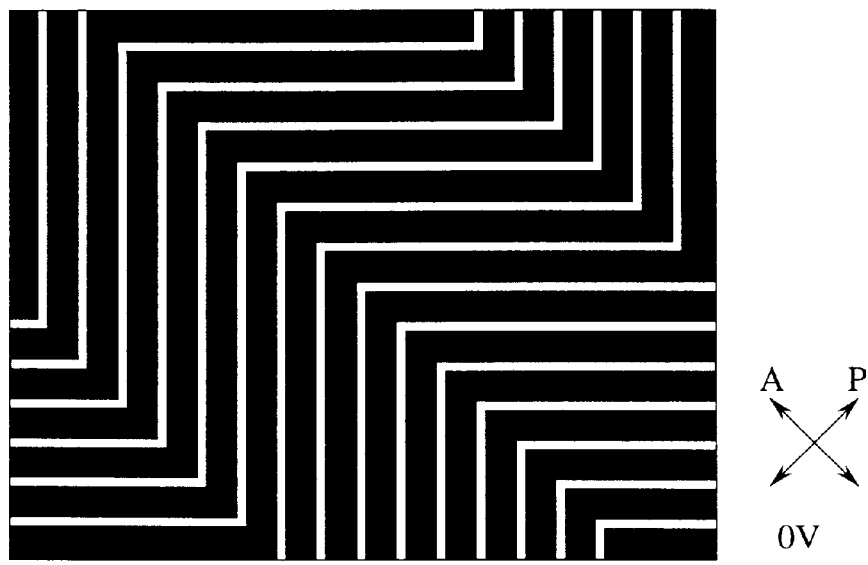
FIGS. 13A–13B are copies of photographic pictures of states of the transmitted light with the prebaking temperature of the alignment film changed.
Figure 13B:

Next, the method for fabricating the liquid crystal display according to the present embodiment will be explained with reference to FIGS. 6 to 13. FIGS. 6A–6C, 7A–7B and 8A–8C are sectional views of the liquid crystal display according to the present embodiment in the steps of the method for fabricating the same, which show the method. FIG. 9 is a copy of a TEM image of a sectional configuration of a sample having the alignment films whose thickness is reduced on the bank-shaped projections. FIG. 10 is a copy of a TEM image of a sectional configuration of a sample having micronized regions, in which the alignment films are not formed, formed on the bank-shaped projections. FIGS. 11A and 11B are views of states of transmitted light in a case that the bank-shaped projections have different surface tensions. FIG. 12 is a graph of changes of the surface tension by ashing treatment. FIGS. 13A and 13B are views of changes of a light transmittance corresponding to changes of a pre-baking temperature of the alignment films.

First a metal film is deposited on a glass substrate 10 and patterned to form the CS electrode 12, and the gate bus line 14 including a gate electrode.

Figure 6A:
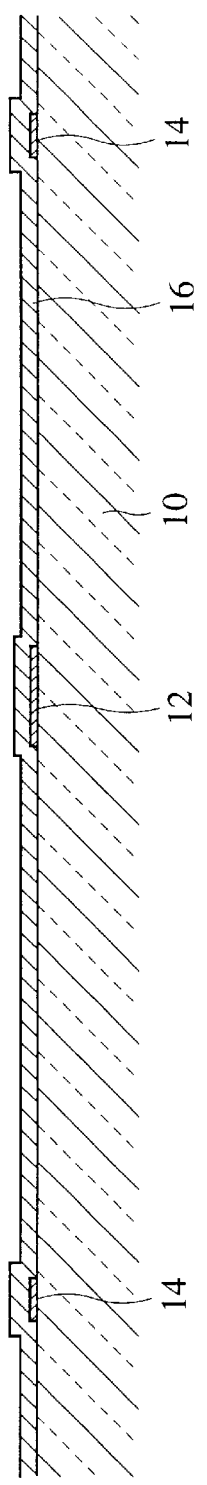
FIGS. 6A–6C are sectional views of the liquid crystal display according to the first embodiment of the present invention in the steps of the method for fabricating the same, which shows the method (Part 1).

Then, an insulation film to be the gate insulation film 16 is formed on the glass substrate 10 with the CS electrode 12 and the gate bus line 14 formed on (FIG. 6A).

Then, a semiconductor layer, such as an amorphous silicon layer, polycrystalline silicon layer or others is formed on the gate insulation film 16 and patterned to form the active layer 18 of the semiconductor layer.

Figure 6B:
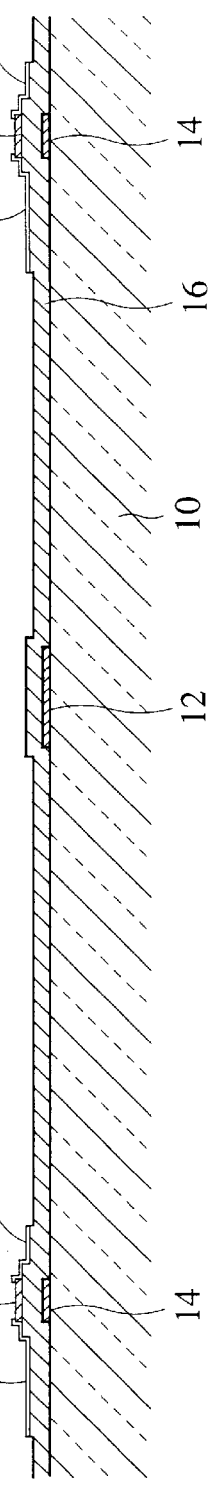

Next, a metal film is deposited on the gate insulation film 16 with the active layer 18 formed on and patterned to form the source electrode 20 connected to one side of the active layer 18, and the drain bus line 22 including the drain electrode and connected to the other side of the active layer 18 (FIG. 6B).

Next, an insulation film is deposited on the entire surface and patterned to form an insulation film 24 having an opening on the source electrode 20.

Figure 6C:
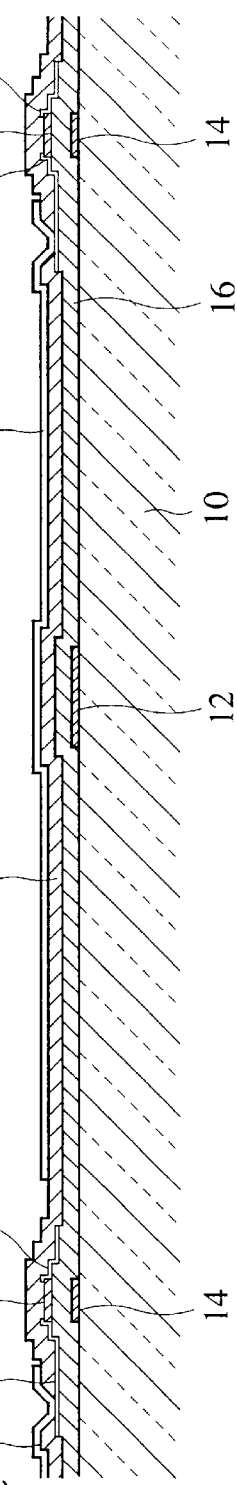

Next, a transparent electrode material, such as an ITO film, is deposited on the entire surface and patterned to form the picture element electrode 26 connected to the source electrode 20 through the opening (FIG. 6C).

Then, the bank-shaped projections 28 are formed on the insulation film 24 and on the picture element electrode 26 (FIG. 7A). The bank-shaped projections 28 may be a resist film patterned by, e.g., the usual photolithography. In forming the bank-shaped projections of a photo-sensitive resin, one which transmits light although it is a little colored. The bank-shaped projections are formed of such material to make the liquid crystal molecules to be easily tilted in the direction of light transmission when a voltage is applied, whereby transmittance loss can be minimized. A photo-sensitive resin may be, e.g., LC-200, S1801 by SIPRAY Co., Ltd. Parameters (configuration of the bank-shaped projections, height, width, gap, etc.) of the bank-shaped projections 28 are important ones which influence luminance of the liquid crystal display. It is preferable that these parameters are suitably selected in accordance with a material of the resist, parameters of the device as a whole, etc.

Then, the alignment film 30 for aligning the liquid crystal molecules vertically is formed on the entire surface. The alignment film 30 may be, e.g., JALS-2008-R2, JALS-684, JALS-684-R3, JALS-2016-R2 by JSR Co., Ltd., or others. The alignment film 30 is formed so that regions where the bank-shaped projections 28 are formed have weaker vertical alignment restrictiveness than the other region. This will be detailed later.

Thus the TFT substrate 10 is formed (FIG. 7B).

On the other hand, to form the CF substrate 40 including a color filter (CF), first a metal film is deposited on a glass substrate 40 and patterned to form the black matrix layer 42 for light shield.

Then, a CF resin layer 46 of a prescribed color is formed on the glass substrate with the black matrix layer 42 formed on, which is in a prescribed region (FIG. 8A).

Next, an ITO film is deposited on the glass substrate 40 with the CF resin layer 46 and the black matrix layer 42 formed on and patterned to form the common electrode 48.

Next, the bank-shaped projections 50 are formed on the common electrode 48 by the same method for forming the bank-shaped projections 28 on the substrate 10. The bank-shaped projections 50 has a pattern which is bent zigzag and offset by a half pitch from the bank-shaped projections 28 as exemplified in FIG. 1 (FIG. 8B).

Next, the alignment film 52 having weaker vertical alignment restrictiveness in the regions where the bank-shaped projections 50 are formed than in the other region is formed on the common electrode 48 with the bank-shaped projections 50 formed on, by the same forming method for forming the alignment film 30 formed on the substrate 10.

Thus, the CF substrate is formed (FIG. 8C).

Subsequently, the TFT substrate and the CF substrate are adhered to each other with a liquid crystal material sealed there between, and the liquid crystal display is completed.

Here, the method for fabricating the liquid crystal display according to the present embodiment is characterized mainly in that a method for selectively weakening vertical alignment restrictiveness of the alignment films 30, 52 on the bank-shaped projections 28, 50 are made. The following three methods for selectively weakening vertical alignment restrictiveness of the alignment films 30, 52 are considered.

In a first one of the methods, the alignment films 30, 50 on the bank-shaped projections 28, 50 are made thinner than those in the gaps between the bank-shaped projections. The alignment films have a characteristic that the alignment films of even a some nm-thick or a smaller thickness exhibit vertical alignment, but the vertical alignment restrictiveness is weaker in comparison with that of the alignment films of a larger thickness. Accordingly, the alignment films 30, 50 are thus formed, whereby the vertical alignment restrictiveness of the alignment films 30, 52 on the bank-shaped projections 28, 50 can be selectively weakened.

Generally, in forming a film on a substrate with bank-shaped projections formed on, the film is thinner on the bank-shaped projections than in other region. This physical property is used to selectively thin the alignment films 30, 52 on the bank-shaped projections 28, 50. In forming the alignment films 30, 52 by, e.g., spin coating method, a configuration of the bank-shaped projections and a rotation number are suitably controlled, whereby a thickness of the alignment films 30, 52 on the bank-shaped projections 28, 50 can be controlled. It is preferable that the alignment films 30, 52 on the bank-shaped projections 28, 50 have an about 0.5–1 nm-thick at the summits of the bank-shaped projections.

FIG. 9 is a copy of a TEM sectional image of a sample having the bank-shaped projections formed by using resist S1801, SIPRAY Co., Ltd. (phonetically spelled) and next the alignment films formed by spin coating JALS-684, JSR Co., Ltd. at a 1500 rpm spinner rotation number, which shows a configuration of the bank-shaped projections. As shown in FIG. 9, the alignment films formed on the bank-shaped projections of an about 8 $\mu$m-width and an about 1.45 $\mu$m-height are about 1 nm-thick at the summits of the bank-shaped projections, which is very thin in comparison with an about 0.3 $\mu$m-thick in the gaps between the bank-shaped projections.

In a second one of the methods, micronized regions where the alignment films 30, 52 are not formed on the bank-shaped projections 28, 52 are formed. In the regions without the alignment films 30, 52 formed in the liquid crystal molecules are not subject to vertical alignment restriction of the alignment films. The alignment films 30, 52 are thus formed, whereby vertical restrictiveness of the alignment films 30, 52 on the bank-shaped projections 29, 50 can be selectively weakened. In the regions where the alignment films are not formed, the liquid crystal molecules are basically horizontally aligned, but when the regions without the alignment films formed in are micronized, and, addition thereto, the vertical alignment is present around the regions, the regions without the alignment films formed in have vertical alignment because liquid crystal has a continuous structure. Thus, when the region without the alignment films formed in are sufficiently micronized, it causes no problem to form the regions where the alignment films 30, 52 are not formed.

Such state can be formed by, e.g., forming the bank-shaped projections 28, 50 and then making the surfaces of the bank-shaped projections 28, 50 rough by ashing, next forming the alignment films 30, 52 and leaving the alignment films 30, 52 only in the cavities.

FIG. 10 is a copy of a TEM sectional image of a sample having the bank-shaped projections formed by using Resist S1801, SIPRAY Co., Ltd. and roughing the surfaces of the bank-shaped projections by plasma-ashing for 10 minutes, and the alignment films formed by spin-coating JALS-684, JSR Co., Ltd. at a 2000 rpm spinner rotation number, which shows a configuration of the bank-shaped projections. As shown, a number of micronized cavities are formed in the summits of the bank-shaped projections, and the alignment films are buried in the cavities.

In a third one of the methods the alignment films 30, 52 are treated to thereby weaken vertical alignment restrictiveness in prescribed regions.

Generally, when UV radiation is applied to the alignment film material, alkyl chains of vertical alignment components can be broken, whereby a state of weak vertical alignment restrictiveness can be realized. Accordingly, UV radiation is applied selectively to the alignment films 30, 52 in the regions with the bank-shaped projections 28, 50 formed in, whereby regions where vertical alignment restrictiveness is weak can be selectively formed. To selectively applying UV radiation, the UV radiation may be applied with the region other than the regions with the bank-shaped projections formed in covered with a metal mask or a resist material.

To change a state of an organic substance forming an alignment film material it is effective to apply UV radiation of radio frequency and of high energy for high efficiency. For example, a light source having a peak at an 250 nm frequency band, e.g., a short arc-type xenon mercury lamp can be used.

When the bank-shaped projections 28, 50 have low surface tension, the alignment films 30, 52 on the bank-shaped projections 28, 50 are gathered to the edges upon baking the alignment films 30, 52, and substantially none of the alignment films 30, 52 are left on the bank-shaped projections 28, 50, and the horizontal alignment often takes place when no voltage is applied. Light leakage due to this is a cause for low contrast and inhomogeneous display. To prevent this it is preferable to make a treatment for surface tension increase of the bank-shaped projections. For example, the treatment can be made by ashing following the formation of the bank-shaped projections 28, 50.

FIGS. 11A and 11B are views showing relationships between surface tensions of the bank-shaped projections and light transmittances. FIG. 11A is a view of transmitted light of a sample upon application of a voltage, which has the bank-shaped projections formed of Resist LC-200, SIPRAY Co., Ltd. in a 1.5 μm-height and the alignment films formed by spin coating JALS-684, JSR Co., Ltd at a 2000 rpm spinner rotation. FIG. 11B is a view of transmitted light of a sample upon application of a voltage, which has the bank-shaped projections formed of resist LC-200, SIPRAY Co., Ltd. in a 1.5 μm-height, has a surface tension of the bank-shaped projections improved by 10 seconds of plasma ashing, and has the alignment films formed by spin coating JALS-684, JSR Co., Ltd. at a 2000 rpm spinner rotation number. The bank-shaped projections of the sample shown in FIG. 11A had an about 46 mN/m surface tension, and those of the sample shown in FIG. 11B had an about 65 mN/m.

As shown, it is found that the sample of FIG. 11A, whose surface tension is not improved, has regions in parts of the gaps between the bank-shaped projections, having lower light transmittance, and the alignment of the alignment films is disturbed. Such phenomenon was not found in the sample of FIG. 11B having improved surface tension. The same observation was made on light transmittance without application of a voltage. The result was that in the sample having the surface tension not improved, substantially none of the alignment films remained on the bank-shaped projections, and the bank-shaped projections transmitted light, but such phenomenon was not found in the sample having the improved surface tension.

In the bank-shaped projection material studied by the inventors of the present application, a surface tension of the bank-shaped projections without ashing was below 50 mN/m. The effect of improving the surface tension will be produced by a little ashing. Accordingly, the surface treatment for the surface tension of the bank-shaped projections having a surface tension of above 50 nM/m will produce the above-described effect.

FIG. 12 is a graph of changes of a surface tension (surface energy) caused by ashing. In the drawing, "S1808" indicates resist S1808, SIPRAY Co., Ltd. was used as a material of the bank-shaped projections, and "LC-200" indicates resist LC-200, SPRAY Co., Ltd. was used. As shown, to obtain a surface tension of above 50 nM/m, ashing of an about 10 second may be performed (refer to Example 2 and Control 2 which will be described later).

Application of UV radiation, especially application of excimer UV, can improve the surface tension without reducing a height of the bank-shaped projections 28, 50.

The alignment films 30, 52 can be left on the bank-shaped projections 28, 50 without the use of above-described treatment on the bank-shaped projections 28, 50 by setting low a temperature of prebaking following the formation of the alignment films 30, 52 to slowly disperse the solvent.

FIGS. 13A and 13B are views of relationships between prebaking temperatures and light transmittances. In FIG. 13A the prebaking was performed at 80° C. In FIG. 13B the prebaking was performed at 30° C. As shown, it is found that in the sample subjected to the prebaking at 80° C. the bank-shaped projections transmitted light, and substantially none of the alignment films remain on the bank-shaped projections, while the sample subjected to the prebaking at 30° C. does not have such region, and the alignment film sufficiently remain also on the bank-shaped projections (refer to Example 3 and Control 3 which will be described later). As described above, a temperature of the prebaking following the formation of the alignment films 30, 52 is below 80° C., preferably below 50° C.

In the liquid crystal display, typically in the liquid crystal display of the MVA mode, in which a surface structure is used to control alignments in the entire surface of the display region, especially anchoring energy exerted to the liquid crystal molecules in the alignment film surfaces is much involved in luminance of the liquid crystal display. In the MVA mode as well, too strong vertical alignment restrictiveness in the gaps makes it difficult for the liquid crystal molecules near the interfaces between the alignment films and the liquid crystal to tilt, retaining their vertical alignment, which makes it accordingly difficult for the liquid crystal molecules in bulk to tilt. Resultantly, a voltage at which a transmittance begins to be saturated becomes high, which leads to low luminance and contrast in actual drive.

To improve this disadvantage it is preferable to decrease by one stage alignment restrictiveness of the alignment film as a whole.

As a treatment for weakening the alignment restrictiveness of the alignment films as a whole, in addition to the above-described application of UV radiation, pure water cleaning may be used. The pure water cleaning, such as post rubbing cleaning, can remove foreign objects which have stayed in the treatment during the cleaning, which is very effective for higher fabrication yields (refer to Example 4 which will be explained later).

To weaken alignment restrictiveness by application of UV radiation, as described above, it is effective to apply UV radiation of radio frequency and high energy. For example, a light source having a peak near a 250 nm wavelength band, e.g., a xenon mercury lamp of short arc-type may be used. It is preferable that detailed conditions for the UV radiation application and the pure water cleaning are suitably adjusted in accordance with alignment film materials and required vertical alignment restrictiveness.

As described above, in the liquid crystal display of MVA mode according to the present embodiment vertical alignment restrictiveness of the alignment films in the regions where the bank-shaped projections are formed is selectively weakened, whereby liquid crystal molecules are easily tilted upon application of a voltage, and more light can be transmitted through the bank-shaped projection regions. That is, the liquid crystal display of MVA-mode can have improved luminance.

The present invention is not limited to the above-described embodiment and can cover other various modifications.

In the above-described embodiment the present invention has been explained by means of a TFT-LCD, but is not essentially applied to the TFT-LCD. The present invention is applicable to other liquid crystal displays. That is, the present invention is characterized in that vertical alignment restrictiveness of the alignment films is distributed so that the disadvantage caused by the bank-shaped projections for restricting tilt directions of the liquid crystal molecules can be removed, and is applicable also to a LCD of the simple matrix mode as long as the liquid crystal display has such bank-shaped projections.

In the above-described embodiment the bank-shaped projections are arranged zigzag to restrict the tilting directions of the liquid crystal molecules to 4 directions, but the arrangement pattern of the bank-shaped projections is not limited to that of the above-described embodiment. For example, the bank-shaped projections may be arranged in stripes to restrict the tilting direction of the liquid crystal molecules to two directions.

In the above-described embodiment, the present invention is applied to the liquid crystal display having the bank-shaped projections formed on both of the TFT substrate and the CF substrate, but it is not necessary to form the bank-shaped projections on both substrates. The present invention is applicable also to a liquid crystal display having the bank-shaped projections formed only on one of the substrates.

EXAMPLES RELATED TO THE FIRST EMBODIMENT

Example 1

The bank-shaped projections were formed of resist LC-200, SIPRAY Co., Ltd. as a bank-shaped projection material in a 1.5 µm-height, a 7.5 µm-width and a 15 µm-gap. Then, alignment films having micronized regions without the alignment films formed on the bank-shaped projections to thereby weaken vertical restrictiveness were formed of JALS-2008-R2, JSR Co., Ltd. as an alignment film material. Thus, a quartered MVA evaluation cell was fabricated. The cell had a 3.5 µm-thick.

Alignment states were observed on the thus fabricated evaluation cell. No light leakage was generally observed when no voltage was applied. When 5 [V] was applied, the liquid crystal molecules on the bank-shaped projections tilted in the direction of extension of the bank-shaped projections. A large transmitted light amount could be obtained generally on the picture elements (refer to FIG. 5B).

Control 1

An evaluation cell having all the bank-shaped projections coated with the alignment films for uniform vertical alignment restrictiveness was prepared. The bank-shaped projections and the alignment films were formed of the same bank-shaped projection material and alignment film material as in Example 1.

Alignment states were observed on thus fabricated evaluation cell. When no voltage was applied, no light leakage was generally observed as was in Example 1. However, when 5 [V] was applied, the liquid crystal molecules on the bank-shaped projections remained vertically aligned. Transmitted light in the bank-shaped projection regions was decreased (refer to FIG. 5A).

Example 2

The bank-shaped projections were formed of resist LC-200, SIPRAY Co., Ltd. as a bank-shaped projection material in a 1.5 µm-height, a 7.5 µm-width and a 15 µm-gap. Then, ashing was performed to increase a surface energy of the bank-shaped projections up to 60 mN/m. Next, the alignment films for coating the bank-shaped projections were formed of JALS-684, JSR Co., Ltd. as an alignment film material.

Thus, a quartered MVA evaluation cell was fabricated. The cell had a 3.5 µm-thick.

Alignment states were observed on the thus fabricated evaluation cell. Idealistically, when no voltage is applied, an alignment on the bank-shaped projections were vertical, and when a voltage is applied, the alignment is tilted in the direction of extension of the bank-shaped projections.

JALS-2016-R2, which vertical alignment restrictiveness is weaker than JALS-684, is used, and a surface energy was increased to 65 mN/m. The same alignment state could be obtained. S1801, SIPRAY Co., Ltd. is used in place of the above-described material. Substantially the same result could be obtained.

Control 2

The evaluation cell of Example 2 was fabricated without an ashing treatment following the patterning of the bank-shaped projections.

Even when no voltage is applied, the liquid crystal molecules on the bank-shaped projections are aligned horizontal, and light leakage took place. At this time, a surface energy of the resist film was measured and was about 45 mN/m.

The alignment films were formed of JALS-684-R3 and printed in place of spin coating. The same result could be obtained.

Example 3

The bank-shaped projections were formed of resist LC-200, SIPRAY Co., Ltd. as a bank-shaped projection material in a 1.5 μm-height, a 7.5 μm-width and a 15 μm-gap. Then, JALS-684 as an alignment film material was applied and prebaked at 30° C. on a hot plate, and the alignment films were formed. A recommendable baking temperature for the alignment films was 80° C. An alignment film thickness in the gaps was 45 nm. Thus, a quartered MVA evaluation cell was fabricated. The cell had a 3.5 μm-thick.

Alignment states were observed on the thus fabricated evaluation cell. When no voltage was applied, the liquid crystal molecules on the bank-shaped projections retained vertical alignment, and generally no light leakage took place. When a voltage was applied, idealistically the liquid crystal molecules tilt in the direction of extension of the bank-shaped projections, and a large transmitted light amount could be generally obtained (refer to FIG. 13B).

With the alignment films applied thick by about 10–20 nm, the same alignment state could be realized with a baking temperature of 50° C.

Control 3

The evaluation cell of Example 3 was fabricated with a prebaking temperature for the alignment films set to be 80° C.

Alignment states were observed on the thus fabricated evaluation cell. With no voltage applied, the liquid crystal molecules on the bank-shaped projections are already aligned horizontal, and light leakage took place in the bank-shaped projection regions (FIG. 13A).

Example 4

The bank-shaped projections were formed of resist LC-200, SIPRAY Co., Ltd. as a bank-shaped projection material in a 1.5 μm-height, a 7.5 μm-width and a 15 μm-gap. As an alignment film material, JALS-684-R3, which has high viscosity, was used to coat the bank-shaped projections with the alignment film in a remarkable thickness. Then, ultrasonic cleaning with pure water was performed for 20 minutes. Thus, a quartered MVA evacuation cell was fabricated. For comparison, an evaluation cell was fabricated without the cleaning. The cells had a 3.5 μm-thick.

Figure 14:
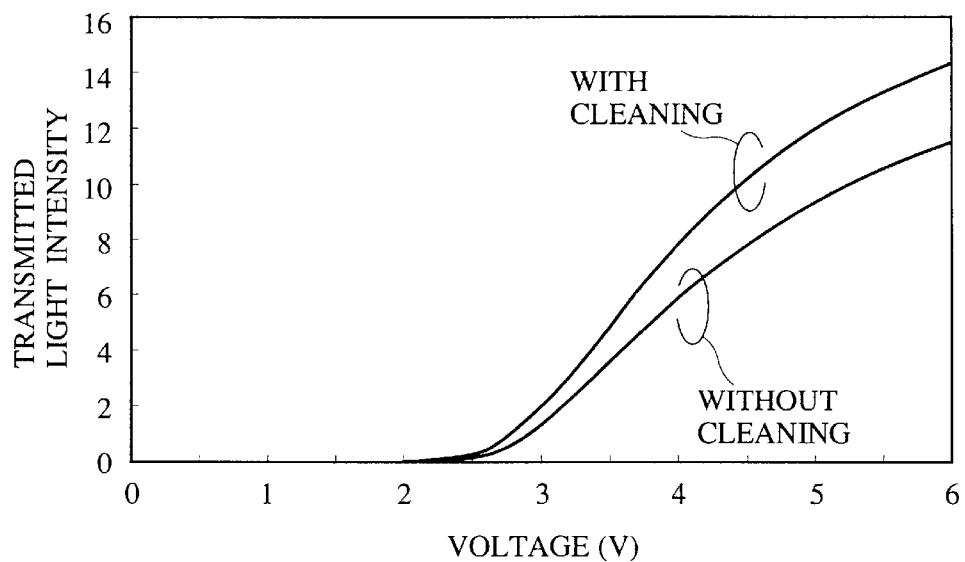
FIG. 14 is a graph showing light transmittance changes of the picture elements as a whole in the case that cleaning is performed and in the case that the cleaning is not performed.
Figure 15A:
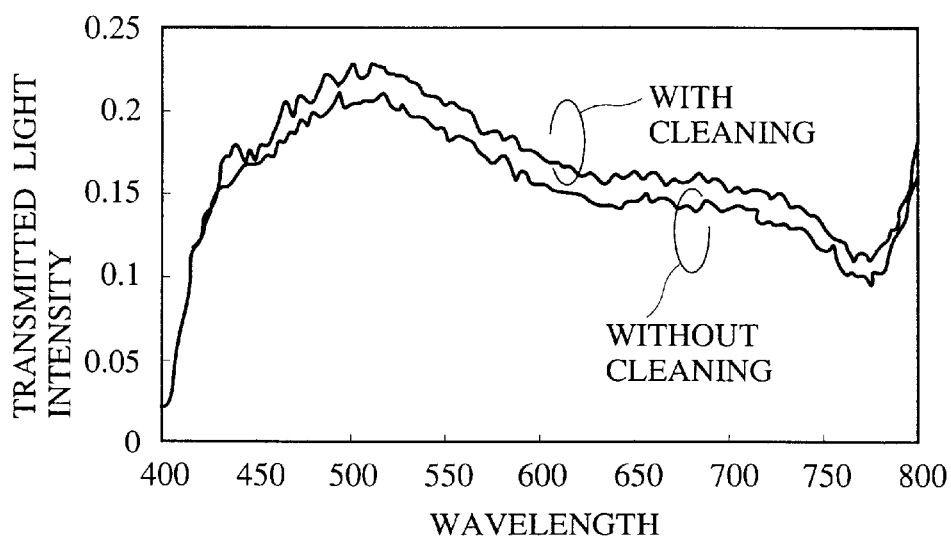
FIGS. 15A–15B are graphs showing light transmittance changes in the case that cleaning is performed and in the case that the cleaning is not performed.
Figure 15B:
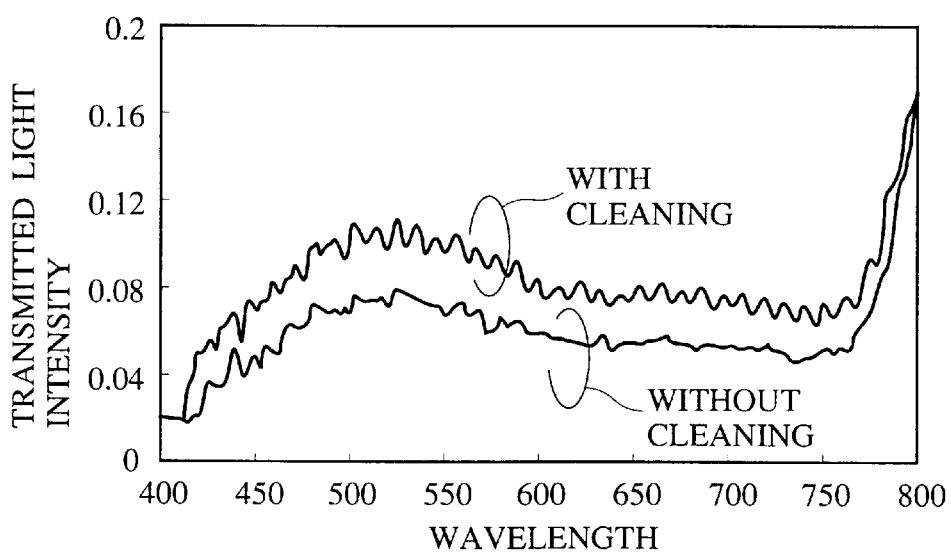

An average transmitted light intensity of display picture elements was measured on the thus fabricated evaluation cells. The cleaning resulted in about 22% increase with a 5 [V] voltage applied (FIG. 14). The center of the gap and the bank-shaped projections were separated by a 15 μm-spot system, and transmitted light intensities upon application of a 5 [V] voltage were measured in wavelength spectrum values. It was confirmed that the cleaning made the tilt easier at the gap (FIG. 15A) and on the bank-shaped projections (FIG. 15B). Application of UV radiation produced the same effect.

A Second Embodiment

The liquid crystal display according to a second embodiment of the present invention will be explained with reference to FIGS. 16 and 17A–17C.

Figure 16:
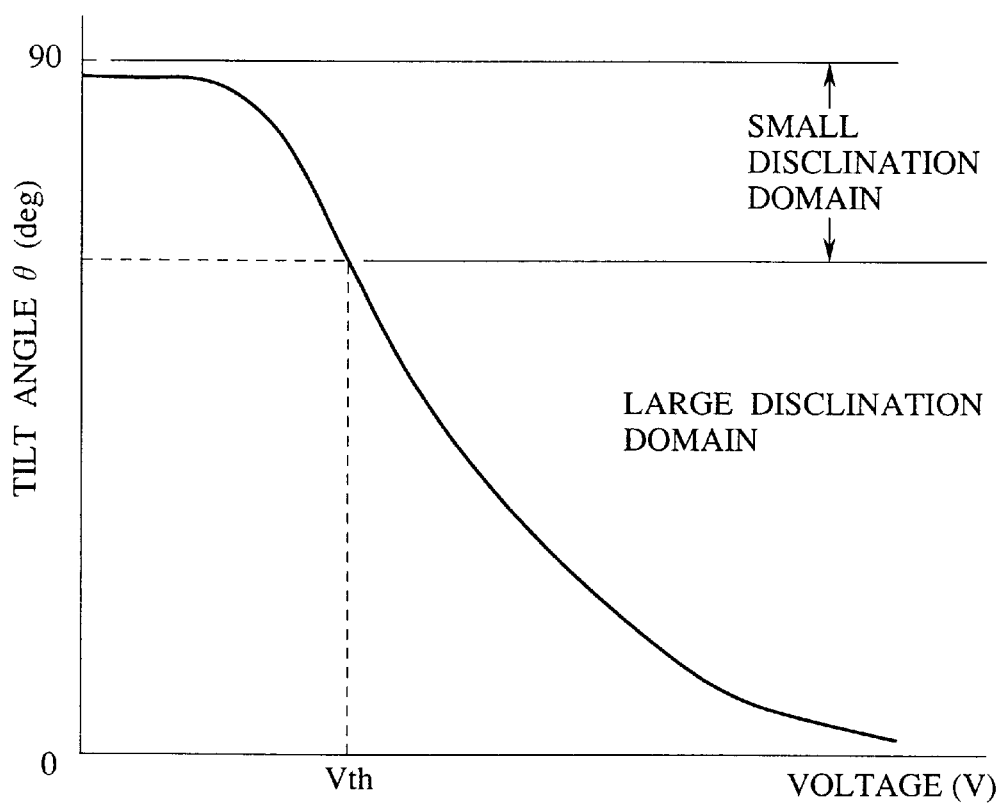
FIG. 16 is a graph showing relationships between tilt angles of the liquid crystal molecules and applied voltages.
Figure 17A:
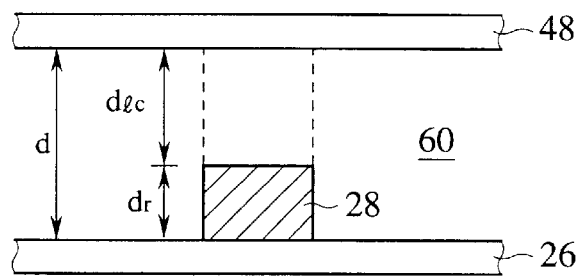
FIG. 17A is a partial sectional view of the liquid crystal display according to a second embodiment of the present invention.
Figure 17B:
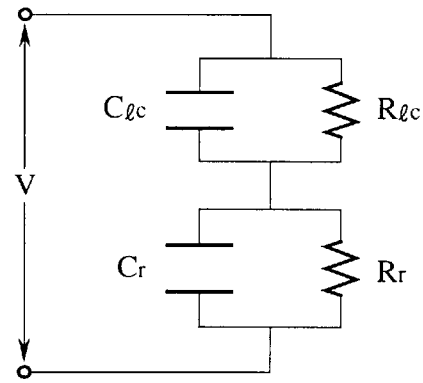
FIGS. 17B–17C are circuit diagrams of the liquid crystal display according to a second embodiment of the present invention.
Figure 17C:
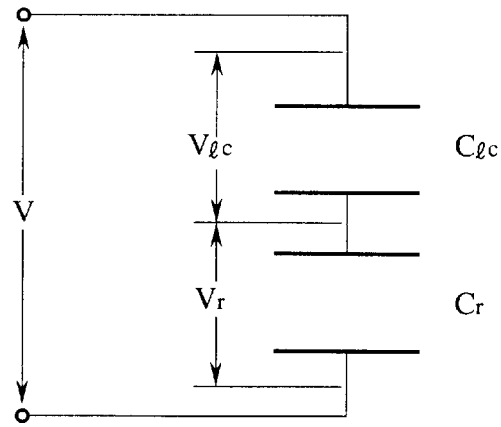

FIG. 16 is a graph showing relationships between tilt angles of the liquid crystal molecules and applied voltages. FIG. 17A is a partial sectional view which explain a structure of the liquid crystal display according to the present embodiment. FIGS. 17B and 17C are circuit diagrams which explain a structure of the liquid crystal display according to the present embodiment. The same members of the present embodiment as those of the liquid crystal display according to the first embodiment are represented by the same reference numbers not to repeat or to simplify their explanation.

The liquid crystal display according to the present embodiment is of the MVA mode as shown in FIGS. 1 and 2, and in the liquid crystal display a voltage to be applied to the liquid crystal layer 60 on the bank-shaped projections 28, 50 is suitably controlled for transmittance improvement of the panel. Specifically, a voltage to be applied to the liquid crystal layer 60 on the bank-shaped projections 28, 50 is controlled in a drive voltage range of the liquid crystal display to be substantially equal to or below a liquid crystal threshold voltage, whereby generation of disclination domains is depressed to depress transmittance decrease due to alignment disorders.

As shown in FIG. 16, a tilt angle of the liquid crystal molecules decreases as an applied voltage increases, which is accompanied by domain increase. If a voltage to be applied to the liquid crystal layer can be lowered and especially to a voltage below a liquid crystal threshold voltage, tilt of the liquid crystal molecules can be sufficiently depressed, and disclination domains can be depressed weak. Accordingly, parameters of the liquid crystal display are controlled so that such voltage can be selectively applied to the liquid crystal molecules on the bank-shaped projections, whereby the panel can have a higher transmittance.

Various methods for selectively applying different voltages to the liquid crystal molecules on the bank-shaped projections are considered. What are considered are, e.g., a method for restricting a height of the bank-shaped projections to a prescribed height; a method for restricting a thickness of the alignment films to be a prescribed thickness; a method for selectively enhancing vertical alignment of the alignment films on the bank-shaped projections; a method for interposing high-resistance electrode layers between the bank-shaped projections and the electrodes; and other methods.

In the present embodiment, the liquid crystal display using the method for restricting a height of the bank-shaped projections to be a prescribed height will be described. The liquid crystal display using the other method will be described in the embodiments which will be described later.

A voltage applied to the liquid crystal molecules on the bank-shaped projections is attenuated to some extent by the bank-shaped projections. When a height of the bank-shaped projections is small, an attenuation margin of a voltage is small, whereby the liquid crystal is much tilted. Strong domains are generated, and alignment disorders are induced outside the banks. On the other hand, when the bank-shaped projections have a sufficient height, an attenuation margin of a voltage is large, and tilt of the liquid crystals is small. Disclination domains are depressed weak, and alignment disorders are not easily induced outside the banks. When a voltage applied to the liquid crystal layer is substantially equal to or below a liquid crystal threshold voltage, as shown in FIG. 16, improvement of the transmittance of the panel is saturated. Accordingly, a voltage to be applied to the liquid crystal layer on the bank-shaped projections is controlled to be equal to or below a liquid crystal threshold voltage, whereby disclination domains can be depressed to be weak.

Then, in the present embodiment a liquid crystal display having the bank-shaped projections of a prescribed height to thereby control a voltage to be applied to the liquid crystal layer on the bank-shaped projections to be equal to or below a liquid crystal threshold voltage will be explained.

In the liquid crystal display shown in FIG. 2, the regions where the bank-shaped projections are formed have the sectional structure shown in FIG. 17A. That is, a picture element electrode 26 and a common electrode 48 are opposed, sealing a liquid crystal therebetween. A bank-shaped projection 28 is formed on the picture element electrode 26. A region where a bank-shaped projection is formed is present also on the common electrode 48 and is the same as that on the picture element electrode 26. The region is omitted.

In this structure, when an electric circuit formed between the picture element electrode 26 and the common electrode 48 is considered, as shown in FIG. 17B, the liquid crystal layer 60 and the bank-shaped projection 28 are considered each a composite circuit combining a resistance and a capacitor. In the drawings, $R_c$ represents a resistance of the liquid crystal layer; $R_r$, a resistance of the bank-shaped projection; $C_c$, a capacitance of the liquid crystal layer; and Cr, a capacitance of the bank-shaped projection.

In the circuit shown in FIG. 17B, considering sufficiently high resistance values of the liquid crystal layer 60 and the bank-shaped projection 28 upon application of alternate current, current flowing through the resistance circuit is ignorably trivial. Accordingly an equivalent circuit of the sectional structure shown in FIG. 17A can be approximate to the serial connection of the capacitor shown in FIG. 17C. When a drive voltage of the liquid crystal display is represented by V, a voltage Vlc applied to the liquid crystal layer on the projection is determined by the following formula.

$$V_{lc} = \{C_r/(C_r + C_{lc})\}V \quad (1)$$

The capacitance $C_{lc}$ and the capacitance $C_r$ are represented by the following formula $$C_{lc} = \epsilon_o \epsilon_{lc} S/d_{lc}, \; C_r = \epsilon_o \epsilon_r S/d_r \quad (2)$$

when a specific dielectric constant of the liquid crystal layer is represented by $\epsilon_o$; an area of a region where the bank-shaped projection is formed, S; a thickness of liquid crystal layer, $d_{lc}$; and a thickness of the bank-shaped projection, $d_r$. When Formula 1 is substituted by Formula 2, the following formula can be given.

$$V_{lc} = \{\epsilon_r d_{lc}/(\epsilon_r d_{lc} + \epsilon_{lc} d_r)\}V \quad (3)$$

Accordingly, a voltage $V_{lc}$ to be applied to the liquid crystal layer on the bank-shaped projection can be defined by thicknesses and dielectric constants of the liquid crystal layer and the bank-shaped projection. When a dielectric constant of the liquid crystal layer and a thickness of the liquid crystal panel are determined, the voltage $V_{lc}$ can be controlled by the bank-shaped projection to be substantially equal or below a liquid crystal threshold voltage.

Formula 3 contains both a dielectric constant and a film thickness of the resin film, and either or both are controlled to thereby optimize a transmittance. For example, some kinds of the resin film forming the bank-shaped projection, when applied thick, impair uniformity or makes patterning difficult. A thickness of the bank-shaped projection is controlled by a combination of a film thickness and a dielectric constant to thereby obtain high transmittance without making the film so thick.

For the alignment control, a dielectric constant of the bank-shaped projection is lower than that of the liquid crystal. The bank-shaped projection is formed, in many cases, of a high molecular resin because of easy patterning. On the other hand, high molecular resins generally have dielectric constants of above about 0.2, but a dielectric constant of a liquid crystal having negative dielectric constant anisotropy near a liquid crystal threshold voltage is generally in a range of 3.0–5.0. A high molecular resin forming the bank-shaped projection has a dielectric constant in a 2.0–5.0 range. A liquid crystal threshold voltage is generally 2.0–3.0 V. Formula 3 is substituted by these values to give a range of the film thickness dr of the bank-shaped projection which satisfies the above-described conditions. A film thickness $d_r$ of the bank-shaped projection is given in a ratio to a liquid crystal panel thickness $0.3 < d_r/d < 0.6$.

As described above, according to the present embodiment, a film thickness of the bank-shaped projection is controlled so that a voltage to be applied to the liquid crystal layer on the bank-shaped projections is substantially equal to or below a liquid crystal threshold voltage, whereby tilt of the liquid crystal on the bank-shaped projections can be small. Thus, disclination domains can be depressed weak. Transmittance decrease due to the induced alignment disorder outside the bank can be depressed.

A Third Embodiment

The liquid crystal display according to a third embodiment of the present invention will be explained with reference to FIGS. 18A–18B and 19. The same members of the present embodiment as those of the liquid crystal display according to the second embodiment shown in FIG. 17 are represented by the same reference numbers not to repeat or to simplify their explanation.

Figure 18A:
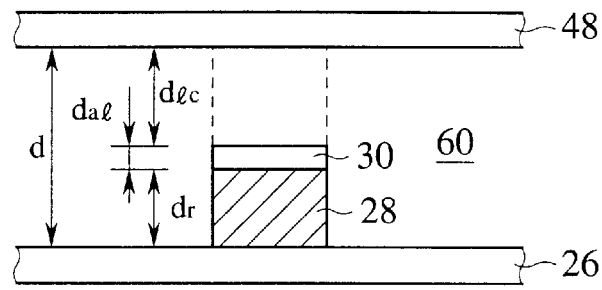
FIG. 18A is a partial sectional view of the liquid crystal display according to a third embodiment of the present invention.

FIG. 18A is a partial sectional view of the liquid crystal display according to the present embodiment, which show a structure thereof. FIG. 18B is a circuit diagram of the liquid crystal display according to the present embodiment, which show a structure thereof. FIG. 19 is a graph of relationships between applied film thicknesses of the alignment films and rotation numbers of a spinner.

In the present embodiment, a liquid crystal display which controls by alignment films formed on bank-shaped projections a voltage to be applied to the liquid crystal on the bank-shaped projections to be equal to or below a liquid crystal threshold voltage will be explained.

The alignment films usually have a sufficiently small thickness in comparison with the liquid crystal layer and the bank-shaped projections, and a voltage component to be attenuated by the alignment films is generally low. Accordingly, in the liquid crystal display according to the second embodiment the alignment films are not considered. However, when the alignment films are formed thick, a value of the alignment film thickness is unignorable and can be a factor, as well as a bank-shaped projection thickness, for controlling a voltage $V_{lc}$ to be applied to the liquid crystal layer.

In this case, the regions where the bank-shaped projections are formed have a sectional structure as shown in FIG.

18A. That is, a picture element electrode 26 and a common electrode 48 are opposed to each other, sealing a liquid crystal 60 therebetween. A bank-shaped projection 28 is formed on the picture element electrode 26, and an alignment film 30 is formed on the bank-shaped projection 28.

Figure 18B:
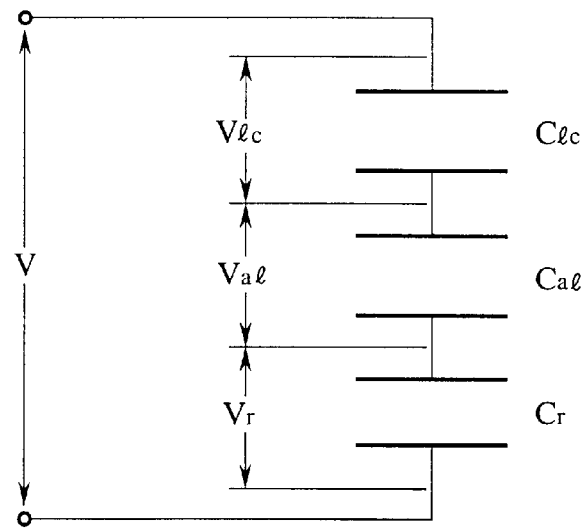
FIG. 18B is a circuit diagram of the liquid crystal display according to a third embodiment of the present invention.
Figure 19:
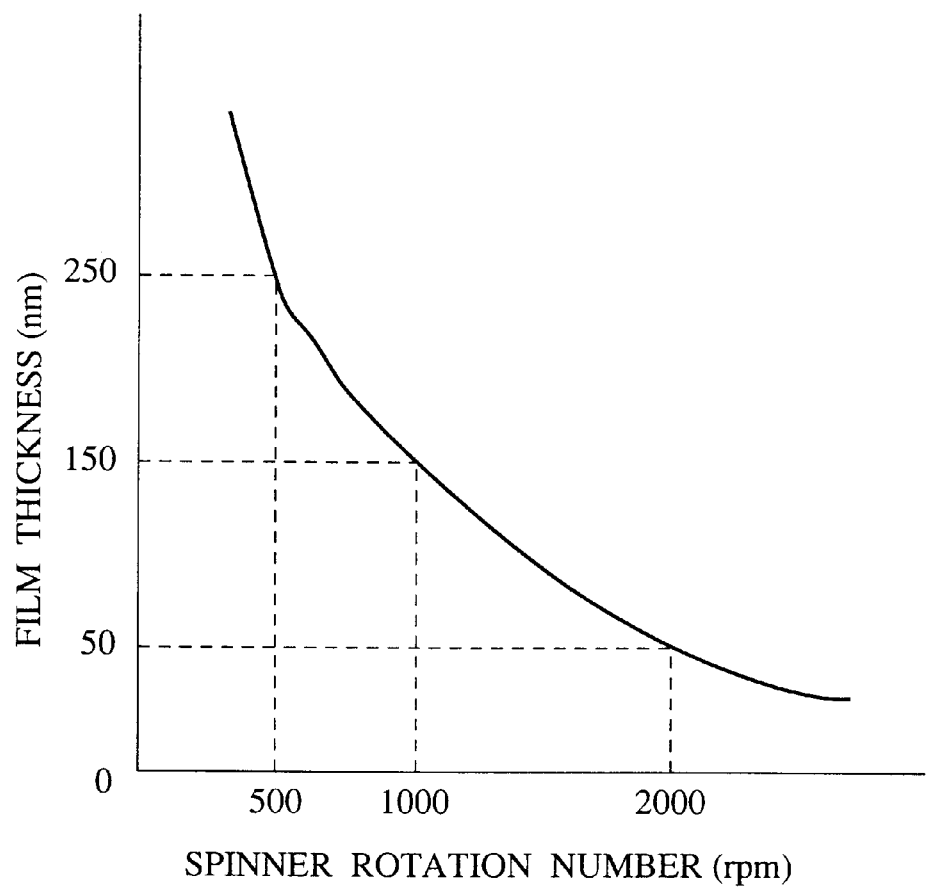
FIG. 19 is a graph showing relationships between applied film thicknesses of the alignment films and spinner rotation numbers.

In this structure, when an electric circuit formed between the picture element electrode 26 and the common electrode 48 is considered, as shown in the second embodiment, an equivalent circuit includes a capacitor provided by the liquid crystal layer 60, a capacitor provided by the alignment film 30, and a capacitor provided by the bank-shaped projection 28 which are serially connected to each other (FIG. 18B). Accordingly, a voltage $V_{lc}$ to be applied to the liquid crystal layer on the alignment film is given by $$V_{lc} = \{\epsilon_{al}\epsilon_r d_{lc}/(\epsilon_r \epsilon_{lc} d_{al} + \epsilon_{al}\epsilon_r d_{lc} + \epsilon_{lc}\epsilon_{al} d_r)\} V \quad (4)$$

wherein $\epsilon_{al}$ represents a specific dielectric constant of the alignment film, and $d_{al}$ represents a film thickness of the alignment film.

Thus, a voltage $V_{lc}$ to be applied to the liquid crystal layer on the bank-shaped projection can be controlled also by a film thickness and a dielectric constant of the alignment film. This allows a voltage $V_{lc}$ to be applied to the liquid crystal layer on the bank-shaped projection to be set substantially equal or below a liquid crystal threshold voltage.

However, when a dielectric constant of the alignment film is different from that of the liquid crystal, phenomena, as of burning, etc. tend to take place. It is preferable to control a transmittance by making a film thickness of the alignment film large. When the alignment film other than that on the bank-shaped projection is made thick, a drive voltage shifts to the lower voltage side, which leads to lower transmittance. It is preferable that the alignment film on the bank-shaped projection is selectively thickened.

The alignment film is formed usually by spin-coating, and a film thickness of the alignment film can be controlled by a rotation number of a spinner. For example, as shown in FIG. 19, an applied film thickness of the alignment film tends to decrease as a rotation number of a spinner increases. For example, to form an applied film thickness of 80 nm, which is conventionally used, the application can be made at an about 1500 rpm rotation number.

Various methods for selectively increasing a thickness of the alignment films are considered. For example, the alignment film of a prescribed thickness is formed on the entire surface, then patterned to be left only on the bank-shaped projection, and is again applied to the entire surface, whereby the alignment film can be thicker on the bank-shaped alignment film than in the other region.

As described above, according to the present embodiment, a film thickness of the alignment film is controlled so that a voltage to be applied to the liquid crystal layer on the bank-shaped projection is substantially equal to or below a liquid crystal threshold voltage, whereby tilt of the liquid crystal on the bank-shaped projection can be small. Accordingly, disclination domains can be weak. Thus, disclination domains can be depressed weak, and accordingly transmittance decrease due to the induced alignment disorder outside the bank can be depressed.

In the present embodiment the alignment film alone is controlled, but both the alignment film and the bank-shaped projection may be controlled, so that a voltage to be applied to the liquid crystal layer on the bank-shaped projection is substantially equal to or below a liquid crystal threshold voltage.

A Fourth Embodiment

The liquid crystal display according to a fourth embodiment of the present invention will be explained with reference to FIGS. 20 and 21. The same members of the present embodiment as those of the liquid crystal display according to the second and the third embodiments shown in FIGS. 17 to 19 are represented by the same reference numbers not to repeat or to simplify their explanation.

Figure 20:
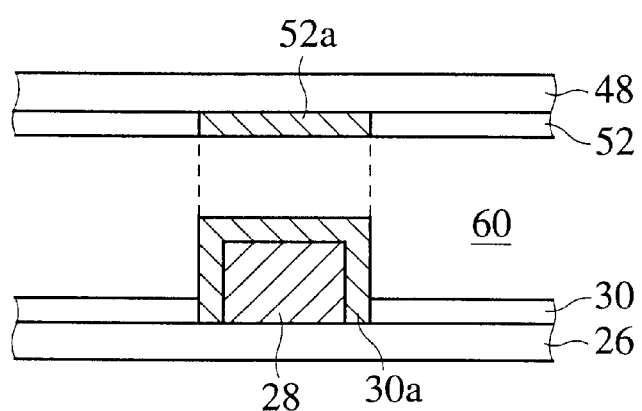
FIG. 20 is a partial sectional view of the liquid crystal display according to a fourth embodiment of the present invention, which shows a structure thereof.
Figure 21:
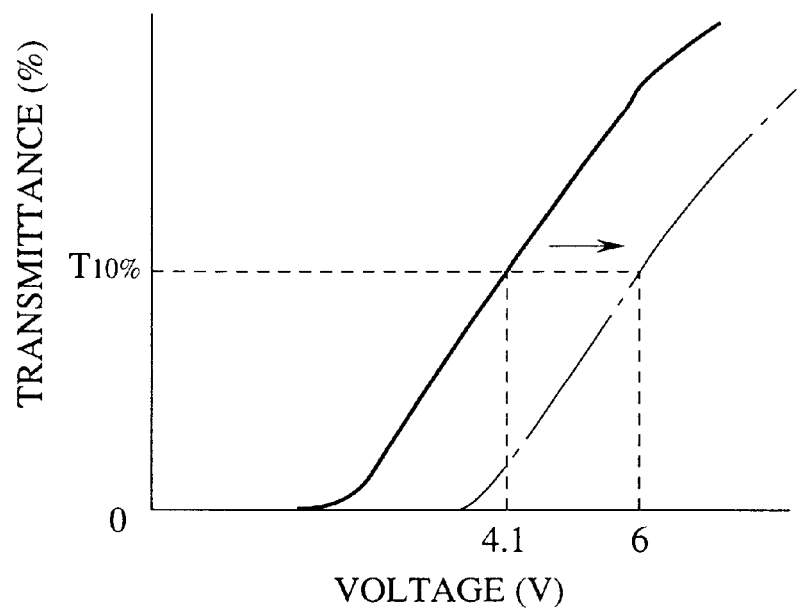
FIG. 21 is a graph showing liquid crystal threshold voltage changes corresponding to vertical alignment restrictiveness changes.

FIG. 20 is a partial sectional view of the liquid crystal display according to the present embodiment, which shows a structure thereof. FIG. 21 is a graph of liquid crystal threshold voltage changes corresponding to vertical alignment changes.

In the present embodiment, a liquid crystal display which controls vertical alignment restrictiveness of the alignment films is controlled to thereby control a voltage to be applied to the liquid crystal on the bank-shaped projections to be substantially equal to or below a liquid crystal threshold voltage.

Alignment of a liquid crystal layer depends on vertical aligning ability of an alignment film. That is, as the alignment film has higher vertical aligning ability, anchoring of the liquid crystal molecules to the alignment film is stronger, which makes alignment difficult upon application of a voltage. Accordingly, vertical aligning ability of the alignment film on the bank-shaped projection is selectively enhanced, whereby it makes difficult for the liquid crystal layer on the bank-shaped projection to be aligned.

That is, as shown in FIG. 20, an alignment film 30a and an alignment film 52a having high vertical aligning ability are formed selectively in regions where the bank-shaped projection 28 is formed, whereby a voltage to be applied to a liquid crystal layer 60 on the bank-shaped projection 28 can be controlled to be substantially equal to or a little below a liquid crystal threshold voltage.

The vertical aligning ability of the aligning films can be enhanced by adding a large amount of a vertical alignment component (polyimide having long alkyl groups on the side chains) to a constituent component of the alignment films. For example, the alignment films contain a vertical alignment component more by about 30% than the conventional alignment film, whereby, as shown in FIG. 21, a voltage at which the transmittance is about 10% of a saturation, i.e., a threshold voltage of the liquid crystal molecules could be raised from about 4.1 [V] to an about 6.0 [V].

The vertical aligning ability of the alignment films on the bank-shaped projection is thus enhanced, whereby the liquid crystal cannot easily tilt in the region where the bank-shaped projection is formed even upon application of a voltage, and a liquid crystal threshold voltage of only the liquid crystal layer on the bank-shaped projection shift to the higher voltage side. Accordingly, a voltage to be applied to the liquid crystal layer on the projection can be controlled to be substantially equal to or below a liquid crystal threshold voltage without attenuating a drive voltage.

Various method for selectively enhancing the vertical aligning ability of the alignment film are considered. For example, an alignment film of high vertical aligning ability is formed on the entire surface and pattered by the usual lithography to leave the alignment film on the bank-shaped projection, and an alignment film of lower vertical aligning ability is again applied, whereby an alignment film having higher vertical aligning ability on the bank-shaped projection than in the other region can be formed.

As described above, according to the present embodiment, the vertical aligning ability of the alignment film is controlled so that a voltage to be applied to the liquid crystal layer on the bank-shaped projection is substantially equal to or below a liquid crystal threshold voltage, whereby tilt of the liquid crystal on the bank-shaped projection can be made small. Accordingly, disclination domains can be weak, and accordingly transmittance decrease due to the induced alignment disorder outside the bank can be depressed.

A Fifth Embodiment

The liquid crystal display according to a fifth embodiment of the present invention will be explained with reference to FIGS. 22A–22B and 23. The same members of the present embodiment as those of the liquid crystal display according to the second to the fourth embodiments shown in FIGS. 17 to 21 are represented by the same reference numbers not to repeat or to simplify their explanation.

Figure 22A:
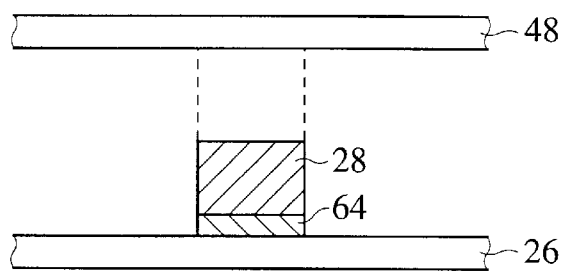
FIG. 22A is a partial sectional view of the liquid crystal display according to a fifth embodiment of the present invention, which show a structure thereof.

FIG. 22A is a partial sectional view of the liquid crystal display according to the present embodiment, which shows a structure thereof. FIG. 22B is a circuit diagram of the liquid crystal display according to the present embodiment, which show a structure thereof. FIG. 23 is a graph of relationships between resistance values of ITO film and oxygen partial pressures for forming the film.

In the present embodiment, a liquid crystal display having a high-resistance electrode layer provided between a bank-shaped projection and an electrode to thereby control a resistance value of the high-resistance electrode layer, whereby a voltage to be applied to the liquid crystal layer on the projection is controlled to be equal to or below a liquid crystal threshold voltage will be explained.

Generally, an electrode material forming the picture element electrode and the common electrode have a sufficiently low resistance, and a voltage component attenuated by these electrodes is ignorable. However, a high electrode resistance makes a value of an attenuated voltage component unignorable and can be a factor for controlling a voltage $V_{lc}$ to be applied to the liquid crystal layer on the bank-shaped projection. The part of the electrode below the bank-shaped projection is treated to be selectively higher resistive, or a high-resistance electrode layer is interposed between the bank-shaped projection and the electrode, whereby a voltage $V_{lc}$ to be applied to the liquid crystal layer on the bank-shaped projection can be controlled.

In such cases, the region where the bank-shaped projection is formed has a sectional structure as shown in FIG. 22A. That is, the picture element electrode 26 and the common electrode 48 are opposed to each other, sealing a liquid crystal 60 therebetween. The bank-shaped projection 28 is formed on the picture element electrode 26, and the high-resistance electrode layer 64 is formed between the bank-shaped projection 28 and the picture element electrode 26.

Figure 22B:
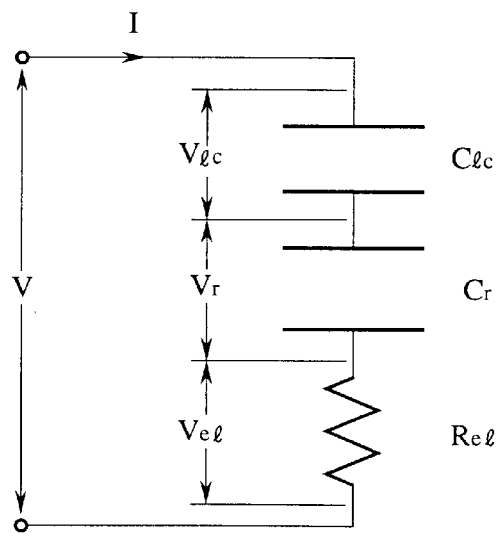
FIG. 22B is a circuit diagram of the liquid crystal display according to a fifth embodiment of the present invention, which show a structure thereof.
Figure 23:
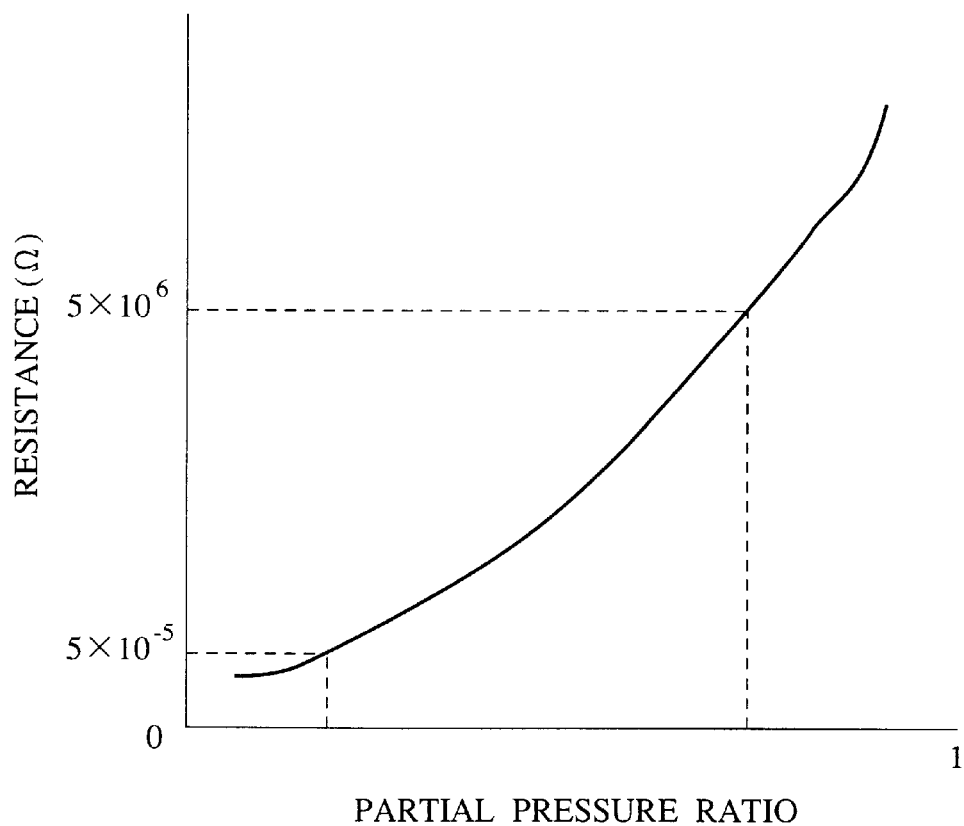
FIG. 23 is a graph showing relationships between resistance values of ITO film and oxygen partial pressures in forming the film.

In this structure, when an electric circuit formed between the picture element electrode 26 and the common electrode 48 is considered, as shown in the second embodiment, an equivalent circuit includes a capacitor provided by the liquid crystal layer 60, a capacitor provided by the bank-shaped projection 28, and the high-resistance electrode layer 64, which are serially connected to each other (FIG. 22B). Accordingly, a voltage $V_{lc}$ to be applied to the liquid crystal layer on the bank-shaped projection is given by $$V_{lc} = \{\epsilon_r d_{lc}/(\epsilon_r d_{lc} + \epsilon_{lc} d_r)\}(V - IR_{el}) \quad (5)$$

wherein $R_{el}$ represents a resistance value of the high-resistance electrode layer, and I indicates current.

Thus, a voltage $V_{lc}$ to be applied to the liquid crystal layer on the bank-shaped projection can be controlled also by the high-resistance electrode layer, whereby a voltage to be applied to the liquid crystal layer on the bank-shaped projection can be set to be substantially equal to or below a liquid crystal threshold value.

The picture element electrode and the common electrode are formed of a transparent electrode material, such as ITO film or others. ITO film permits a resistance value to be controlled by controlling a gas partial pressure in sputtering the ITO film. That is, as shown in FIG. 23, there is a relationship that a resistance value increases of the ITO film increases as a partial pressure ratio of $O_2$ gas with respect to Ar gas ($P_{O_2}/P_{Ar}$). An oxygen partial pressure is given based on a resistance value given by Formula 5, whereby the high-resistance electrode layer of a prescribed resistance value can be formed.

Various methods for selectively forming the high-resistance electrode layer can be considered. For example, a resist pattern for exposing a region for the bank-shaped projection is to be formed is formed by the usual lithography, then a high-resistance ITO film is deposited on the entire surface by sputtering, next the resist pattern is removed together with the ITO film on the resist pattern to leave the ITO film only in the region for the bank-shaped projection to be formed in, whereby the high-resistance electrode layer can be formed selectively only in the region for the bank-shaped projection to be formed in.

As described above, according to the present embodiment, a resistance value of the high-resistance electrode layer is controlled so that a voltage to be applied to the liquid crystal layer on the bank-shaped projection is substantially equal to or below a liquid crystal threshold value, whereby tilt of the liquid crystal can be small. Accordingly, disclination domains can be depressed weak, and accordingly, disclination domains can be weak, and accordingly transmittance decrease due to the induced alignment disorder outside the bank can be depressed.

In the present embodiment, a resistance value of the high-resistance electrode layer alone is controlled, but both a resistance value and the bank-shaped projection are controlled, whereby a voltage to be applied to the liquid crystal layer on the bank-shaped projection is substantially equal to or below a liquid crystal threshold voltage. As in the third embodiment, the alignment films may be additionally considered.

Figure 24A:
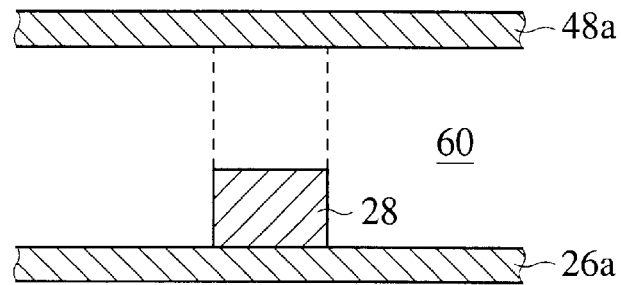
FIGS. 24A–24C are partial sectional views of the liquid crystal displays according to modifications of the fifth embodiment, which show structures thereof.
Figure 24B:
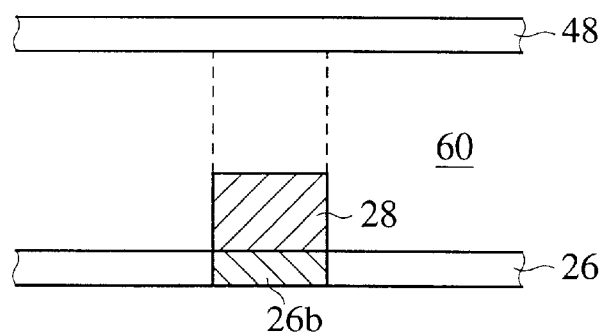

In the present embodiment, the high-resistance electrode layer is interposed between the picture element electrode and the bank-shaped projection, but the present invention is also applicable to the case that the picture element electrode 26 and the common electrode 48 are provided by a picture element electrode 26a and a common electrode 48a generally formed of a high-resistance material (FIG. 24A), and to the case that a high-resistance electrode 26b is formed in a part of the region of the picture element electrode 28 or the common electrode 48 in the region where the bank-shaped projection 28 is formed (FIG. 24B).

Figure 24C:
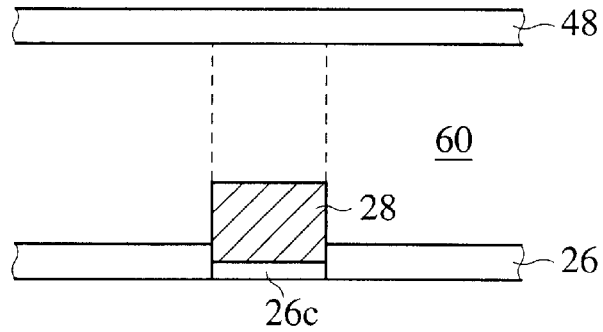

In making a part of the picture element electrode or the common electrode highly resistive, a region 26c in which a film thickness of the electrode is selectively thinned is formed, whereby a high resistance value can be obtained (FIG. 24C).

Examples Related with the Second to the Fifth Embodiments

Examples related with the second to the fifth embodiments will be explained. Characteristic evaluation of the liquid crystal displays according to the following example were made based on an evaluation panel prepared in the following way.

First, bank-shaped projections were formed of an acrylic resin $r_1$ ($\epsilon_{r_1}$=3.2) or an acrylic resin $r_2$ ($\epsilon_{r_2}$=2.6), alternately arranged on an evaluation substrate.

Then, the surface of the thus-formed bank-shaped projections were modified by plasma ashing.

Next, a vertical alignment film ($\epsilon_{al}$=4.3) was applied by a spinner, and after the alignment film was solidified, a cell was assembled.

After the cell assembly, a fluorine-based liquid crystal ($\epsilon_{lc}$=4.15, $V_{th}$=2.43) having negative dielectric constant anisotropy was injected, and an evaluation panel of a d=4.0 μm cell thickness was prepared.

The controls which will be explained in the following examples are evaluation panels having the bank-shaped projections formed under the conventionally used conditions. A bank-shaped projection material was acrylic resin $r_1$. The bank-shaped projection had a 1.4 μm-thick. The alignment film had a 80 nm-thick.

Example 5

A plurality of evaluation panels having the bank-shaped projections of different film thicknesses were formed of acrylic resin $r_1$ in the above-described steps.

When an upper limit of a drive voltage of the liquid crystal display is considered to be about 5 [V], a film thickness $d_{r_1}$ of the bank-shaped projections, which makes a voltage to be applied to the liquid crystal layer on the bank-shaped projections substantially equal to or below a liquid crystal threshold voltage is given by substituting Formula 3 with the above-described respective values.

$$V_{lc} = V_{th} \geq \{\epsilon_{r_1} d_{lc}/(\epsilon_{r_1} d_{lc}+\epsilon_{lc} d_{r_1})\} V$$

$$2.43 \geq \{(3.2\times(4-d_{r_1}))/(3.2\times(431\ d_{r_1})+4.15\times d_{r_1})\}\times 5$$

This formula is solved to give a film thickness $d_{r_1}$ $d_{r_1} \geq 1.80$ μm.

Then, evaluation panels having the bank-shaped projections of acrylic resin ri having respectively film thicknesses $d_1$ of 1.4 μm, 1.6 μm, 1.8 μm and 2.2 μm were prepared. On the respective evaluation panels, transmittance was measured, and alignment was observed.

Figure 25:
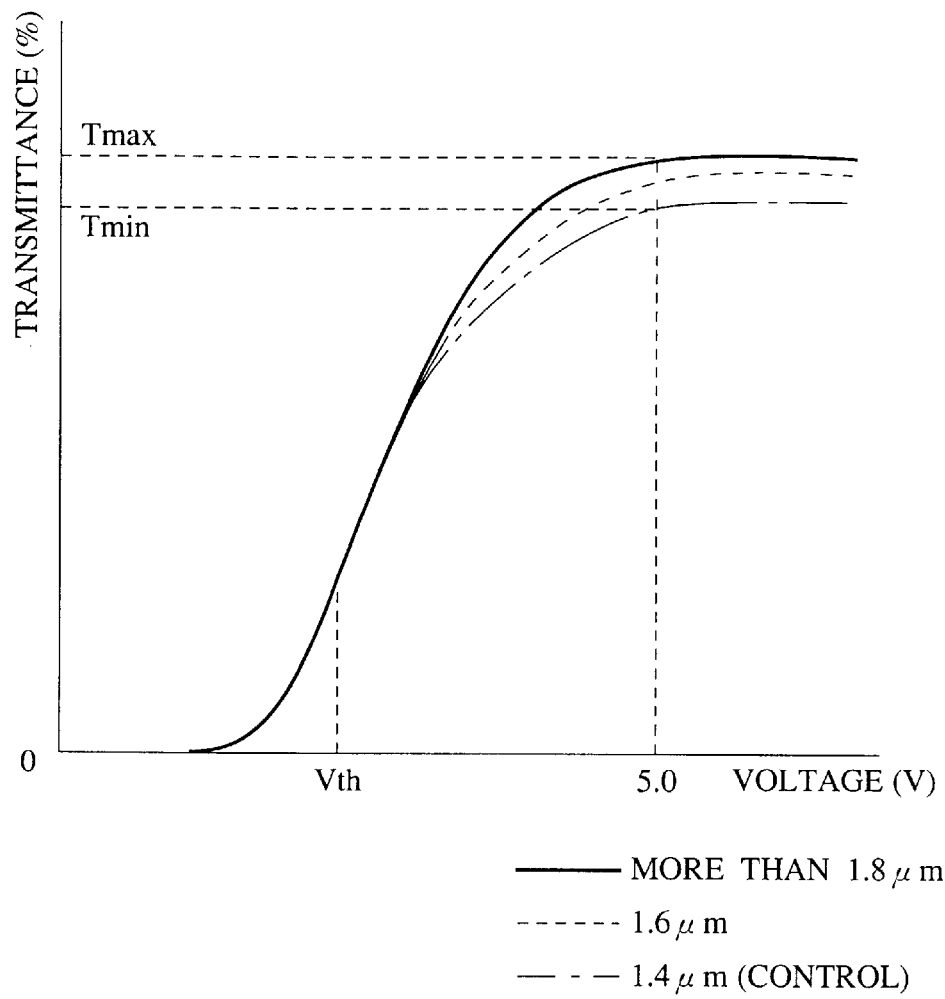
FIG. 25 is a graph showing relationships between transmittances and applied voltages in the evaluation panels of Example 5.

The transmittance measurement shows that, as shown in FIG. 25, a transmittance of the evaluation panels is higher as a film thickness of the bank-shaped projections is larger. Especially, in the case of the bank-shaped projections of an above 1.8 μm-thick, which was given by the above-described computation, a transmittance upon application of the drive voltage was improved by about 6% ($T_{max}/T_{min}$=1.06) in comparison with that in the case of the bank-shaped projections of a 1.4 μm-thick.

The alignment observation shows that, as shown in FIGS. 26A–26C, as a film thickness of the bank-shaped projections is smaller, disclination domains on the bank-shaped projections are more conspicuous, and also alignment disorders outside the banks originating from the disclination domains are larger (FIG. 26A). The disclination domains decrease as a film thickness of the bank-shaped projections increases (FIG. 26B). When a film thickness of the bank-shaped projections is above 1.8 μm, the disclination domains are weak, and alignment disorders outside the banks originating the disclination domains are depressed (FIG. 26C).

Based on the above-described results, it is shown that the bank-shaped projections are formed in a film thickness which is above a film thickness of the bank-shaped projections given by the Formula 3, whereby a voltage to be applied to the liquid crystal on the bank-shaped projections is below a liquid crystal threshold voltage, and accordingly tilt of the liquid crystal is depressed small, and disclination domains are weak.

Example 6

A plurality of evaluation panels having the bank-shaped projections of different film thicknesses were formed of acrylic resin $r_2$ in the above-described steps.

When an upper limit of a drive voltage of the liquid crystal display is considered to be about 5 [V], a film thickness $d_{r_2}$ of the bank-shaped projections, which makes a voltage to be applied to the liquid crystal layer on the bank-shaped projections substantially equal to or below a liquid crystal threshold voltage is given by substituting Formula 3 with the above-described respective values.

$$V_{lc} = V_{th} \geq \{\epsilon_{r_2} d_{lc}/(\epsilon_{r_2} d_{lc}+\epsilon_{lc} d_{r_2})\} V$$

$$2.43 \geq \{(2.6\times(4-d_{r_2}))/(2.6\times(4-d_{r_2})+4.15\times d_{r_2})\}\times 5$$

This formula is solved to give a film thickness $d_{r_2}$ $d_{r_2} \geq 1.59$ μm.

An evaluation panel having the bank-shaped projections of a 1.6 μm formed of acrylic resin $r_2$ was prepared, and transmittance and alignment were measured/observed on the evaluation panel.

The transmittance observation shows that, as shown in FIG. 27, the evaluation panel had a higher transmittance than in the case of the bank-shaped projections of acrylic resin $r_1$ having a 1.4 μm-thick and the case of the bank-shaped projections of acrylic resin $r_1$ having a 1.6 μm-thick. Especially in comparison with the transmittance of the case of the conventional bank-shaped projections of acrylic resin $r_1$ having a 1.4 μm-thick, a transmittance upon application of the drive voltage was improved by about 6%.

The alignment observation shows that alignment disorders were depressed as in Example 5 shown in FIG. 26.

Based on the above-described results, it is shown that the bank-shaped projections are formed in a bank-shaped projection film thickness given by Formula 3, whereby a voltage to be applied to the liquid crystal on the projections is below a liquid crystal display threshold voltage, and accordingly tilt of the liquid crystal is depressed small, and disclination domains are weak.

Example 7

A plurality of evaluation panels having 1.4 μm-thick bank-shaped projections of acrylic resin $r_1$ and having the upper surfaces covered with the alignment films having different film thicknesses from each other were prepared in the same steps as described above.

When an upper limit of a drive voltage of the liquid crystal display is considered to be about 5 [V], a film thickness $d_{al}$ of the bank-shaped projections, which makes a voltage to be applied to the liquid crystal layer on the bank-shaped projections substantially equal to or below a liquid crystal threshold voltage is given by substituting Formula 4 with the above-described respective values.

$$V_{lc} = \{\epsilon_{al}\epsilon_r d_{lc}/(\epsilon_r \epsilon_{lc} d_{al}+\epsilon_{al}\epsilon_r d_{lc}+\epsilon_{lc}\epsilon_{al} d_r)\} V$$

$$1.43 \geq \{(4.3\times 2.6\times(2.6-d_{al}))/(3.2\times 4.15\times d_{al}+4.3\times 3.2\times(2.6-d_{al})+4.15\times 4.3\times 1.4)\}\times 5$$

This formula is solved to give a film thickness $d_{al}$ $d_{al} \geq 460$ nm.

An evaluation panel having 1.4 μm-thick bank-shaped projections of acrylic resin $r_1$, and the alignment film formed on the bank-shaped projections which have an about 500 nm-thick on the bank-shaped projections and an about 80 nm-thick in the other region was prepared, and transmittance and alignment were measured/observed on the evaluation panel.

The alignment film having the selectively increased film thickness was formed in the following steps. First, the alignment film was applied repeatedly to a substrate with the bank-shaped projections formed on, under conditions of about 500–1000 rpm, and the alignment film was formed in an about 420 nm-thick. Then, the alignment film was patterned by the usual lithography so that only the alignment film on the bank-shaped projections was left. Then, the alignment film was again applied to the entire surface under conditions of 1500 rpm. Thus, the alignment film had an about 500 nm-thick on the bank-shaped projections and a 80 nm-thick in the other region.

Figure 28:
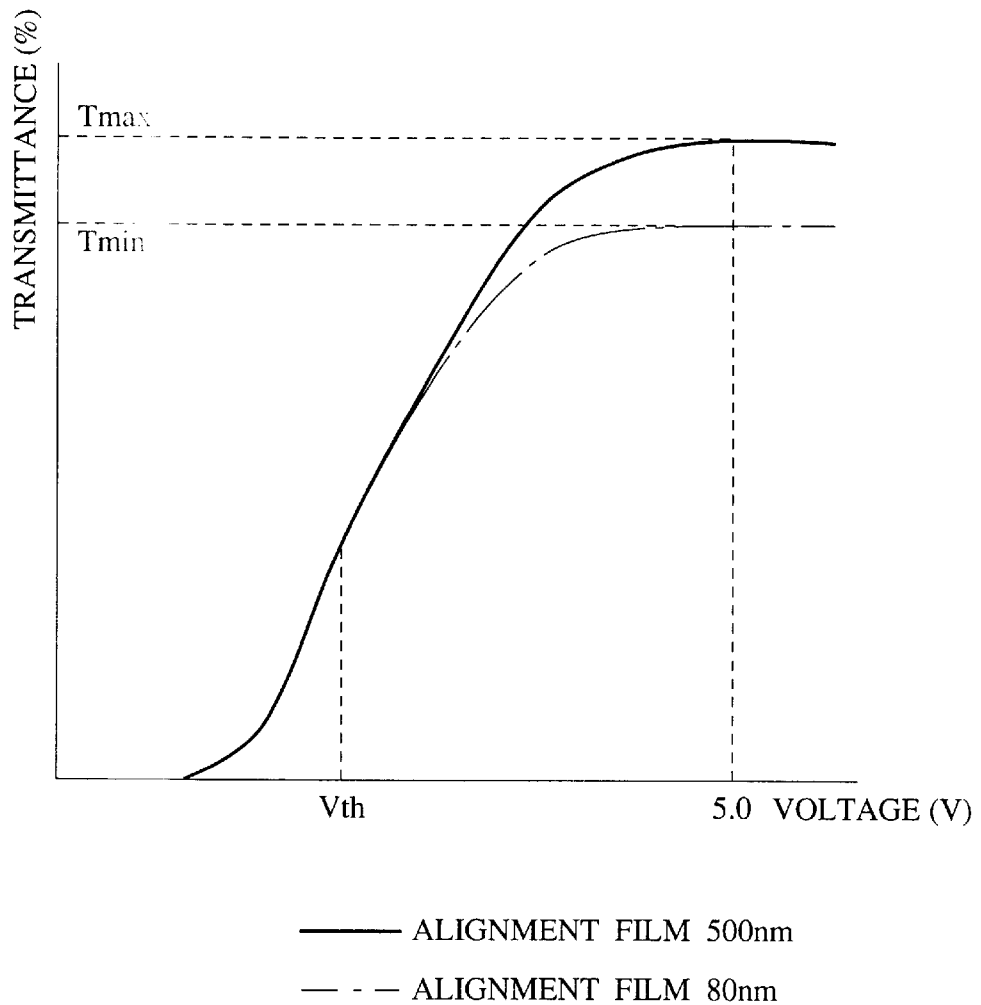
FIG. 28 is a graph showing relationships between transmittances and applied voltages in evaluation panels of Example 7.

Transmittance was measured on the thus-prepared evaluation panel. The measurement result shows that, as shown in FIG. 28, the transmittance upon application of the drive voltage was improved by about 6% in comparison with the transmittance under the conventional conditions of a 80 nm-thick alignment film.

The alignment observation shows that alignment disorder was depressed as in Example 5 shown in FIG. 26.

The above-described result shows that the alignment film is formed in a film thickness of above a value given by Formula 4, so that a voltage to be applied to the liquid crystal on the banks is below a liquid crystal threshold voltage, whereby tilt of the liquid crystal is depressed small, and accordingly disclination domains are weak.

Example 8

Evaluation panels having 1.4 μm-thick bank-shaped projections of acrylic resin $r_1$ and vertical aligning ability in a projection formed region which is different from that in the other region were prepared in the following steps.

That is, an alignment film having an addition ratio of a vertical alignment component (polyimide component having long alkyl groups on side chains) increased by about 30% was selectively formed as the alignment film in the regions where the bank-shaped projections were formed. The alignment film having selectively enhanced vertical aligning ability was formed by first forming the alignment film having higher vertical aligning ability, then patterning the alignment film by lithography to leave the alignment film only on the bank-shaped projections, and again applying the alignment film having lower vertical aligning ability to the entire surface.

Figure 29:
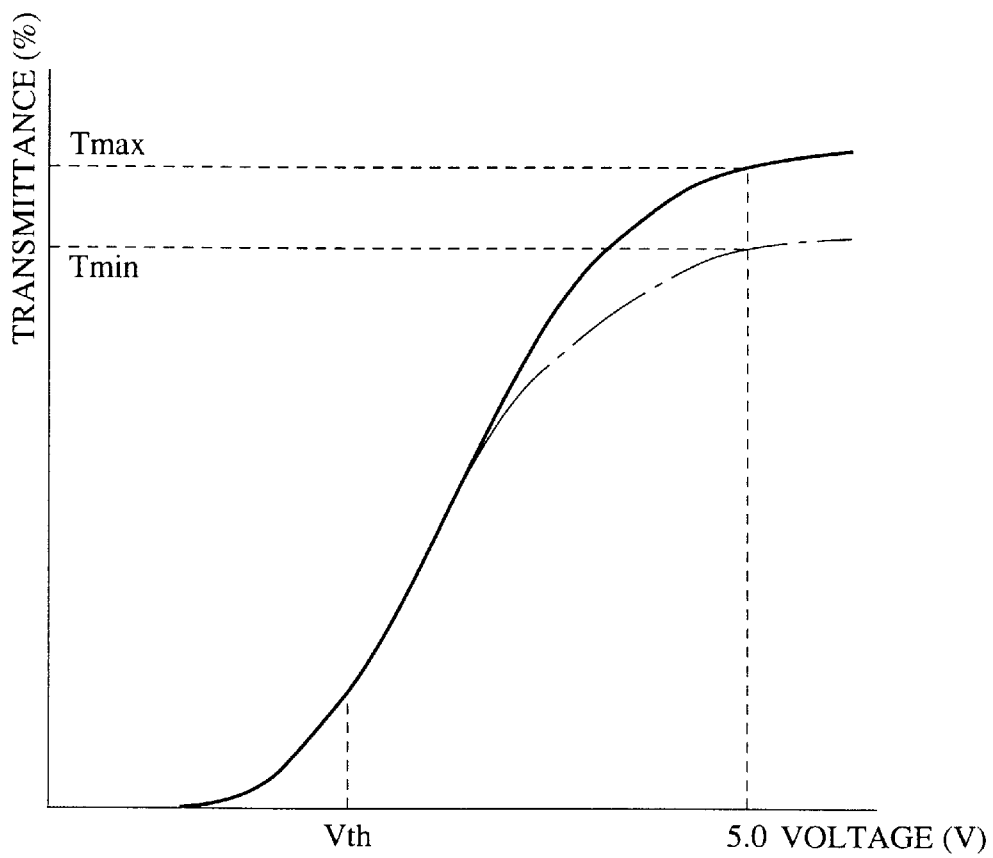
FIG. 29 is a graph showing relationships between transmittances and applied voltages in evaluation panels of Example 8.

On the thus-formed evaluation panel, transmittance and alignment were measured/observed. The transmittance measurement shows that, as shown in FIG. 29, the alignment film having an addition ratio of the vertical alignment component increased by 30% was used, whereby a transmittance upon application of the drive voltage was improved by about 6% in comparison with that of the conventional alignment film.

The alignment observation shows that alignment disorders were depressed as in Example 5 shown in FIG. 26.

The above-described result shows that the alignment film has selectively enhanced vertical aligning ability in the regions where the bank-shaped objections are formed, whereby a voltage to be applied to the liquid crystal liquid on the banks is below a liquid crystal threshold voltage, whereby tilt of the liquid crystal is depressed small, and accordingly disclination domains are weak.

Example 9

A plurality of evaluation panels having 1.4 μm-thick bank-shaped projections of acrylic resin $r_1$ and having different resistance values of the electrode below the bank-shaped projections were formed in the following steps.

When an upper limit of a drive voltage of the liquid crystal display is considered to be about 5 [V], an electrode resistance $R_{el}$, which makes a voltage to be applied to the liquid crystal layer on the bank-shaped projections substantially equal to or below a liquid crystal threshold voltage is given by substituting Formula 5 with the above-described respective values.

$$V_{lc} = \{\epsilon_r d_{lc}/(\epsilon_r d_{lc} + \epsilon_{lc} d_r)\}(V - IR_{el})$$

$$2.43 \geq \{(3.2 \times 2.6)/(3.2 \times 2.6) + 4.15 \times 1.4\} \times (5 - IR_{el})$$

This formula is solved to give a voltage $IR_{el}$ $IR_{el} \geq 0.866$ [V]. Here, when a frequency f of a drive power source is 30 Hz, an area of the projections is 1.0 cm$^2 \times 0.25$, current I is expressed by $I = 2\pi fCV$.

$$I = I_{lc}$$
$$= 2\pi f C_{lc} V_{lc}$$
$$= 2 \times 3.14 \times 30 \times 3.53 \times 10^{-10} \times 2.43$$
$$= 1.62 \times 10^{-7} \text{ [A]}$$

is given. Accordingly, an electrode resistance $R_{el}$ $R_{el} \geq 5.34 \times 10^6$ [Ω] is given.

Then, an evaluation panel having the electrode below the 1.4 μm-thick bank-shaped projections of acrylic resin $r_1$, whose resistance value is $5 \times 10^6$ Ω was prepared. On the evaluation panel, transmittance and alignment were measured/observed.

Figure 30:
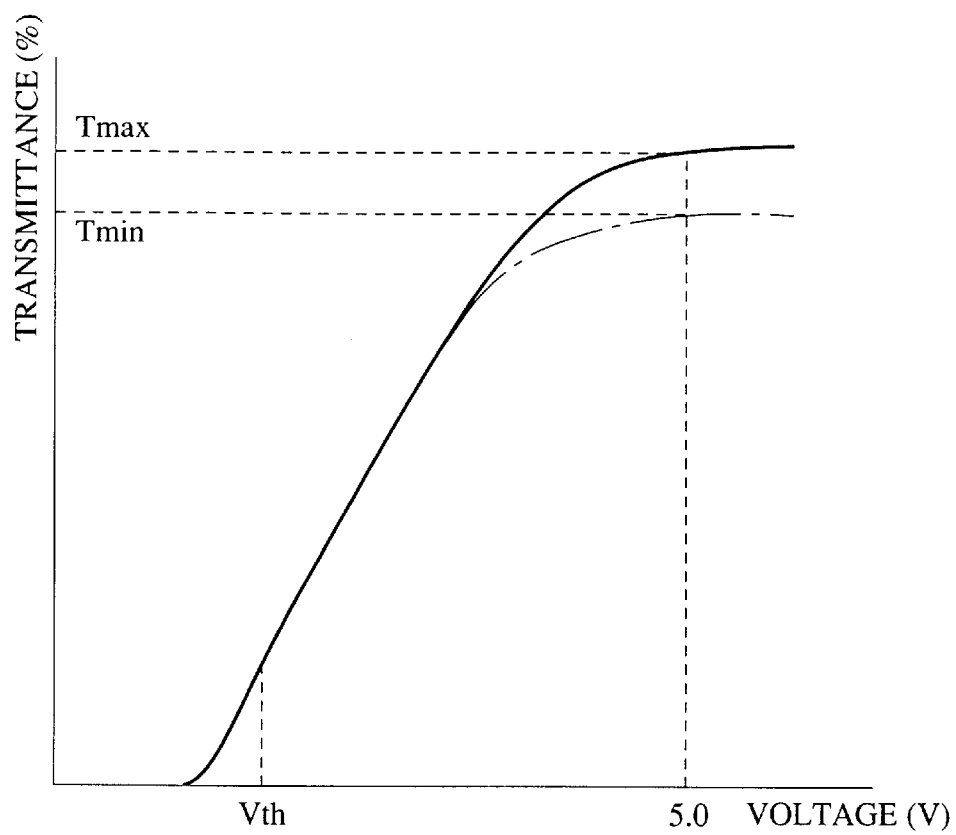
FIG. 30 is a graph showing relationships between transmittances and applied voltages in evaluation panels of Example 9.

The result was that, as shown in FIG. 30, a transmittance of the evaluation panel upon application of the drive voltage was improved by 6% in comparison with that obtained under conventional conditions of a $5 \times 10^{-5}$ Ω electrode resistance.

The alignment observation shows that alignment disorder was depressed as in Example 5 shown in FIG. 26.

Based on the above-described result, the electrode of a resistance value above a resistance value given by Formula 5 is formed below the bank-shaped projections, so that a voltage to be applied to the liquid crystal on the banks is below a liquid crystal threshold voltage, whereby tilt of the liquid crystal is depressed small, and accordingly disclination domains are weak.

A Sixth Embodiment

The liquid crystal display according to a sixth embodiment of the present invention will be explained with reference to FIGS. 31 to 41.

Figure 31:
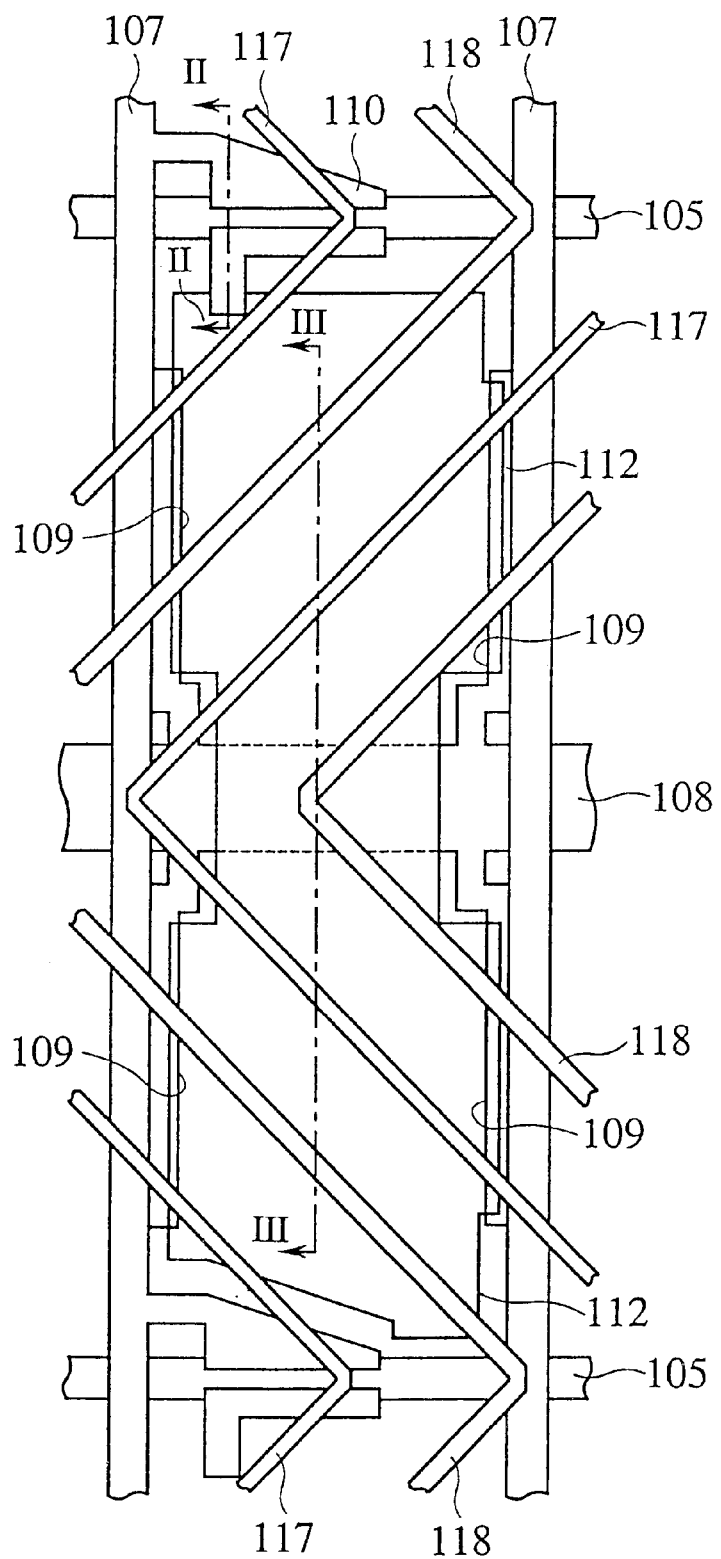
FIG. 31 is a plan view of an MVA-mode liquid crystal display.
Figure 32:
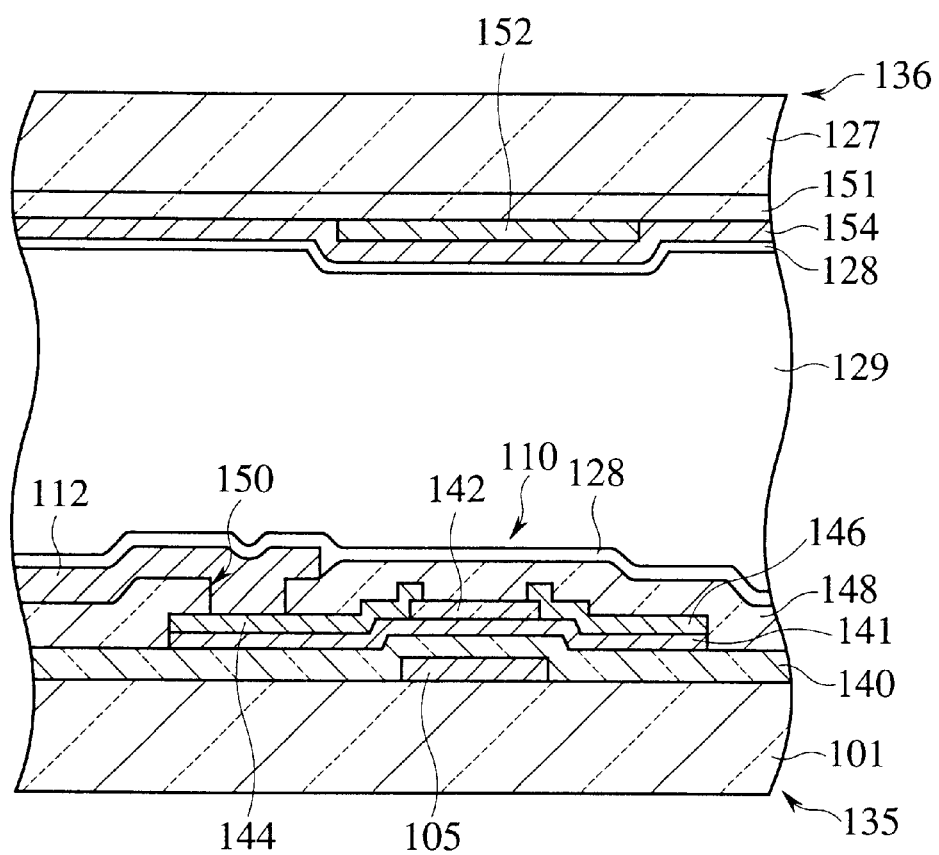
FIG. 32 is a sectional view of the TFT portion of the MVA-mode liquid crystal display.
Figure 33:
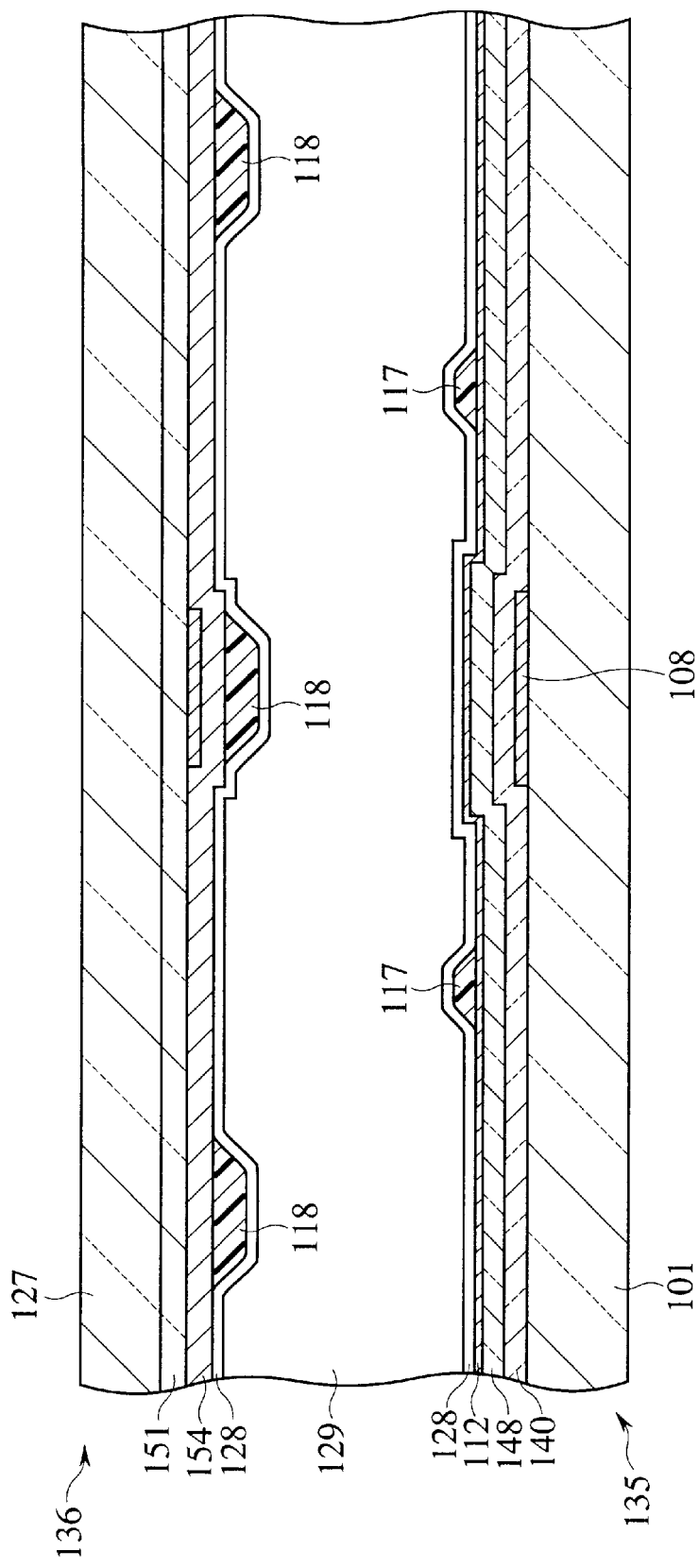
FIG. 33 is a sectional view of the picture element portion of the MVA-mode liquid crystal display.
Figure 34:
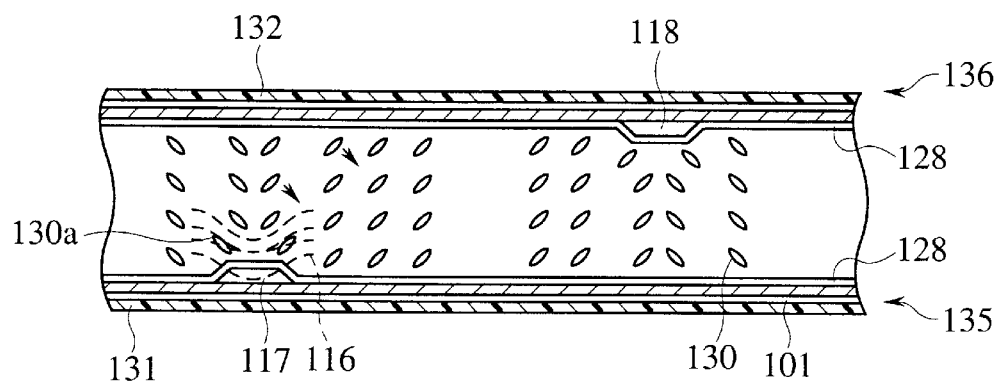
FIG. 34 is a sectional view of the liquid crystal cell of the MVA-mode liquid crystal display, which explains the operational principle thereof.
Figure 35A:
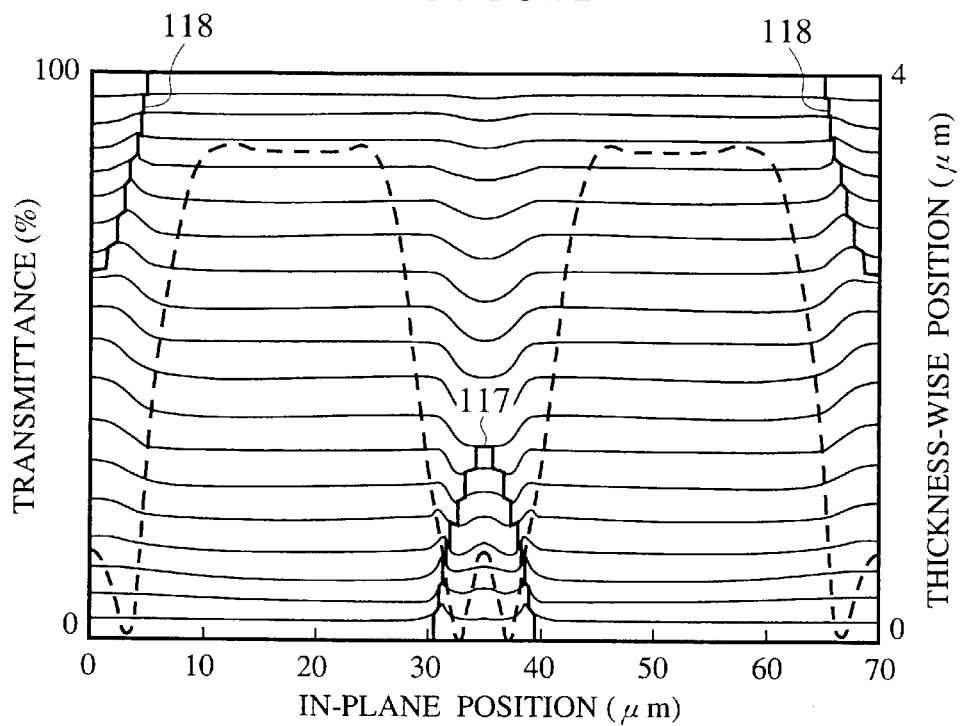
FIGS. 35A–35B are views of simulation results of the transmittance of the prior art and the MVA-mode liquid crystal display of Examples.
Figure 35B:
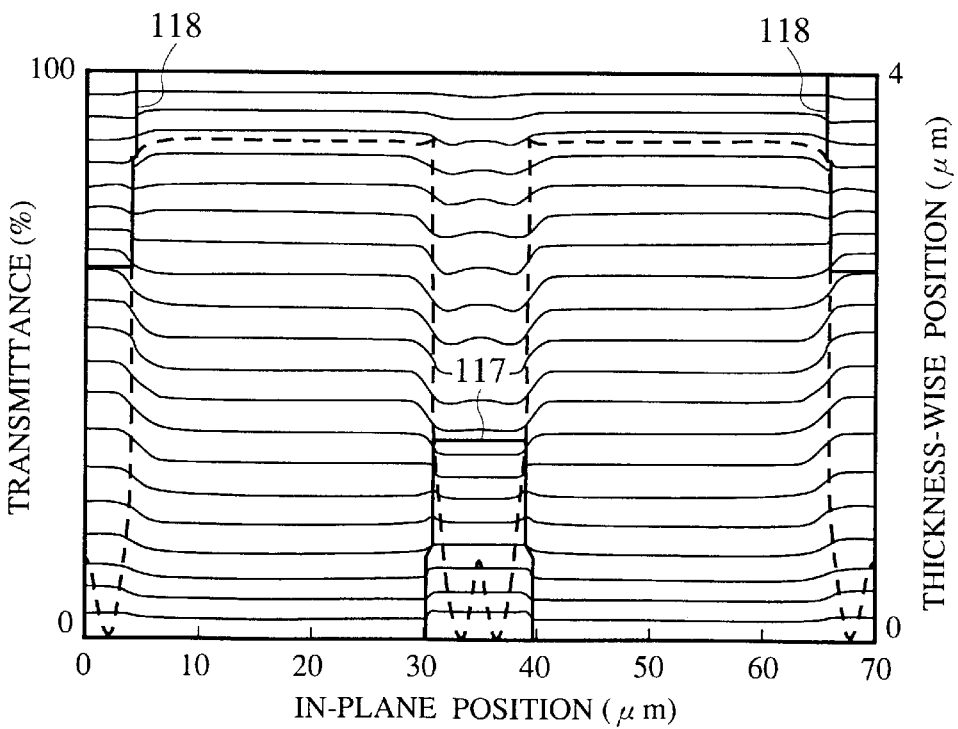
Figure 36A:
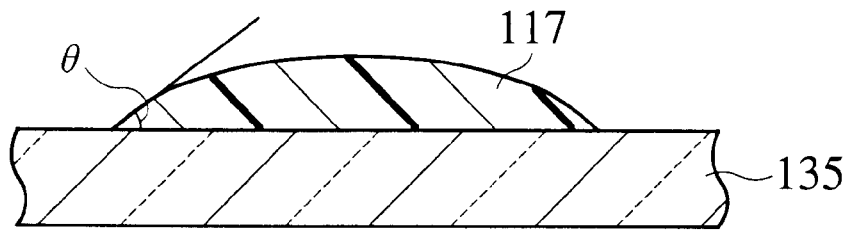
FIGS. 36A–36C are sectional views of projections of Controls and Examples.
Figure 36B:
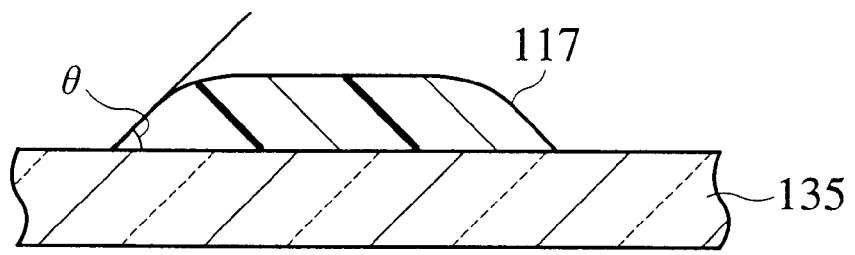
Figure 36C:
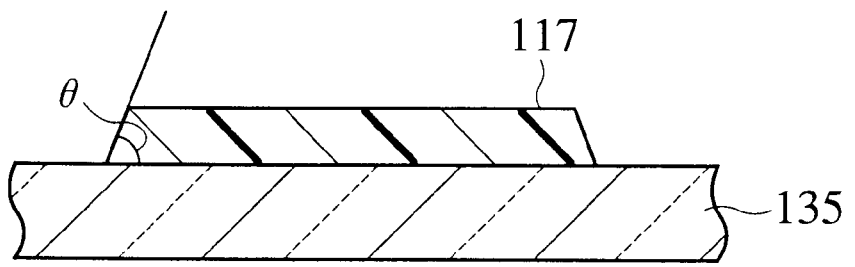
Figure 37A:
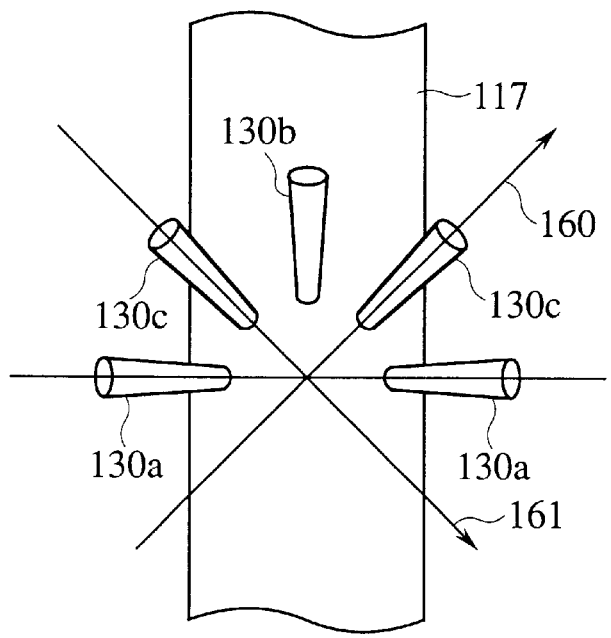
FIGS. 37A–37B are partial plan views of the picture elements which explain tilt directions of the liquid crystal molecules, and luminance distribution.
Figure 37B:
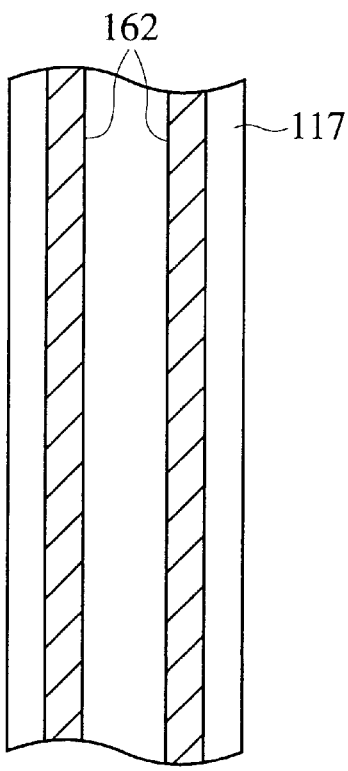
Figure 38:
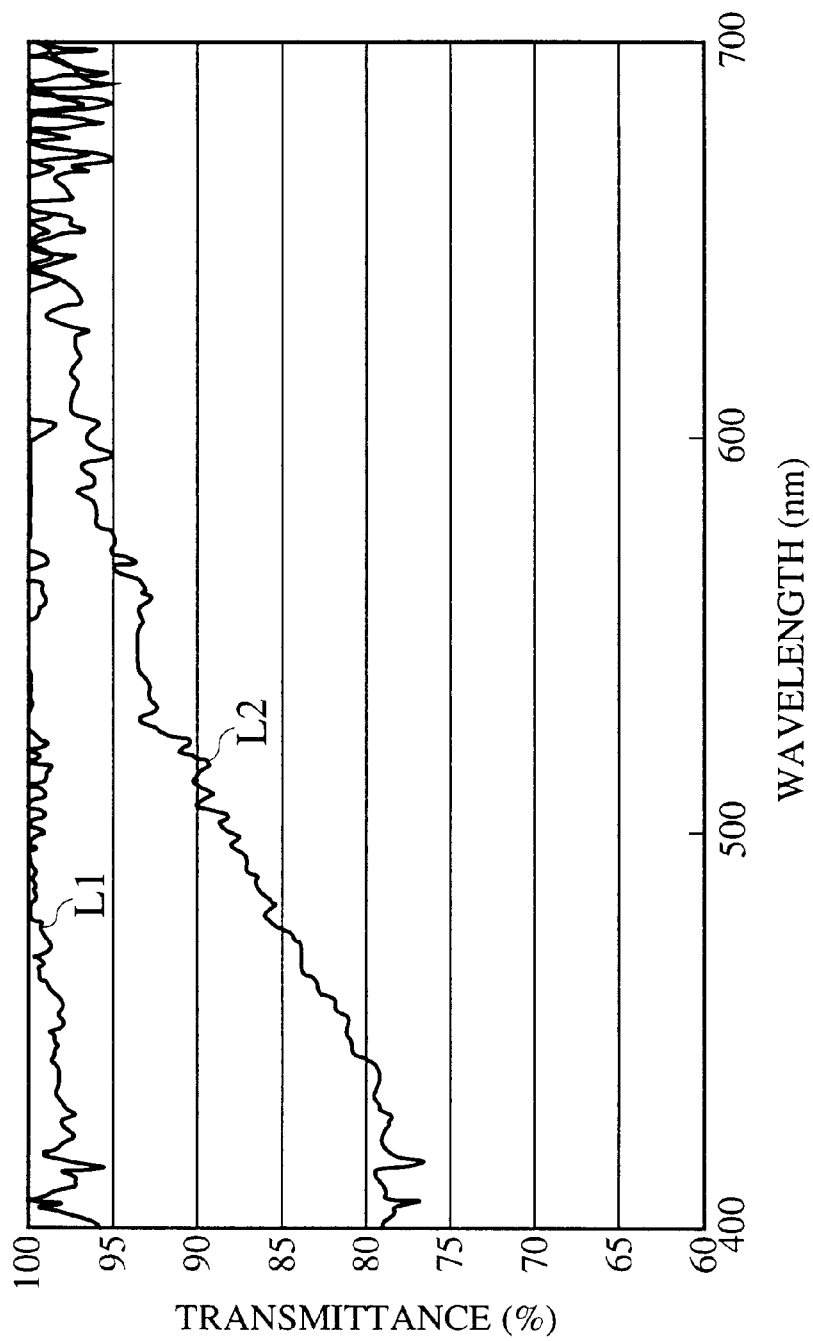
FIG. 38 is a graph showing transmittances of acrylic resin and resist resin.
Figure 39A:
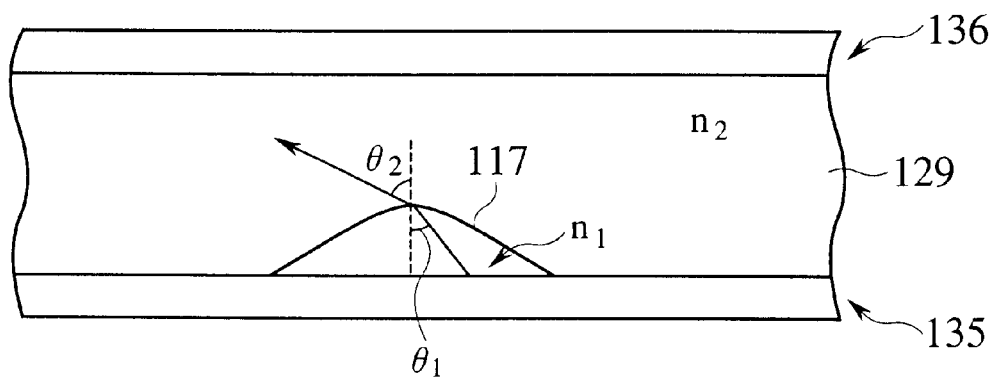
FIGS. 39A–39B are sectional views of the liquid crystal cell which explain influence of a refractive index difference between the projections and a liquid crystal material on the transmittance.
Figure 39B:
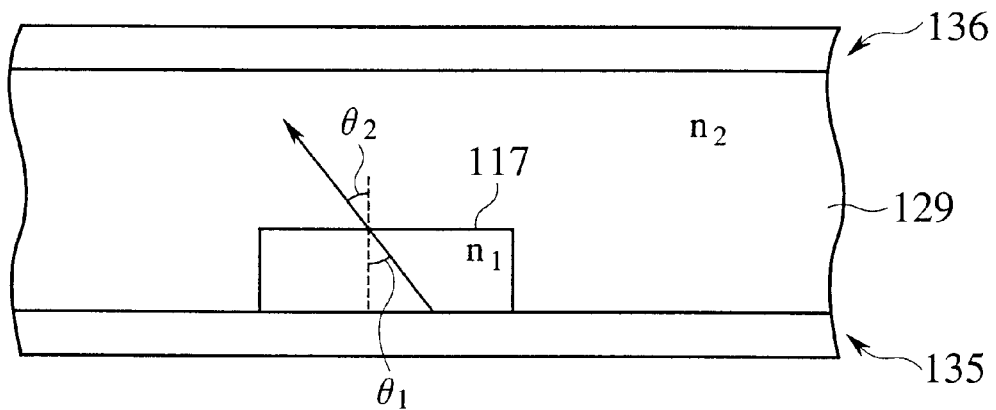
Figure 40A:
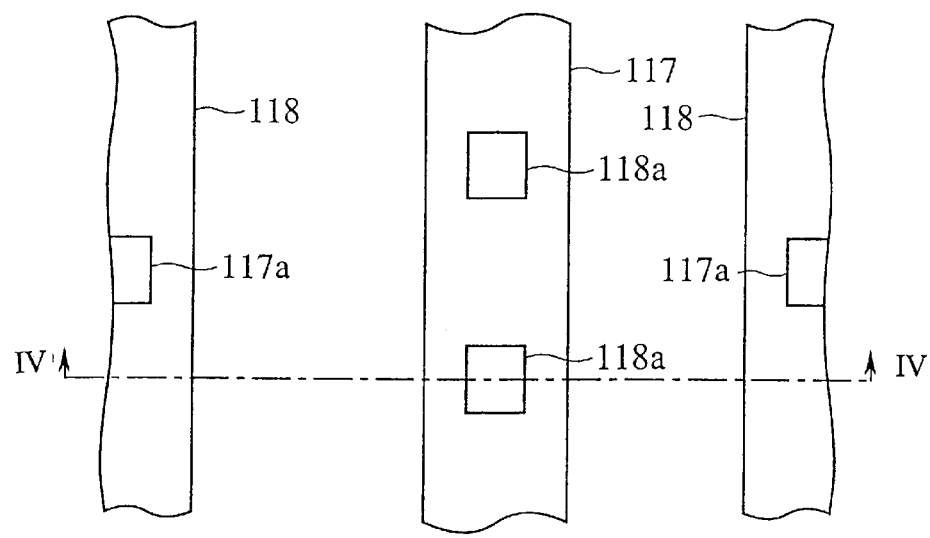
FIG. 40A is a plan view of the liquid crystal cell using the spacer projections.
Figure 40B:
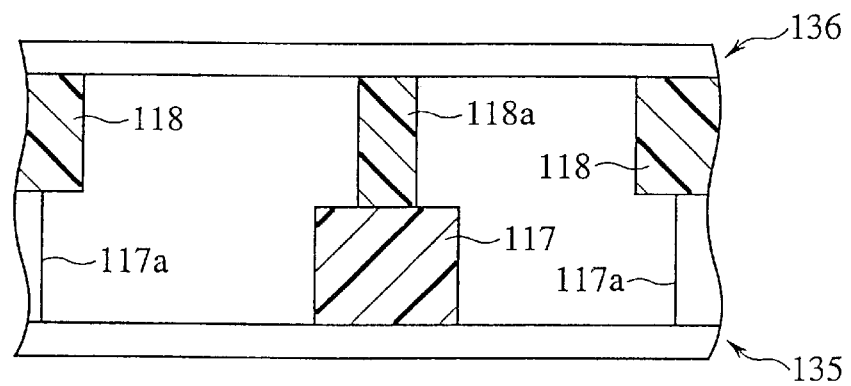
FIG. 40B is a sectional view of the liquid crystal cell using the spacer projections.
Figure 41:
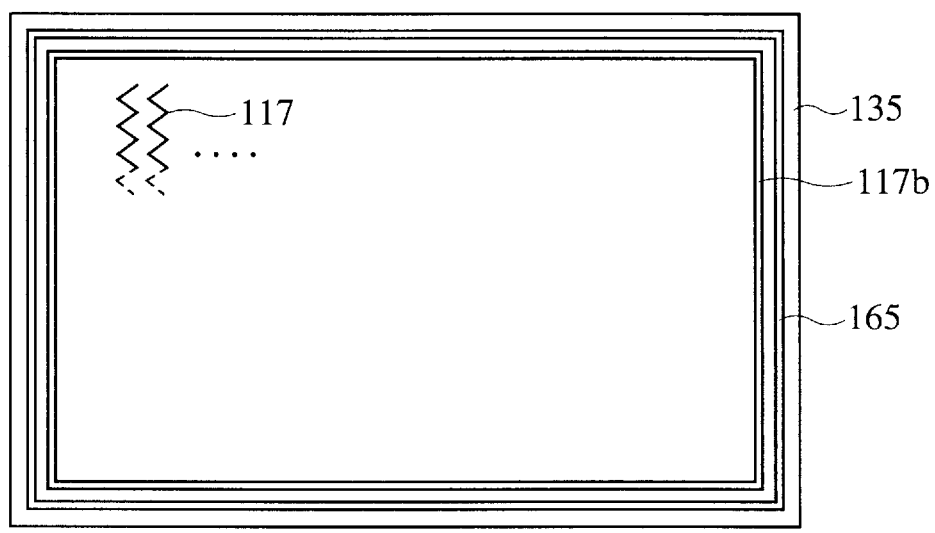
FIG. 41 is a diagrammatic plan view of the TFT substrate explaining an arrangement of the peripheral projection.
Figure 42A:
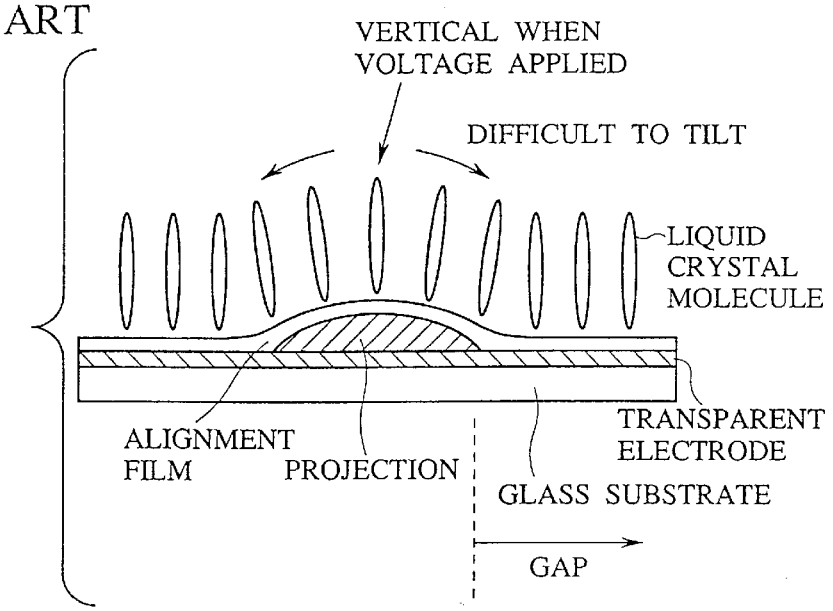
Figure 42B:
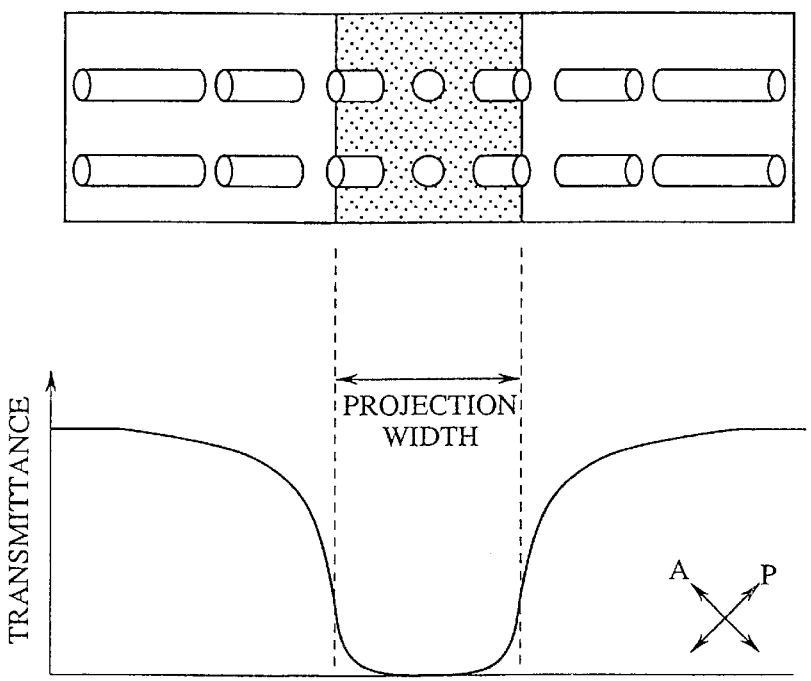
Figure 43A:
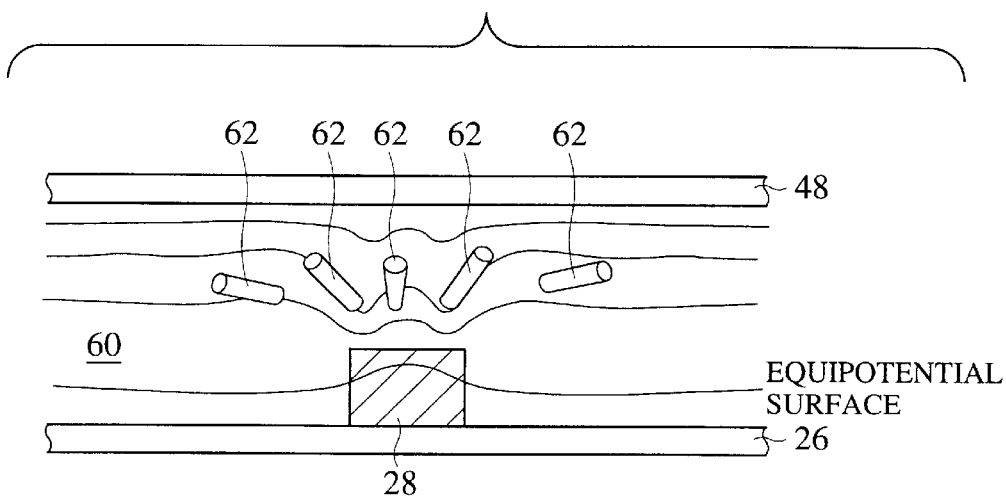
FIGS. 43A–43B are views of the conventional liquid crystal display explaining the problems to be solved by the present invention.
Figure 43B:
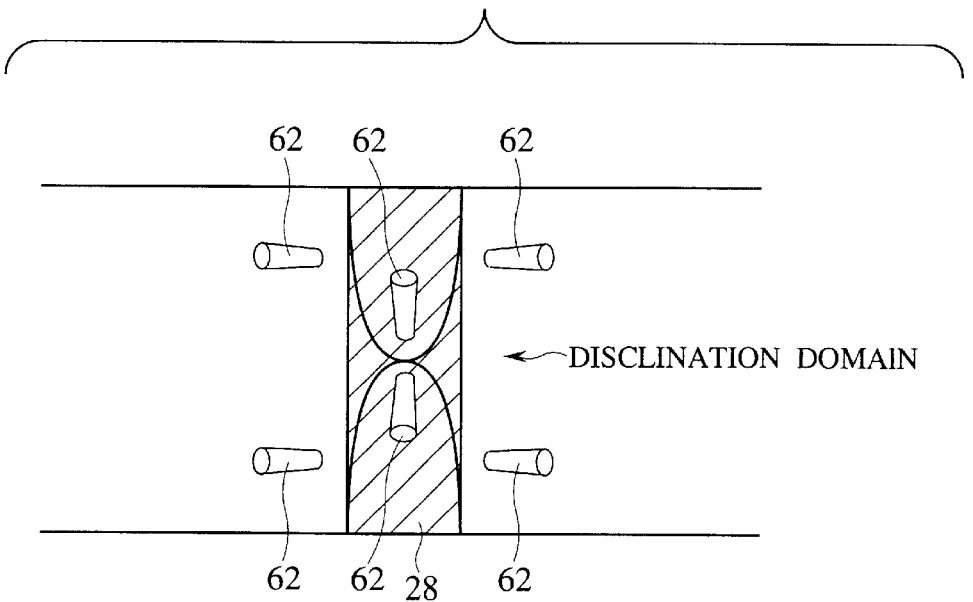

FIG. 31 is a plan view of the MVA-mode liquid crystal display. FIG. 32 is a sectional view of the TFT portion of the MVA-mode liquid crystal display. FIG. 33 is a sectional view of the picture element electrode portion of the MVA-mode liquid crystal display. FIG. 34 is a sectional view of a liquid crystal cell of the MVA-mode liquid crystal display, which explains the operational principle of the MVA-mode liquid crystal display. FIGS. 35A and 35B are views of results of simulation of transmittances of a conventional example and examples of the MVA-mode liquid crystal display. FIGS. 36A–36C are sectional views of projections of the liquid crystal displays according to controls and the examples. FIGS. 37A and 37B are partial sectional views of the picture element portion, which explain tilt directions and luminance distribution. FIG. 38 is a graph of transmittances of acrylic resin and resist resin. FIGS. 39A and 39B are sectional views of a liquid crystal cell which explain influence of transmittance by a refractive index difference between the projections and a liquid crystal material. FIG. 40A is a plan view of a liquid crystal cell using a spacer projection. FIG. 40B is a sectional view of a liquid crystal cell using a spacer projection. FIG. 41 is a diagrammatic plan view of the TFT substrate, which explains a layout of a peripheral projection.

The inventors of the present application studied factors for decrease of an average transmittance on the screen of the MVA-mode liquid crystal display. Before the present embodiment is explained, a structure of the general MVA-mode liquid crystal display and a method for fabricating the MVA-mode liquid crystal display will be explained. Factors for average transmittance decrease will be explained.

FIG. 31 is a plan view of the MVA-mode liquid crystal display. A plurality of gate bus lines 105 extended in the row direction (horizontally) as viewed in the drawing. Capacitor bus lines 108 are extended in the row direction between each of the gate bus lines 105 and its adjacent ones. The gate bus lines 105 and the capacitor bus lines 108 are covered with an insulation film. A plurality of drain bus lines 107 are extended on the insulation film in the column direction (vertically) as viewed in the drawing.

Thin film transistors (TFTs) are disposed corresponding to the intersections between the gate bus lines 105 and the drain bus lines 107. The drain regions of the TFTs 110 are connected to the corresponding drain bus lines 107. The gate bus lines 105 act as the corresponding gate electrodes of the TFTs 110.

The drain bus lines 107 and the TFTs 110 are covered with an inter-layer insulation film. Picture elements electrode 112 are disposed in a region enclosed by two gate bus lines 105 and two drain bus lines 107. Picture element electrodes 112 are connected to the source regions of the corresponding TFTs 110.

Subordinate capacitor branch lines 109 from the capacitor bus line 108 are extended along the edges of the picture element electrodes 112. The capacitor bus lines 108 and the subordinate capacitor branch lines 109 constitute subordinate capacitors with respect to the picture element electrodes 112. A potential of the capacitor bus lines 108 is fixedly set at an arbitrary potential.

When a potential of a drain bus line 107 changes, a potential of the picture element electrodes 112 changes due to capacitive coupling caused by a floating capacitor. In the structure shown in FIGS. 31, the picture element electrodes 112 are connected to the capacitor bus lines 108 through the subordinate capacitor bus lines 109, which can make a potential change of the picture element electrodes 112 small.

Bank-shaped projections 117 and bank-shaped projections 118 are formed respectively on the opposed surfaces of the TFT substrate and the opposed substrate. The projections 117 and the projections 118 are arranged along a zigzag pattern extended in column direction. The zigzag patterns are bent at 90°. The projections 117 on the TFT substrate side are arranged equidistantly from each other in the row direction with the bent portions positioned on the gate bus lines 105 and the capacitor bus lines 108. The projections 118 on the CF substrate side have a pattern substantially congruent with the projections 117 on the TFT substrate side and are positioned substantially intermediate between two projections 117 on the TFT substrate side adjacent to each other. The projections 117 on the TFT substrate side has an about 5 $\mu$m-width, and the projections 118 on the CF substrate side has an about 10 $\mu$m-width.

Polarization plates are disposed on both side of the liquid crystal cell. The polarization plates are positioned in cross Nicol arrangement so that polarizing axes of the polarization plates intersect at 45° respective linear portions of the projections 117, 118. That is, the polarizing axis of one of the polarization plates is parallel with the row direction as viewed in the drawing, and the polarizing axis of the other polarization plate is parallel with the column direction as viewed in the drawing.

FIG. 32 is a sectional view of the TFT portion along the one dot chain line A2—A2. FIG. 33 is a sectional view of the picture element electrode portion along the one dot chain line A3—A3. The TFT substrate 135 and the opposed substrate 136 are arranged parallel with each other, spaced from each other by a certain gap. A liquid crystal material 129 is filled in between the TFT substrate 135 and the opposed substrate 136. The liquid crystal material has negative dielectric constant anisotropy. The projections 117, 118 are formed of a material having a lower dielectric constant than the liquid crystal material 129.

As shown in FIG. 32, a gate bus line 105 is formed on the opposed surface of the glass substrate 101. The gate bus line 105 is formed by depositing an 100 nm-thick Al film and a 50 nm-thick Ti film by sputtering and patterning the two layers. The Al film and the Ti film are etched by reactive ion etching using a mixed gas of $BCl_3$ and $Cl_2$.

A gate insulation film 140 is formed on the glass substrate 101, covering the gate bus line 105. The gate insulation film 140 is an SiN film of a 400 nm-thick and is formed by plasma-enhanced chemical vapor deposition (PE-CVD).

An active region 141 is arranged on the surface of the gate insulation film 140, spanning the gate bus line 105. The active region 141 is a non-doped amorphous Si film of a 30 nm-thick and formed by PE-CVD. A channel protection film 142 covers that of the surface of the active region 141 above the gate bus line 105. The channel protection film 142 is a 140 nm-thick SiN film. In FIG. 31 the channel protection film 142 is patterned to cover the channel region of the TFT 110.

The channel protection film 142 is formed by the following method. First, the surface of the SiN film formed on the entire surface of the substrate is covered with a photoresist film. By exposure on the back of the glass substrate 101 with the gate bus line 105 as a photo-mask, edges of a resist pattern which are parallel in the row direction as viewed in FIG. 31 can be delineated. The edges of the resist pattern which are parallel in the column direction as viewed in FIG. 31 can be delineated by the exposure using a usual photo-mask.

After developing the photoresist film, the SiN film is etched with a buffered hydrofluoric acid-based etchant to pattern the SiN film. The SiN film may be patterned by RIE using a hydrofluoric acid-based gas. The resist pattern is removed after the SiN film has been patterned. The channel protection film 142 is formed by the steps up to this step.

A source electrode 144 and a drain electrode 146 are formed respectively on the upper surface of the active region 141 on both sides of the channel protection film 142. The source electrode 144 and the drain electrode 146 have a layer structure of a 30 nm-thick n⁺ amorphous Si film, a 20 nm-thick Ti film, a 75 nm-thick Al film and a 80 nm-thick Ti film which are laid one on another in the stated order. The gate bus line 105, the gate insulation film 140, the active region 141, the source electrode 144, the drain electrode 146 constitute the TFT 110.

The active region 141, the source electrode 144 and the drain electrode 146 are patterned by using one etching mask. These films are etched by RIE using a mixed gas of $BCl_3$ and $Cl_2$. At this time, the channel protection layer 142 acts as an etching stopper layer above the gate bus line 105.

A picture element 112 is formed on the protection insulation film 148. The picture element electrode 112 is a 70 nm-thick indium tin oxide (ITO) film and is connected to the source electrode 144 through a contact hole 150 passed through the protection insulation film 148. The ITO film is formed by DC magnetron sputtering. The ITO film is patterned by wet etching using an oxalic acid-based etchant. The picture element 112 and the protection insulation film 148 are covered by an alignment film 128.

Then, a structure of the opposed substrate 136 will be explained. A color filter 151 is formed on the opposed surface of the glass substrate 127. A light shield film 152 of Cr or others is formed on the region of the surface of the color filter 151, which is opposed to the TFT 110. A common electrode 154 of ITO is formed on the surface of the color filter 151, covering the light shield film 152. The surface of the common electrode 154 is covered by an alignment film 128.

The picture electrode portion shown in FIG. 33 will be explained. A capacitor bus line 108 is formed on the surface of the glass substrate 101. The capacitor bus line 108 is formed by the same steps as the gate bus line 105 is. A gate insulation film 140 and a protection insulation film 148 are formed on the surface of the glass substrate 101, covering the capacitor bus line 108. A picture element electrode 112 is formed on the surface of the protection insulation film 148.

The projections 117 on the TFT side are formed on the surface of the picture element electrodes 112. The projections 117 on the TFT side are formed by applying a novolak-based photoresist and patterning the photoresist film into the pattern as shown in FIG. 31. The surfaces of the projections 117 on the TFT side and the surfaces of the picture element electrodes 112 are covered by the alignment film 128.

The color filter 151 is formed on the opposed surface of glass substrate 127 opposed to the TFT substrate 135. The light shield film 152 is formed on a part of the surface of the color filter 151. The common electrode 154 is formed on the surface of the color filter 151, covering the light shield film 152. The projections 118 on the CF side are formed on the surface of the common electrode 154. The CF-side projections 118 are formed by the same method as the projections 117 on the TFT side are. The surfaces of the CF-side projections 118 and the common electrode 154 are covered by the alignment film 128.

The principle of the operation of the MVA-mode liquid crystal display will be explained with reference to FIG. 34. Polarization plates 131, 132 are arranged respectively on the outsides of the TFT substrate 135 and the opposed substrate 136 in cross Nicol arrangement. When no voltage is applied, liquid crystal molecules 130 are aligned vertical to the substrate surfaces. Accordingly good black display state can be obtained.

With a voltage applied between the substrates, equipotential surfaces as indicated by the broken lines 116 are generated. That is, because dielectric constants of the projections 117, 118 are lower than a dielectric constant of the liquid crystal layer, the liquid crystal are tilted at both ends of the projections 117, 118 so as to be lower the equipotential surfaces 116 in the projections. Accordingly, the liquid crystal molecules 130a near the side surfaces of the projections 117, 118 are tilted into parallelism with the equipotential surfaces 116. The liquid crystal molecules 130a influence the nearby liquid crystal molecules 130 to tilt in the same direction. Accordingly, the liquid crystal molecules 130 between the TFT-side projections 117 and the CF-side projections 118 are arranged with the longer axes (directors) of the liquid crystal molecules directed upper right. The liquid crystal molecules 130 on the left side of the TFT-side projections 117 and the liquid crystal molecules 130 on the right side of the CF-side projections 118 are arranged with the longer axes directed lower right.

Thus, in one picture element, a plurality of domains having tilting directions of the liquid crystal molecules different from each other are defined. The projections 117, 118 define boundaries of the domains. The TFT-side projections 117 and the CF-side projections 118 are arranged in parallelism with each other in substrate plane, whereby two kinds of domains can be formed. As shown in FIG. 31, the projections are bent at 90°, whereby totally 4 kinds of domains can be formed. A plurality of domains are formed in one picture element, whereby better visual angle characteristics can be obtained.

The bank-shaped projections 117, 118 used in the above-described MVA-mode liquid crystal display are formed of resist resin. The resist film, after patterned, is subject to a heat treatment to have the shoulders melted to have a convex bow-like sectional shape. The inventors of the present application considered that the bow-like sectional shape of the projections decreased the transmittance. Transmittance upon application of 5 [V] was computed on the projections of the bow-like sectional shape and of a rectangular section by using a two-dimensional simulation program LCD master, SYNTEC Co, Ltd.

FIGS. 35A and 35B respectively show results of the simulation of the bow-like sectional projections and the rectangular sectional projections. In FIG. 35A, the bow-like curves are approximated by the bent lines in the steps. These drawings show sectional surfaces normal to the directions of extension of the projections. The thin solid lines in the drawings represent equipotential surfaces. In the respective sectional views, in-plane transmittance distributions are indicated by the broken thick lines, overlapping the thin solid lines. The transmittance is taken on the left vertical axis in the unit of percentage. The transmittance does not involve a transmittance of the polarization plates disposed on both sides of the liquid crystal cell.

The simulation conditions were a 3.0 dielectric constant of the projections, a 3.6 dielectric constant of the liquid crystal molecules in the longitudinal direction, and a 7.4 dielectric constant of the liquid crystal molecules in the direction normal to the longitudinal direction.

In FIG. 35A, the transmittance gradually decreases toward the projections 117, 118 along the substrate surfaces. In FIG. 35B, the high transmittance remains near both ends of the projections 117, 118. That is, in FIG. 35B, the transmittance is substantially flat in the larger area in comparison with in FIG. 35A. Accordingly, in the case of FIG. 35B, an in-plane average transmittance is high. Here, the in-plane average transmittance means a transmittance given by averaging transmittances at respective positions, weighted by occupation ratios in in-plane directions. In the specification of the present application, the in-plane average transmittance is often simply called a transmittance.

As seen in FIGS. 35A and 35B, the bow-like sectional shape of the projections 117, 118 is one factor for the low transmittance. Approaching the sectional shape of the projections to a rectangle can enhance the transmittance.

The liquid crystal displays having the projections of different sectional shapes were actually prepared as Examples 10 to 14 and Controls 4 to 6. Transmittance of the liquid crystal displays upon application of 5 [V] was measured. The result is shown in Table 1. The transmittance was measured by a microspectrograph of a 10 $\mu$m-spot diameter, Oak Co., Ltd.

TABLE 1

| | Material | Thickness ($\mu$m) | In Projections | Transmittance (%) Near Projections | Between Projections |
|---|---|---|---|---|---|
| Example 10 | Acryl 1 | 1.42 | 9.21 | 24.79 | 26.31 |
| Example 11 | Acryl 2 | 1.27 | 8.33 | 26.17 | 25.78 |
| Example 12 | Acryl 2 | 1.50 | 6.85 | 27.09 | 26.52 |
| Example 13 | Acryl 2 | 1.80 | 5.78 | 27.28 | 27.53 |
| Control 4 | Resist | 1.38 | 9.96 | 23.93 | 23.01 |
| Control 5 | Resist | 1.52 | 9.56 | 24.33 | 25.86 |
| Control 6 | Resist | 1.82 | 8.96 | 25.54 | 26.91 |

The liquid crystal displays of the Examples and the Controls shown in Table 1 have the same constitution as the MVA-mode liquid crystal display shown in FIGS. 31 to 33. In the Example and the Controls, a width of the projections 117, 118 was 10 $\mu$m, a gap between the projections 117 and the projections 118 as viewed in the normal direction of the substrates was 30 $\mu$m. A thickness of the liquid crystal layers was 4 $\mu$m. The used liquid crystal material was MJ961213, Merk Co., Ltd. An ordinary refractive index $n_o$ of the liquid crystal material was 1.48. An extra-ordinary refractive index $n_e$ was 1.56. The used alignment films was JALS-684, JSR Co., Ltd.

The projection material used in Example 10 was acrylic resin (PC335, JSR Co., Ltd.). The method for forming the projections of Example 10 will be explained.

An acrylic resin composition was applied to the surfaces of the substrates and prebaked at 90° C. for 30 minutes. After exposure and development, 2-minute rinse was performed. UV radiation of a 300 mJ/cm$^2$ energy density was applied to make a bleaching treatment. Then, the first postbaking was performed at 90° C. for 30 minutes, and subsequently the second postbaking was performed at 200° C. for 60 minutes.

The projection material used in Examples 11 to 13 was acrylic resin (LC201, Sanyo Kasei). The method for forming the projections of Examples 11 to 13 will be explained.

An acrylic resin composition was applied to the surfaces of the substrates. Prebaking was performed at 80° C. for 2 minutes. A bleaching treatment was performed by applying UV radiation of a 300 mJ/cm$^2$ energy density. Postbaking was performed at 200° C. for 60 minutes. A rotation number of the spin coating was adjusted to obtain a required film thickness of the acrylic resin film. A resist pattern was formed on the surface of the postbaked acrylic resin film, and the acrylic resin film was patterned by reactive-ion etching using oxygen. Then, the resist pattern was removed. Thus, the patterning follows the postbaking.

The projection material used in Controls 4 to 6 was a resist resin, LC-200, SIPRAY Co., Ltd. The method for forming the projections of Controls 4 to 6 will be explained.

A resist film is spin-coated on the surfaces of the substrates. Prebaking was performed at 90° C. for 30 minutes. A rotation number of spin coating was adjusted to obtain required film thickness of the resist film. Exposure, development and 2-minute rinse were performed. Then, the first postbaking was performed at 120° C. for 30 minutes, and the second postbaking was performed at 200° C. for 60 minutes.

FIG. 36A shows sectional views of the projections 117 of Controls 4 to 6. FIG. 36B shows a sectional view of the projections 117 of Example 10. FIG. 26C shows a sectional view of the projections 117 of Examples 11 to 13. The sectional shape of the projections 117 of Controls 4 to 6 were substantially bow-shaped. The sectional shape of the projections 117 of Example 10 was substantially trapezoidal. The sectional view of the projections 117 of Examples 11 to 13 were substantially rectangular.

In Controls 4 to 6, an inclination angle of a tangential plane at the position where the surfaces of the projections 117 contact the surface of the TFT substrate (a contact angle θ) was about 20°. In Example 10, the contact angle θ was about 45°. In Examples 11 to 13, the contact angle θ was about 80°.

The resin film thicknesses forming the projections of Example 10 and Control 4 were substantially equal to each other. In comparison with each other, it is shown that the transmittances of Example 10 at the edges of the projections and between the projections are higher. This will be because the sectional shape of the projections approached to a rectangle. In Example 11, although the height of the projections was smaller than that of the projections of Control 4, higher transmittances were obtained at the edges of the projections and between the projections. This will be because the sectional shape of the projections further approached to a rectangle. Examples 12 and 13 exhibited the same effect in connection with Controls 5 and 6.

In the Examples the transmittances within the projections were lower. This is because as the sectional shapes of the projections further approached to a rectangle, the projections had a film thickness of both ends increased, and an effective voltage was lowered. However, an occupation ratio of regions covered by the projections with respect to substrate surfaces is sufficiently lower than that of regions of the edges of the projections and between the projections. Accordingly, the Examples had higher in-plane average transmittance than the Controls.

In order to obtain significant effect of improving the transmittance by means of the conventional projections, it is preferable that a contact angle of the side surfaces of the projections to the substrate surfaces is above 30°.

In comparison with Controls 4 to 6, it is shown that as the projections were higher, the transmittance was improved. In forming the projections of a resist material, a film thickness is decreased by the postbaking following the patterning. It is necessary to form the resist film thicker by about 20% than a height of the projections to be formed. In order to form the resist film thick, a resist composition has a higher viscosity, or a rotation number of spin coating is decreased. However, the viscosity increase of a resist composition and the rotation number decrease deteriorate the application, which makes it difficult to form the resist film thick with good reproducibility. The upper limit of the film thickness which allows the resist film to be formed with good reproducibility is about 1.6 $\mu$m.

In contrast to this, when acrylic resin is used as in Example 10, the film thickness decrease by the postbaking is small. Accordingly, an bout 2.0 $\mu$m-thick acrylic resin film can be formed with good reproducibility. This makes it possible to form the projections high, and accordingly the transmittance improved can be achieved. Thus, acrylic resin is used as a projection material, whereby the projections can have more rectangular sectional shape and can be formed high, with a result of improving the transmittance.

The use of acrylic resin makes it possible that a ratio of a height of the projections to a bottom width thereof (aspect ratio) is above 0.5. Thus making an aspect ratio high permits effective open portions to have a larger area so as to obtain a higher average transmittance, and permits a higher transmittance at the edges of the projections so as to obtain a high average transmittance.

In FIGS. 35 and 36, the relationships between the sectional shapes of the projections and the transmittance were studied. Factors for influencing the transmittance of the liquid crystal cell are transmission characteristics of a projection material itself and refractive index differences between the projections and a liquid crystal material.

With reference to FIG. 37, the grounds for transmission characteristics of a projection material influence the transmittance of the liquid crystal cell will be explained.

FIG. 37A shows a plan view of a projection 117 of the liquid crystal cell and a peripheral part thereof. The polarization axes 160, 161 of the two polarization plates intersect each other at a right angle, and the respective polarization axes intersect the linear portions of the projection 117 at 45°. When a voltage is applied between the substrate, the liquid crystal molecules 130a near both sides of the projection 117 are tilted in a direction normal to the direction of extension of the projection 117.

The liquid crystal molecules within the projection 117 are aligned splayed under the influenced of the tilt of the liquid crystal molecules 130a on both sides. That is, the liquid crystal molecule 130b positioned substantially at the center of the projection 117 is tilted in a direction parallel with the direction of extension of the projection 117. The liquid crystal molecules 130c positioned intermediate between both sides of the projection 117 and the center thereof are tilted in a direction offset by 45° from the direction of extension of the projection 117, i.e., in a direction parallel with the polarization axis 160 or 161.

The liquid crystal layer in the region where a tilting direction of the liquid crystal molecules and the polarization axis form an angle of 45° to each other causes incident polarized light to revolve, and the light passes through the polarization plate on the exit side. The liquid crystal layer in the region where the tilting direction of the liquid crystal molecules and the polarization axis is parallel with each other does not revolve incident polarized light, and the light does not pass through the polarization plate.

FIG. 37B shows a luminance distribution upon application of a voltage. The hatched stripe regions 162 become dark. The dark regions 162 correspond to the two troughs in the region where the projection 117 is positioned in FIGS. 35A and 35B. The center of the projection 117 transmits light to some extent, and becomes bright. When a material itself of the projection 117 has a low transmittance, a luminance of the central portion of the projection 117 is low. Accordingly, an average transmittance is lowered. When a material of high transmittance is selected as a material of the projection 117, the center of the projection 117 has a high transmittance.

FIG. 38 shows wavelength dependence of 1.5 µm-thick resin films formed of a resist resin, LC-200, SIPRAY Co., Ltd. and of an acrylic resin, PC-335, JSR Co., Ltd. Wavelengths are taken on the horizontal axis in the unit of nm, and transmittances are taken on the vertical axis, in the unit of percentage. In the drawing, the solid line L1 indicates transmittances of the acrylic resin and the solid line L2 indicates transmittances of the resist resin. It is shown that the transmittances of the acrylic resin are higher than those of the resist resin. Accordingly, higher transmittance can be obtained by forming the projections of acrylic resin without changing a sectional shape of the projections.

Then, influence of refractive index difference between the projections and a liquid crystal material on the transmittance will be explained.

As shown in FIG. 39A, light incident on the projection 117 from the side of the TFT substrate 135 is diffracted in the interface between the projection 117 and the liquid crystal material 129. When a refractive index of the projection 117 is $n_1$, a refractive index of the liquid crystal material 129 is $n_2$, an incident angle is $\theta_1$, and a refraction angle is $\theta_2$, $\sin\theta_1/\sin\theta_2 = n_2/n_1$ is given. Generally a refractive index $n_1$ of the projections 117 is higher than that $n_2$ of the liquid crystal material. Accordingly, a propagation direction of light slantly incident on the liquid crystal layer from the side of the TFT substrate 135 is bent in an increasingly slant direction with respect to the substrate surface. Increase of an angle of a propagation direction of the light to the direction of a normal to the substrate become large causes retardation of the liquid crystal layer and deflection of transmission characteristics of the polarization plates from desired transmission characteristics. Resultantly, contrast and transmittance are deteriorated.

An ordinary refractive index of MJ961213, a liquid crystal material made by MERK Co., Ltd. is 1.48, and an extra-ordinary refractive index thereof is 1.56. The average refractive index of both refractive indexes is 1.52. A refractive index of LC201, acrylic resin made by JSR is 1.55. A refractive index of LC201, acrylic resin made by Sanyo Kasei is 1.52. A refractive index of LC-200, resist resin made by SIPRAY Co., Ltd. is 1.65. Thus, refractive indexes of acrylic resin are near to the average refractive index of the liquid crystal material.

In order to obtain the effect of depressing transmittance decrease in comparison with the case that resist resin is used as a projection material it is preferable that a difference between an average refractive index of the liquid crystal material and that of a projection material is below 4% of the average refractive index.

FIG. 39B shows refraction of light in the case that the projections 117 are formed of acrylic resin. When a difference between a refractive index of the projection material 117 and that of the liquid crystal material 129 is small, an incident angle $\theta_1$ and a refraction angle $\theta_2$ are substantially equal to each other. Accordingly, a propagation direction of light slantly incident on the projection 117 can be kept from further slanting. Resultantly, contrast decrease and transmittance decrease can be depressed.

Next, relationships between spacers dispersed in the liquid crystal layer and the transmittance will be explained. No double refractivity is exhibited in regions in the picture elements where the spacers are disposed. In the case that the polarization plates are disposed in cross-Nicol arrangement, the regions where the spacers are present transmit no light. Furthermore, alignment of the liquid crystal molecules near the spacers are disturbed, a transmittance in the regions is decreased. Accordingly, an average transmittance is lowered. The following example is for lessening decrease of an average transmittance due to the spacers.

FIG. 40A shows a plan view of a part of the picture elements. A projection 117 on the TFT side is disposed between two projections 118 on the CF side. Spacer projections 118a of the CF side are arranged isolated from each other in the region where the projections 117 of the TFT side are formed. Spacer projections 117a of the TFT side are arranged isolated from each other in the region where the projections 118 of the CF side are formed.

FIG. 40B shows a sectional view along the one-dot chain line B10—B10 in FIG. 40A. The spacer projections 118a of the CF side are formed in the same step as the projections 118 of the CF side. That is, a material and a height of the CF-side spacer projections 118a are substantially the same as those of the CF-side projections 118. The TFT-side spacer projections 117a are also formed in the same step as the TFT-side projections 117.

The CF-side spacer projections 118a contact at the upper ends the opposed TFT-side projections 117 through the alignment films. The alignment films are not shown in the drawing. The TFT-side spacer projections 117a contact at the upper ends the opposed CF-side projections 118 through the alignment films. The spacer projections thus contact the opposed projections to thereby keep constant a gap between the substrates. The spacers do not have to be disposed in the regions where the projections 117, 118 are not disposed, which can prevent decrease of a transmittance because of the spacers.

A liquid crystal display having the same constitution as Example 12 stated in Table 1 and including the spacer projections 117a, 118b was fabricated. Transmittances of this liquid crystal display were 27.11% at the edges of the projections and 28.11% between the projections. These values are higher than those of Example 12. The spacer projections are thus arranged not to be dispersed in the picture element regions, whereby a high transmittance can be obtained. In addition, the spacer projections 117a, 118a are formed respectively in the same step as the projections 117, 118, and accordingly no step is added.

So far the transmittance of the liquid crystal display has been explained. Next, the response speed of the liquid crystal display will be explained.

In FIG. 34, a tilting direction of the liquid crystal molecules positioned intermediate between the projections 117 and the projections 118 is not determined directly by a potential distribution in the liquid crystal layer but is determined indirectly under influence of a tilting direction of the liquid crystal molecules positioned near both ends of the projections 117 or the projections 118. Accordingly, when the liquid crystal molecules near both ends of the projections 117, 118 have tilted in a prescribed direction, some delay takes place until the liquid crystal molecules positioned intermediate between the liquid crystal molecules near both ends of the projections 117, 118 are aligned in a prescribed direction. This delay leads to a low response speed.

It is expected that a smaller gap between the projections 117 and the projections 118 will increase the response speed. In Examples 10–13 stated in Table 1, a width of the projections 117, 118 was 10 μm, a gap therebetween was 30 μm. To verify the above-described assumption, the liquid crystal display of Example 14 having the projections 117, 118 of a 2 μm-width and having a 6 μm-gap was fabricated. The structure of the projections 117, 118 of Example 14 is the same as that of Example 13.

A response speed was measured by a luminance meter of a 1 mm-spot diameter made by Ohtsuka Denshi. A response speed was defined to be a period of time from application of a voltage to a time when a transmittance reaches 90% of a saturation. When applied voltages were changed from 0 V to 3 V, 0 V to 4 V and 0 V to 5 V, response speeds of the liquid crystal display of Example 13 were respectively 60.87 ms, 32.39 ms and 21.55 ms. Response speed of the liquid crystal display of Example 14 were respectively 33.97 ms, 14.76 ms and 9.48 ms. It is shown that reduction of a gap between the projections improves the response speed.

In the case that a projection material is a resist material as in the conventional liquid crystal display, as shown in FIG. 35A, the transmittance near both ends of the projections 117, 118 is lower, and a region where a maximum transmittance is exhibited is smaller. To ensure a region where a flat transmittance can be obtained it is preferable that a gap between the projections 117 and the projections 118 is above 20 μm. In contrast to this, in FIG. 35B, a region where a flat transmittance can be obtained even when a gap between the projections 117 and the projections 118 is below 15 μm. A gap between the projections 117 and the projections 118 is set to be below 15 μm, whereby high response speeds which have been difficult to realize by the conventional constitution can be realized.

It is preferable that a width of the projections 117, 118 is above 2 μm because of fabrication restrictions. When a width of the projections 117, 118 is 2 μm, it is preferable to ensure a transmittance equivalent to that of the liquid crystal display having a width of the projections 117, 118 of 10 μm and a 30 μm-gap between both projections that a gap between both projections 117, 118 is above 6 μm.

FIG. 41 is a diagrammatic plan view of the TFT substrate 135 of another example. The same TFT-side projections 117 as those of the MVA-mode liquid crystal display shown in FIG. 31 are formed on the surface opposed to the TFT substrate 135. Furthermore, a peripheral projection 117b is formed along an uninterrupted line enclosing an inner part of the surface opposed to the TFT substrate 135. The peripheral projection 117b is disposed along the edge of the TFT substrate 135. The peripheral projection 117b is formed in the same step as the TFT-side projections 117. A seal member 165 is disposed outside of the peripheral projection 117b.

When a liquid crystal material is loaded by drop-injection, the peripheral projection 117b dams up the flow of liquid crystal material. Accordingly, the liquid crystal material can be kept from contacting the seal member 165 to prevent contamination of the liquid crystal material with the seal member 165.

What is claimed is:

1. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when a drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film, the first alignment film and/or the second alignment film having weaker vertical alignment restrictiveness in a region where the projection is formed than that in a region where the projection is not formed.

2. A liquid crystal display according to claim 1, wherein the first alignment film and/or the second alignment film has a smaller film thickness in the region where the projection is formed than that in the region where the projection is not formed so as to weaken the alignment restrictiveness in the region where the projection is formed.

3. A liquid crystal display according to claim 1, wherein the first alignment film and/or the second alignment film has micronized regions, where the alignment film is not formed, dispersed in the region where the projection is formed so as to weaken the alignment restrictiveness in the region where the projection is formed.

4. A substrate for use in a liquid crystal display including: an active device for driving a liquid crystal, a picture element electrode to which a drive voltage is applied by the active device, and an alignment film formed on the picture element electrode and aligning liquid crystal molecules vertically to a surface of the alignment film when the drive voltage is not applied, the substrate comprising:

a projection disposed between the picture element electrode and the alignment film, for restricting a tilting direction of the liquid crystal molecules when the drive voltage is applied, the alignment film having weaker vertical alignment restrictiveness in a region where the projection is formed than in a region where the projection is not formed.

5. A substrate for used in a liquid crystal display including: a common electrode, and an alignment film formed on the common electrode for aligning liquid crystal molecules vertically to a surface of the alignment film when a drive voltage is applied, the substrate comprising:

a projection disposed between the common electrode and the alignment film for restricting a tilting direction of the liquid crystal molecules when the drive voltage is applied, the alignment film having weaker vertical alignment restrictiveness in a region where the projection is formed than in a region where the projection is not formed.

6. A method for fabricating a liquid crystal display including a liquid crystal layer having negative dielectric constant anisotropy sealed between a pair of substrate, the surfaces of which are treated to have vertical alignment, the method comprising the steps:

forming on the substrate a projection for restricting a tilting direction of liquid crystal molecules; and forming on the substrate with the projection formed on an alignment film having weaker vertical alignment restrictiveness in a region where the projection is formed than in a region where the projection is not formed.

7. A method for fabricating a liquid crystal display according to claim 6, wherein in the step of forming the alignment film, the alignment film is formed thinner on the projection than in the region where the projection is not formed, whereby the vertical alignment restrictiveness in the region where the projections is formed is weakened.

8. A method for fabricating a liquid crystal display according to claim 6, wherein in the step of forming the alignment film, the alignment film having micronized regions, where the alignment film is not formed, dispersed in the region where the projection is formed, whereby the vertical alignment restrictiveness in the region where the projection is formed is weakened.

9. A method for fabricating a liquid crystal display according to claim 6, wherein the step of forming the alignment film includes the step of forming an alignment film having substantially uniform vertical alignment restrictiveness, and the step of selectively applying UV radiation to the alignment film in the region where the projection is formed, whereby vertical alignment restrictiveness in the region where the projection is formed is weakened.

10. A method for fabricating a liquid crystal display according to claim 6, further comprising:

after the step of forming the alignment film, the step of weakening the general vertical alignment restrictiveness of the alignment film.

11. A method for fabricating a liquid crystal display according to claim 6, further comprising:

after the step of forming the projection, the step of enhancing a surface tension of the projections.

12. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film, the projection having a prescribed height and/or a prescribed dielectric constant so that a voltage to be applied to the liquid crystal layer in a region where the projection is formed is substantially equal to or below a liquid crystal threshold voltage.

13. A liquid crystal display according to claim 12, wherein the voltage to be applied to the liquid crystal layer in the region where the projection is formed is controlled by voltage reduction by the projection.

14. A liquid crystal display according to claim 13, wherein the voltage to be applied to the liquid crystal layer in the region where the projection is formed is controlled by a height and/or a dielectric constant of the projection.

15. A liquid crystal display according to claim 12, wherein the voltage to be applied to the liquid crystal layer in the region where the projection is formed is controlled by voltage reduction by the first alignment film and/or the second alignment film.

16. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film, the first alignment film or the second alignment film having a prescribed film thickness and/or a prescribed dielectric constant so that a the voltage to be applied to the liquid crystal layer in the region where the projection is formed is substantially equal to or below a liquid crystal threshold voltage.

17. A liquid crystal display according to claim 15, wherein the first alignment film or the second alignment film is thicker in the region where the projection is formed than in the other region.

18. A liquid crystal display according to claim 16, wherein the first alignment film or the second alignment film is thicker in the region where the projection is formed than in the other region.

19. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film, when the drive voltage is applied between the first electrode and the second electrode, a voltage to be applied to the liquid crystal layer in a region where the projection is formed being controlled to be substantially equal to or below a liquid crystal threshold voltage, wherein the first alignment film and the second alignment film have higher vertical alignment ability in the region where the projection is formed than in the other region, whereby a liquid crystal threshold voltage in the region where the projection is formed is higher than in the other region.

20. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film; and a high-resistance electrode layer disposed between the first electrode and the projection and/or between the second electrode and the projection, a voltage to be applied to the liquid crystal layer in a region where the projection is formed being controlled by voltage reduction by the high-resistance electrode layer, when the drive voltage is applied between the first electrode and the second electrode, the voltage to be applied to the liquid crystal layer in the region where the projection is formed being controlled to be substantially equal to or below a liquid crystal threshold voltage.

21. A liquid crystal display including: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; and a liquid crystal layer sealed between the first substrate and the second substrate and having negative dielectric constant anisotropy, the liquid crystal display comprising:

a projection for restricting a tilting direction of the liquid crystal molecules when the drive voltage is applied between the first electrode and the second electrode, disposed between the first electrode and the first alignment film, and/or between the second electrode and the second alignment film, wherein the first electrode or the second electrode is made highly resistive in the region where the projection is formed, and the voltage to be applied to the liquid crystal layer in the region where the projection is formed is controlled by voltage reduction in the region where the first electrode or the second electrode is made highly resistive.

22. A voltage control method for a liquid crystal display comprising: a first substrate including a first electrode to which a drive voltage is applied, and a first alignment film formed on the first electrode and aligning liquid crystal molecules vertically to a surface of the first alignment film when the drive voltage is not applied; a second substrate including a second electrode opposed to the first electrode, and a second alignment film formed on the second electrode and aligning the liquid crystal molecules vertically to a surface of the second alignment film when the drive voltage is not applied; a liquid crystal layer sealed between the first substrate and the second substrate and having negative dielectric constant anisotropy; and a projection for restricting a tilting direction of the liquid crystal molecules when the drive voltage is applied between the first electrode and the second electrode, disposed between the first electrode and the first alignment film, and/or between the second electrode and the second alignment film, when the drive voltage is applied between the first electrode and the second electrode, a voltage to be applied to the liquid crystal layer in the region where the projection is formed being controlled to be substantially equal to or below a liquid crystal threshold voltage and a voltage to be applied to the liquid crystal layer in the region where the projection is not formed being controlled to be above the liquid crystal threshold voltage.

23. A liquid crystal display comprising:

a first substrate and a second substrate opposed to each other in parallelism with each other at a certain gap therebetween;

a liquid crystal material loaded between the first substrate and the second substrate and having negative dielectric constant anisotropy;

a first electrode and a second electrode respectively formed on opposed surfaces of the first substrate and the second substrate and defining a picture element region;

a first projection for restricting tilting directions of liquid crystal molecules formed on the surface of the first electrode, a side surface of the first projection forming a contact angle of above 30° to the surfaces of the first electrode;

an alignment restricting means formed on the opposed surface of the second substrate for restricting together with the first projection the tilting directions of the liquid crystal molecules;

a first alignment film formed on the opposed surface of the first substrate, covering the first electrode and the first projection, for vertically aligning the liquid crystal molecules in the liquid crystal material; and a second alignment film formed on the opposed surface of the second substrate, covering the second electrode and the alignment restricting means, for vertically aligning the liquid crystal molecules in the liquid crystal material.

24. A liquid crystal display according to claim 23, wherein a difference between an average refractive index of an ordinary refractive index and an extra-ordinary refractive index of the liquid crystal material, and a refractive index of the first projection is below about 4% of the average refractive index.

25. A liquid crystal display according to claim 23, further comprising:

a second projection formed on the opposed surface of the first substrate, arranged along an uninterrupted line enclosing an inner portion of the opposed surface of the first substrate, and formed of the same material as the first projection.

26. A liquid crystal display according to claim 24, further comprising:

a second projection formed on the opposed surface of the first substrate, arranged along an uninterrupted line surrounding an inner portion of the opposed surface of the first substrate, and formed of the same material as the first projection.

27. A liquid crystal display comprising:

a first substrate and a second substrate opposed to each other in parallelism with each other at a certain gap therebetween;

a liquid crystal material loaded between the first substrate and the second substrate and having negative dielectric constant anisotropy;

a first electrode and a second electrode respectively formed on opposed surfaces of the first substrate and the second substrate and defining a picture element region;

a first projection formed on the surface of the first electrode, a ratio of a width of the bottom surface of the first projection to a height thereof being above 0.5;

an alignment restricting means formed on the opposed surface of the second substrate for restricting together with the first projection tilting directions of liquid crystal molecules;

a first alignment film formed on the opposed surface of the first substrate, covering the first electrode and the first projection for vertically aligning the liquid crystal material; and a second alignment film formed on the opposed surface of the second substrate, covering the second electrode and the alignment restricting means, for vertically aligning liquid crystal molecules in the liquid crystal material.

28. A liquid crystal display according to claim 27, wherein a difference between an average refractive index of an ordinary ray refractive index and an extra-ordinary refractive index of the liquid crystal material, and a refractive index of the first projections is below about 4% of the average refractive index.

29. A liquid crystal display comprising:

a first substrate and a second substrate opposed to each other in parallelism with each other at a certain gap therebetween;

a liquid crystal material loaded between the first substrate and the second substrate and having negative dielectric constant anisotropy;

a first electrode and a second electrode respectively formed on opposed surfaces of the first substrate and the second substrate and defining a picture element region;

a first projection formed of acrylic high molecular material on the surfaces of the first electrodes;

an alignment restricting means formed on the opposed surface of the second substrate for restricting together with the first projection tilting directions of liquid crystal molecules;

a first alignment film formed on the opposed surface of the first substrate, covering the first electrode and the first projection for vertically aligning the liquid crystal molecules in the liquid crystal material; and a second alignment film formed on the opposed surface of the second substrate, covering the second electrode and the alignment restricting means, for vertically aligning liquid crystal molecules in the liquid crystal material.

30. A liquid crystal display according to claim 29, wherein the alignment restricting means are a second projection; and the liquid crystal display further comprising: third projections formed on the opposed surface of the second substrate, the third projections being arranged, isolated from each other in regions overlapping the first projection as viewed in the direction of a normal to the substrate, being formed of the same material as the second projection, and contacting at the upper surfaces thereof the first alignment film and the second alignment film.

31. A liquid crystal display according to claim 1, wherein the tilting direction of the liquid crystal molecules in the region where the projection is formed and the tilting direction of the liquid crystal molecules in the region where the projection is not formed are substantially perpendicular to each other.

32. A liquid crystal display according to claim 1, wherein the projection has a slender pattern extending in a direction which is substantially parallel with the tilting direction of the liquid crystal molecules in the region where the projection is formed.

* * * * *

UNITED STATES PATENT AND TRADEMARK OFFICE
CERTIFICATE OF CORRECTION

PATENT NO. : 6,633,356 B1 Page 1 of 1
DATED : October 14, 2003
INVENTOR(S) : Shingo Kataoka et al.

It is certified that error appears in the above-identified patent and that said Letters Patent is hereby corrected as shown below:

Column 35,
Line 35, delete "substrate for used" and insert -- substrate for use --.
Lines 50, 53 and 55, delete "substrate" and insert -- substrates --.

Signed and Sealed this

Fifteenth Day of June, 2004

JON W. DUDAS
*Acting Director of the United States Patent and Trademark Office*